US006950535B2

(12) United States Patent
Sibayama et al.

(10) Patent No.: US 6,950,535 B2
(45) Date of Patent: Sep. 27, 2005

(54) IMAGE COLLECTING DEVICE, IMAGE RETRIEVING DEVICE, AND IMAGE COLLECTING AND RETRIEVING SYSTEM

(75) Inventors: Zyun'iti Sibayama, Tokyo (JP); Satoshi Hisanaga, Tokyo (JP); Satoshi Tanaka, Tokyo (JP); Hiroto Nagahisa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 745 days.

(21) Appl. No.: 09/937,559

(22) PCT Filed: Jan. 29, 2001

(86) PCT No.: PCT/JP01/00566

§ 371 (c)(1),
(2), (4) Date: Nov. 27, 2001

(87) PCT Pub. No.: WO01/58153

PCT Pub. Date: Aug. 9, 2001

(65) Prior Publication Data

US 2002/0154213 A1 Oct. 24, 2002

(30) Foreign Application Priority Data

Jan. 31, 2000 (JP) ....................................... 2000-023173
Jun. 8, 2000 (JP) ....................................... 2000-172659

(51) Int. Cl.[7] ........................... G06K 9/00; G01C 21/30

(52) U.S. Cl. ....................... 382/113; 382/305; 701/208; 348/143

(58) Field of Search ................................ 382/103, 113, 382/305, 312; 348/47, 143, 173; 701/201, 207, 208, 213; 707/1, 6

(56) References Cited

U.S. PATENT DOCUMENTS 6,215,914 B1 * 4/2001 Nakamura et al. .......... 382/284
6,289,278 B1 * 9/2001 Endo et al. ................. 701/208
6,342,917 B1 * 1/2002 Amenta ................... 348/207.1

FOREIGN PATENT DOCUMENTS

| | | |
|---|---|---|
| JP | A7248726 | 9/1995 |
| JP | A998323 | 4/1997 |
| JP | A9252454 | 9/1997 |
| JP | A10308917 | 11/1998 |
| JP | A11272164 | 10/1999 |
| JP | A2000339923 | 12/2000 |

* cited by examiner

*Primary Examiner*—Kanjibhai Patel
(74) *Attorney, Agent, or Firm*—Birch, Stewart, Kolasch & Birch, LLP

(57) ABSTRACT

An image recording medium (101) and a position-time recording medium (102) are provided in an image collecting device (10). In an image retrieving device (20), a matching section (24) allows image data read from the image recording medium (101) and position-time data read by a data reading section (21) to be matched with each other based upon time so as to generate an image database. An image pickup locus display processing section (32) retrieves for image data having its image-pickup position on a map within a map display section (28), and displays the image-pickup position as a locus. When a position on the map is specified by a map input section (29) by reference to the locus, image data in the vicinity of this position is reproduced by an image display processing section (33).

22 Claims, 46 Drawing Sheets

IMAGE WITH ANGLE DISTORTION

IMAGE IN WHICH ANGLE DISTORTION
HAS BEEN CORRECTED

IMAGE COLLECTING DEVICE, IMAGE RETRIEVING DEVICE, AND IMAGE COLLECTING AND RETRIEVING SYSTEM

This application is the national phase under 35 U.S.C. §371 of PCT International Application No. PCT/JP10/00566 which has an International filing date of Jan. 29, 2001, which designated the United States of America.

TECHNICAL FIELD

The present invention relates to an image collecting device, an image retrieving device, and an image collecting and retrieving system, which can collect picked-up images of various places, such as outdoor, indoor, under-sea, underground, sky, and space, retrieve the collected images in association with the picked up positions, reproduce and edit them.

BACKGROUND ART

Conventionally, there are cases in which: for example, in order to manage movements of cars and trucks, road conditions of various points are picked up by video cameras, and recorded in video tapes, and after these tapes have been brought back to the office, the images at the various points are specified, and reproduced, and in such cases, first, at the time of picking up those image, by utilizing the tape counters and timer counters attached to the camera, the shooter needs to memorize the image-pickup points and the count values in association with each other, and upon reproduction, the shooter reproduces images of the road conditions at desired points by reference to the recorded data.

However, if there are many image pickup points and long pickup periods, the management of the recorded data becomes complicated, and the editing processes require a great amount of time and workloads. In order to solve these problems, for example, GPS-use position image data collecting apparatus and a reproducing apparatus thereof, as shown in FIG. 48, has been disclosed in Japanese Patent Application Laid-Open No. 7-248726. In this apparatus, position data at image pickup points and image data are made to be matched with each other so that desired image data is easily reproduced.

Referring to FIG. 48, based upon GPS signals received by a GPS (Global Positioning System) antenna 301, a positional information detecting section 302 detects the latitude and longitude of a present position to form position data, and outputs this data to an address matching section 308. An image input processing section 304 outputs an image signal picked up by an image pickup device 303 to an image storing section 306 and also to the address information matching section 308. The image storing section 306 records the inputted image signal in an image recording medium 305 as image data together with image pickup time data. The address information matching section 308 forms an image managing database 307 in which the position data is made to be matched with recording addresses on an image recording medium in which the image data is recorded.

The image position specifying section 313 reads map information from a map information recording medium 309 to display a map, and the reproduced point is specified on this map. An address information conversion section 314 acquires a recording address of image data corresponding to the address of the point specified by the image position specifying section 313 by retrieving the image managing database, and outputs this to an image output processing section 316. The image output processing section 316 acquires image data corresponding to the recording address from the image storing section 306, and reproduces the image data thus acquired. Consequently, the image data at any desired point is immediately reproduced.

In this conventional GPS-use position image data collecting apparatus, however, the address information matching section 308 carries out the matching process between the recording address and the image-pickup position of the image data simultaneously with the acquisition of the image data and the positional information. Therefore, the image pickup device 303 for picking up the image data, the GPS antenna 301 and the positional information detection section 302 need to be connected through communication lines, etc. For this reason, for example, if a plurality of images are picked up when a plurality of vehicles are traveling side by side virtually at the same position, the devices, such as the above-mentioned image pickup device 303 and the positional information detecting section 302, need to be attached to each of the vehicles. As a result, the entire scale of the apparatus becomes larger, and it is not possible to carry out an efficient image pickup operation.

Moreover, in this conventional GPS-use position image data collecting apparatus, the position on the map is specified by the image position specifying section 313. However, the positional relationship with the position and the image data to be displayed is not clarified on the map, with the result that it is not possible to positively reproduce image data representing a desired picked-up position.

Furthermore, if the user wishes to reproduce image data between desired two points, and if a plurality of sequences of image data are used for the reproducing process, a problem arises because the connection between the sequences of the image data tends to be interrupted.

Moreover, if, by using a plurality of sequences of image data, images of vehicles, etc., passing through a crossing point such as a junction, are reproduced while one of the sequence of image data is being switched to the other sequence of image data, there is a case in which the shooting direction of one of the sequence of image data is different from the shooting direction of the other sequence of image data, and the resulting problem is that the picked-up subjects suddenly change at the crossing point, displaying poor images.

Furthermore, when unnecessary image data is contained in a sequence of picked-up images, an editing process for generating a new sequence of image data by removing such image data is carried out. However, complex work is required in specifying the image data area to be removed from the sequence of image data, resulting in a problem of poor operability.

If images are collected by loading the image pickup device on a vehicle, etc., since the moving speed of the vehicle is not necessarily constant due to, for example, the stoppage at a signal, redundant image data tends to be included in the picked up images, failing to carry out an efficient image data recording operation.

Moreover, not limited to the ground, there have been demands for positively specifying image data picked up at a roof of a tall building or at an underground shopping center on a map. Another demand is to positively indicate which portion on a map a building within a reproduced image is located. Still another demand is to know a difference to be caused in the scenery when a new building is placed within a specific position of a reproduced image. Furthermore, the user sometimes wishes to view the state of images that are currently being picked up at real time.

Therefore, the object of the present invention is to provide an image collecting device, an image retrieving device, and an image collecting and retrieving system, which easily collects image data by using a simple structure, properly specifies and reproduces the picked up image data, allows the user to accurately confirm the positional relationship between the reproduced image and the map, and easily carries out various processing treatments on the image data in a flexible manner.

DISCLOSURE OF THE INVENTION

An image retrieving device in accordance with the present invention comprises an image reading unit which reads a sequence of image data recorded with image pickup times; an image data holding unit which holds the sequence of image data that has been read by the image reading unit; an attribute information reading unit which reads attribute information containing at least image pickup positions where the sequence of image pickup data has been obtained and the image pickup times thereof; a matching unit which matches the sequence of image data held in the image data holding unit with the attribute information read by the attribute information reading unit based upon the image pickup times; an image database which holds the matching relationship that has been determined by the matching unit; a map data holding unit which holds map data; a map display processing unit which displays the map data on a map display unit based upon the map data; an image retrieving unit which retrieves the image database; a locus display processing unit which controls the image retrieving unit so as to retrieve image data having image pickup positions within a map displayed by the map display unit, and displays the retrieved pickup positions on the map as a locus; an image display unit which displays the sequence of image data; a position specifying unit which specifies a position of the map displayed on the map display unit; and an image processing unit which acquires image data corresponding to the image pickup position in the vicinity of the position specified by the position specifying unit from the image data holding unit, and reproduces and displays the resulting image data on the image display unit.

In accordance with this invention, first the image reading unit reads a sequence of image data recorded with image pickup times, and stores the sequence of image data in the image data holding unit. The matching unit allows the attribute information reading unit to read attribute information containing at least image pickup positions where the sequence of image pickup data has been obtained and the image pickup times thereof, matches the attribute information with the sequence of image data held in the image data holding unit based upon the image pickup times, and allows the image database section to hold the matching relationship as image database. The map display processing unit displays the map data on the map display unit based upon the map data held in the map data holding unit. Thereafter, the locus display processing unit allows the image retrieving unit to retrieve the image database for image data having pickup positions within the map displayed by the map display unit, and displays the retrieved image pickup positions on the map as a locus. Thereafter, when the position specifying unit specifies a position on the map, the image processing unit acquires image data corresponding to the image pickup position in the vicinity of the position specified by the position specifying unit from the image data holding unit, and reproduces and displays the resulting image data on the image display unit.

In the image retrieving device in accordance with the next invention, which relates to the above-mentioned invention, the attribute information further includes information related to the image pickup orientation, image pickup direction, image pickup angle or combinations of these.

In accordance with this invention, the attribute information is allowed to include information related to the image pickup orientation, image pickup direction, image pickup angle or combinations of these, and the resulting attribute information is held as the image database.

In the image retrieving device in accordance with the next invention, which relates to the above-mentioned invention, the locus display processing unit is further provided with a locus-type button display processing unit which allows the image retrieving unit to retrieve for a sequence of image data having image pickup positions within the map displayed by the map display unit, and displays a route formed by connecting the image pickup positions of the sequence of image data thus retrieved and a slide bar that slides on the route, and is constituted by an inputting button for indicating a reproduction start point of the image data on the map.

In accordance with this invention, the locus-type button display processing unit allows the image retrieving unit to retrieve for the sequence of image data having image pickup positions within the map displayed by the map display unit, displays a route formed by connecting the image pickup positions of the sequence of image data thus retrieved and a slide bar that slides on the route, and is constituted by an inputting button indicating a reproduction start point of the image data on the map, and allows an input unit to slide the inputting button on the map so that the image start point of the image data is specified.

The image retrieving device in accordance with the next invention, which relates to the above-mentioned invention, is further provided with a route searching unit which allows the image retrieving unit to retrieve for a sequence of image data located between two positions indicating the image pickup start and the image pickup end specified by the position specifying unit, generates a route between the two positions that passes through the image pickup positions indicated by the sequence of image data, displays the locus of the image pickup positions along the route on the map display unit, and, when an image pickup position is specified by the position specifying unit, displays image data on the route succeeding to the image pickup position.

In accordance with this invention, the route searching unit allows the image retrieving unit to retrieve for a sequence of image data located between two positions indicating the image pickup start and the image pickup end specified by the position specifying unit, generates a route between the two positions that passes through the image pickup positions indicated by the sequence of image data, displays the locus of the image pickup positions along the route on the map display unit, and, when an image pickup position is specified by the position specifying unit, displays image data on the route succeeding to the image pickup position.

In the image retrieving device in accordance with the next invention, which relates to the above-mentioned invention, when a plurality of sequences of image data are located on the route between the two positions, the pieces of image data on the route are connected, and reproduced and displayed.

In accordance with this invention, when a plurality of sequences of image data are located on the route between the two positions, the pieces of image data on the route are automatically connected by the image processing unit, and reproduced and displayed.

The image retrieving device in accordance with the next invention, which relates to the above-mentioned invention, is further provided with a junction image holding unit which holds a crossing point image picked up on the periphery of a crossing point at which sequences of image data intersect each other, a crossing-point database which holds the matching relationship in which the crossing-point image and the attribute information of the crossing-point image are matched with each other, and a connection interpolating unit which, when image data passing through the crossing point exists, retrieves the crossing-point database, and interpolates images on the periphery of the crossing point by using the crossing-point image held in the junction image holding unit.

In accordance with this invention, when image data passing through the crossing point exists, the connection interpolating unit retrieves the crossing-point database, and based upon the results of the retrieval, interpolates images on the periphery of the crossing point by using the crossing-point image held in the junction image holding unit.

The image retrieving device in accordance with the next invention, which relates to the above-mentioned invention, is further provided with an image editing unit which carries out an editing process including cutting and composing processes of the sequence of image data.

In accordance with this invention, the image editing unit carries out an editing process including cutting and composing processes of the sequence of image databased upon the locus displayed on the map display unit.

The image retrieving device in accordance with the next invention, which relates to the above-mentioned invention, is further provided with an image adjusting unit which carries out a thinning process or an interpolating process on the image data so that the image pickup position gaps between the respective pieces of image data constituting the sequence of image data are made virtually the same.

In accordance with this invention, the image adjusting unit carries out a thinning process or an interpolating process on the image data so that the image pickup position gaps between the respective pieces of image data constituting the sequence of image data are made virtually the same.

In the image retrieving device in accordance with the next invention, which relates to the above-mentioned invention, the map data holding unit holds three-dimensional map data, and the map display processing unit displays the three-dimensional map on the map display unit three-dimensionally based upon the three-dimensional map data.

In accordance with this invention, the map display processing unit is designed to display a three-dimensional map on the map display unit three-dimensionally based upon the three-dimensional map data.

In the image retrieving device in accordance with the next invention, which relates to the above-mentioned invention, the locus display processing unit displays the locus at three dimensional positions.

In accordance with this invention, the locus display processing unit is designed to display the locus at three dimensional positions on the three dimensional map with the locus corresponding to image pickup positions within the display range in the three-dimensional map displayed on the map display unit.

The image retrieving device in accordance with the next invention, which relates to the above-mentioned invention, is further provided with an image pickup position display processing unit which, based upon the attribute information, displays the image pickup range displayed on the image display unit on the map display unit.

In accordance with this invention, based upon the attribute information within the image database, the image pickup position display processing unit displays the image pickup range derived from the image pickup position displayed on the image display unit, on the map display unit.

The image retrieving device in accordance with the next invention, which relates to the above-mentioned invention, is further provided with a synchronization processing unit which provides a three-dimensional display having the same three-dimensional display position, direction and angle as the image pickup position, image pickup direction and image pickup angle of the image displayed on the image display unit, on the map display unit in synchronism with the image.

In accordance with this invention, the synchronization processing unit is designed to provide a three-dimensional display having the same three-dimensional display position, direction and angle as the image pickup position, image pickup direction and image pickup angle of the image displayed on the image display unit, on the map display unit in synchronism with the image.

The image retrieving device in accordance with the next invention, which relates to the above-mentioned invention, is further provided with an image position specifying unit which specifies a position on the display screen of the image display unit; and a three-dimensional position display processing unit which calculates the three-dimensional position corresponding to the position specified by the image position specifying unit based upon the image-pickup position, the image-pickup direction and the image-pickup angle of the image data displayed on the image display unit, and displays the resulting three-dimensional position on the map display unit.

In accordance with this invention, when the image position specifying unit specifies a position on the display screen of the image display unit, the three-dimensional position display processing unit calculates the three-dimensional position corresponding to the position specified by the image position specifying unit based upon the image-pickup position, the image-pickup direction and the image-pickup angle of the image data displayed on the image display unit, and displays the resulting three-dimensional position on the map display unit.

The image retrieving device in accordance with the next invention, which relates to the above-mentioned invention, is further provided with an image position specifying unit which specifies a position on the display screen of the image display unit; a three-dimensional model holding unit which holds a three-dimensional model; and a three-dimensional model image composing unit which composes the three-dimensional model into the image and for displaying the resulting image at the position specified by the image position specifying unit in a manner so as to match the image displayed on the image display unit.

In accordance with this invention, when the image position specifying unit specifies a position on the display screen of the image display unit, the three-dimensional model image composing unit composes the three-dimensional model into the image and displays the resulting image at the position specified by the image position specifying unit in a manner so as to match the image displayed on the image display unit.

The image retrieving device in accordance with the next invention, which relates to the above-mentioned invention, is further provided with a three-dimensional model and map composing unit which calculates a three-dimensional position corresponding to the position specified by the image position specifying unit based upon the image-pickup position, image-pickup direction and image-pickup angle of the image data displayed on the image display unit, and composes the three-dimensional model and the map and displays the resulting map at the three-dimensional position on the map displayed by the map display unit.

In accordance with this invention, the three-dimensional model and map composing unit calculates a three-dimensional position corresponding to the position specified by the image position specifying unit based upon the image-pickup position, image-pickup direction and image-pickup angle of the image data displayed on the image display unit, and composes the three-dimensional model into the map and displays the resulting map at the three-dimensional position on the map displayed by the map display unit.

An image collecting device in accordance with the next invention, is provided with an image recording unit which records a sequence of picked-up image data together with the image pickup times; a position acquiring unit which acquires attribute information containing at least an image pickup position and image pickup time; a position-time recording unit which records the attribute information acquired by the position acquiring unit; and a recording control unit which controls the image recording unit and the position-time recording unit to carry out the recording operations with the respective recording times being synchronous to each other.

In accordance with this invention, the recording control unit allows the image recording unit and the position-time recording unit to carry out the recording operations with the respective recording times being synchronous to each other.

An image collecting and retrieving system in accordance with the next invention is provided with at least one image collecting device which includes an image recording unit which records a sequence of picked-up image data together with the image pickup times; an image reading unit which reads the sequence of image data; a position acquiring unit which acquires attribute information containing at least an image pickup position and image pickup time; a position-time recording unit which records the attribute information acquired by the position acquiring unit; a recording control unit which controls the image recording unit and the position-time recording unit to carry out the recording operations with the respective recording times being synchronous to each other; and a transmission processing unit which successively transmits the sequence of image data read by the image reading unit and the attribute information, and an image retrieving device, which is connected to the at least one image collecting device, and which includes a receiving processing unit which receives the sequence of image data and the attribute information transmitted from the at least one image collecting device; an image data holding unit which holds the sequence of image data received by the receiving processing unit; an attribute information holding unit which holds the attribute information received by the receiving processing unit; a matching unit which matches the sequence of image data held in the image data holding unit with the attribute information read by the attribute information reading unit based upon the image pickup times; an image database which holds the matching relationship that has been determined by the matching unit; a map data holding unit which holds map data; a map display processing unit which displays the map data on a map display unit based upon the map data; an image retrieving unit which retrieves the image database; a locus display processing unit which allows the image retrieving unit to retrieve for image data having image pickup positions within a map displayed by the map display unit, and displays the retrieved pickup positions on the map as a locus; an image display unit which displays the sequence of image data; a position specifying unit which specifies a position of the map displayed on the map display unit; and an image processing unit which acquires image data corresponding to the image pickup position in the vicinity of the position specified by the position specifying unit from the image data holding unit, and reproduces and displays the resulting image data on the image display unit.

In accordance with this invention, on the at least one image collecting device side, first, the recording control unit allows the image recording unit and the position-time recording unit to carry out the respective recording operations with their recording times being synchronous to each other. Thereafter, the transmission processing unit successively transmits the sequence of image data read from the image recording unit by the image reading unit and the attribute information recorded by the position-time recording unit to the image retrieving device side. On the image retrieving device side, the receiving processing unit receives the sequence of image data and the attribute information, transmitted from the at least one image collecting device, and makes the image data holding unit hold the sequence of image data and the attribute information holding unit to hold the attribute information. Thereafter, the matching unit matches the sequence of image data held in the image data holding unit with the attribute information held in the attribute information holding unit based upon the image pickup times, and holds the matching relationship as an image database. The map display processing unit displays the map data on the map display unit based upon the map data held in the map data holding unit. Thereafter, the locus display processing unit allows the image retrieving unit to retrieve the image database for image data having pickup positions within the map displayed by the map display unit, and displays the retrieved image pickup positions on the map as a locus. Thus, when the position specifying unit specifies a position on the map, the image processing unit acquires image data corresponding to the image pickup position in the vicinity of the position specified by the position specifying unit from the image data holding unit, and reproduces and displays the resulting image data on the image display unit.

In the image collecting and retrieving system in accordance with the next invention, which relates to the above-mentioned invention, the above-mentioned at least one image collecting device is further provided with a transfer adjusting unit which thins the image data to be transmitted so as to adjust the amount of data to be transmitted. 20 In accordance with this invention, the image adjusting unit thins the image data to be transmitted so that the amount of data to be transmitted is adjusted.

In the image collecting and retrieving system in accordance with the next invention, which relates to the above-mentioned invention, the image retrieving device is further provided with a communication destination selection unit which switches the receipt of the sequence of image data and attribute information transmitted from the at least one image collecting device in a time-divided manner.

In accordance with this invention, the communication destination selection unit switches the receipt of the sequence of image data and attribute information transmitted from the at least one image collecting device in a time divided manner.

The image retrieving device in accordance with the next invention, which relates to the above-mentioned invention, is further provided with a map attribute retrieving unit which retrieves the map data holding unit for map attribute information corresponding to the image pickup position at which the image data is obtained; and a map attribute information display unit which displays the map attribute information.

In accordance with this invention, the map attribute retrieving unit retrieves the map data holding unit for map attribute information corresponding to the image pickup position at which the image data is obtained, and the map attribute information display unit displays the map attribute information.

The image retrieving device in accordance with the next invention, which relates to the above-mentioned invention, is further provided with a map retrieving unit which retrieves a position on the two-dimensional map based upon the specified map attribute.

In accordance with this invention, the image database has preliminarily recorded map attribute information such as a name of a place, retrieved by the map attribute retrieving unit, the map retrieving unit retrieves for a position on the two-dimensional map based upon the map attribute information, outputs the resulting information to the position specifying unit, and the image processing unit reproduces and displays the image data picked up from the position specified by the position specifying unit.

The image retrieving device in accordance with the next invention, which relates to the above-mentioned invention, is further provided with a subject-position matching unit which matches the subject position of an image and the pickup position thereof with each other.

In accordance with this invention, the subject-position matching unit matches the subject position of an image and the pickup position thereof with each other, the image database holds the results of the matching process, the position specifying unit inputs a position on the map, the image processing unit reproduces and displays an image corresponding to the subject at the position on the map based upon the results of the matching process.

The image retrieving device in accordance with the next invention, which relates to the above-mentioned invention, is further provided with a subject angle detection unit which detects an angle between the subject face of an image and the lens face of the image collecting device for collecting the sequence of image data; and an image angle correction unit which corrects the distortion of the image due to the angle with respect to the image data.

In accordance with this invention, the subject angle detection unit detects an angle between the subject face of an image and the lens face of the image collecting device for collecting the sequence of image data; and the image angle correction unit corrects the distortion of the image resulting from the case in which this angle is not a right angle, based upon the above-mentioned angle, and the image display unit is allowed to display an image in which the distortion has been corrected.

The image retrieving device in accordance with the next invention, which relates to the above-mentioned invention, and which collects the sequence of image data with the lens angle having a known lens angle difference with respect to the reference direction, is further provided with an image angle correction unit which corrects the distortion of an image resulting from the difference in the lens angle.

In accordance with this invention, if, for example, the image collecting device is set to have the horizontal direction as the reference direction, an image is collected in a state in which it has the known lens angle difference, for example, in a manner so as to have an upward direction with a predetermined angle, and the image angle correction unit corrects the distortion of the image caused by the lens angle, and the image display unit displays the image in which the distortion has been corrected.

The image retrieving device in accordance with the next invention, which relates to the above-mentioned invention, is further provided with a locus position correction unit which corrects image pickup position information derived from the image data on a road of the map.

In accordance with this invention, the locus position correction unit corrects the image pickup position of the image pickup position information at a position on a road of the map, and the locus display processing unit displays the corrected image pickup position on the map as a locus.

The image retrieving device in accordance with the next invention, which relates to the above-mentioned invention, and which has all-around image data obtained by a fish-eye lens as the sequence of image data, is further provided with an image upright correction unit which extracts an image in a specified direction from the all-around image data and for correcting it into an upright image.

In accordance with this invention, the image collecting device collects all-around image data obtained from a video camera provided with a fish-eye lens, and the image upright correction unit extracts an image in a specified direction from the all-around image data and corrects it into an upright image so that the image display unit displays the upright image.

The image retrieving device in accordance with the next invention, which relates to the above-mentioned invention, and which has stereoscopic image data obtained by using two stereoscopic lenses spaced with a predetermined gap as the sequence of image data, is further provided with a polarization processing unit which carries out a polarizing process on each piece of the stereoscopic image data.

In accordance with this invention, the image collecting device collects stereoscopic image data obtained by using two stereoscopic lenses spaced with a predetermined gap, and the polarization processing unit carries out a polarizing process on the stereoscopic image data so that the image display unit displays the stereoscopic image.

The image retrieving device in accordance with the next invention, which relates to the above-mentioned invention, is further provided with a subject-distance acquiring unit which detects the distance between the subject face of an image and the lens face of the image collecting device for collecting the sequence of image data; and an image size correction unit which corrects a difference in the image size caused by the distance with respect to the image data.

In accordance with this invention, the subject-distance acquiring unit detects the distance between the subject face of an image and the lens face of the image collecting device, and the image size correction unit corrects the image size to a size obtained when picked up with a fixed distance from the subject based upon the above-mentioned distance so that the image display unit displays the image that has been corrected in its size.

The image retrieving device in accordance with the next invention, which relates to the above-mentioned invention, is further provided with: a junction detection unit which detects a crossing point from the map data and a junction data holding unit which holds the data of the crossing point detected by the junction detection unit, and the image editing unit carries out a cutting process of the sequence of image databased upon the crossing-point data held by the junction data holding unit.

In accordance with this invention, the junction detection unit detects a crossing point from the map data, and the junction data holding unit holds the crossing-point data, and the image editing unit carries out a cutting process on the sequence of image data at the crossing point.

In the image collecting and retrieving system in accordance with the next invention, which relates to the above-mentioned invention, the image retrieving device is further provided with a collection instructing unit which gives instructions for collecting operations including the start and finish of the image collection to the image collecting device, and the image collecting device is further provided with an image collection control unit which controls the image collecting device based upon the collection instruction by the collection instructing unit.

In accordance with this invention, the collection instructing unit installed in the image retrieving device gives instructions such as the start and finish of the image collection, and a communication network transfers the instruction to the image collecting device, and the image collection control unit installed in the image collecting device controls the image collecting device based upon the instruction.

BEST MODE FOR CARRYING OUT THE INVENTION

Referring to attached Figures, the following description will discuss an image collecting device, an image retrieving device and an image collecting and retrieving device in accordance with embodiments of the present invention in detail.

First Embodiment

Figure 1:
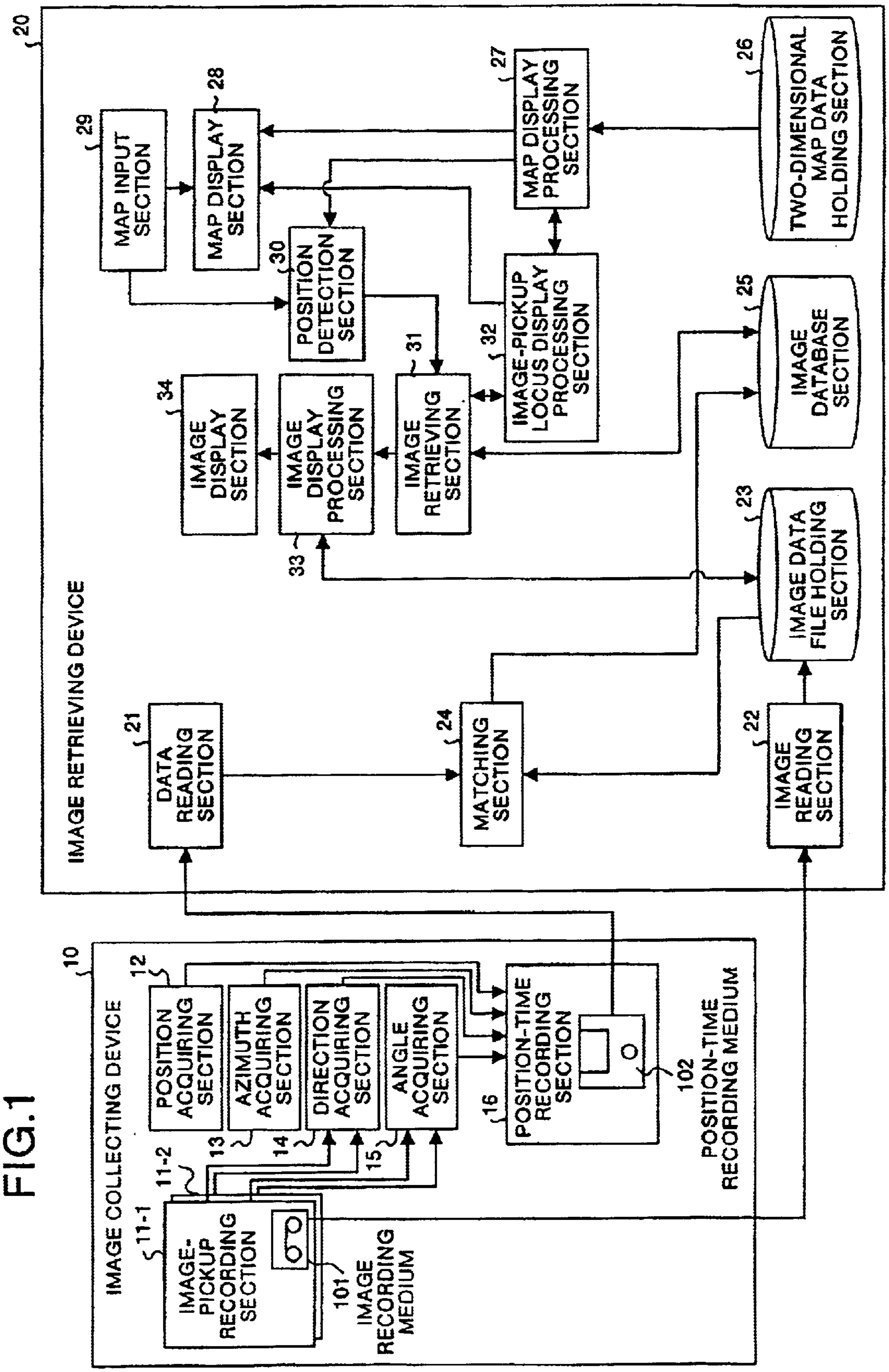
FIG. 1 is a block diagram that shows a construction of an image collecting and retrieving system in accordance with a first embodiment of the present invention.

FIG. 1 is a block diagram that shows a construction of an image collecting and retrieving system in accordance with a first embodiment of the present invention. As shown in FIG. 1, the image collecting and retrieving system is constituted by an image collecting device 10 and an image retrieving device 20.

The image collecting device 10, which is realized by a video camera, etc., is provided with image-pickup recording sections 11-1, 11-2 for picking up images, and each of the image-pickup recording sections 11-1, 11-2 records a sequence of image data on an image recording medium 101 that is a portable recording medium such as a video tape, together with image-pickup times.

A position acquiring section 12, which is realized by a GPS device, acquires the present position and the present time based upon information transmitted from a GPS-use satellite every second. An azimuth acquiring section 13, which is realized by an earth magnetization azimuth sensor for detecting the azimuth by determining the earth magnetization, acquires the present azimuth. An azimuth acquiring section 14 acquires an image pickup direction (upward, downward, rightward, leftward) at the time of an image pickup operation that is detected by the respective image-pickup recording sections 11-1, 11-2. An angle acquiring section 15 acquires an image-pickup angle (image angle) at the time of an image pickup operation that is detected by the respective image pickup recording sections 11-1, 11-2.

A position-time recording section 16 records the present position and the present time acquired by the position acquiring section 12, the present azimuth acquired by the azimuth acquiring section 13, the image-pickup direction acquired by the direction acquiring section 14 and the image-pickup angle acquired by the angle acquiring section 15 in a position-time recording medium 102 that is a portable recording medium such as a floppy disk, as position-time data. The position-time data, recorded in the position-time recording section 102 by the position-time recording section 16, has a unit of a sequence of image data from the image pick-up start to the image pick-up end as one file (position-time file F102).

The image retrieving device 20 is provided with an image reading section 22. The image reading section 22 reads a sequence of image data recorded in the image recording medium, and allows an image data file holding section 23 to hold the resulting data. At this time, the image-pickup time is also held together with the sequence of image data. With respect to the image-pickup time, codes of the image-pickup time, referred to as time code, are recorded on respective image data (respective frames), and these time codes are read. The sequence of image data, held in the image data file holding section 23, is digital data which allows desired image data to be immediately outputted. Moreover, the sequence of image data is held with a unit of a sequence of image data being set as one file (image data file F101). If a plurality of sequences of image data are simultaneously read, the respective sequences of image data are held with the respective sequence of image data having different file names.

A matching section 24 extracts a file of a sequence of image data, which corresponds to a file of position-time data read from the position-time recording medium 102 by the data reading section 21, from the image data file holding section 23, and generates an image database in which the position-time data and the sequence of image data are matched with each other based upon the image-pickup time (present time) to store this in an image database section 25.

Figure 2:
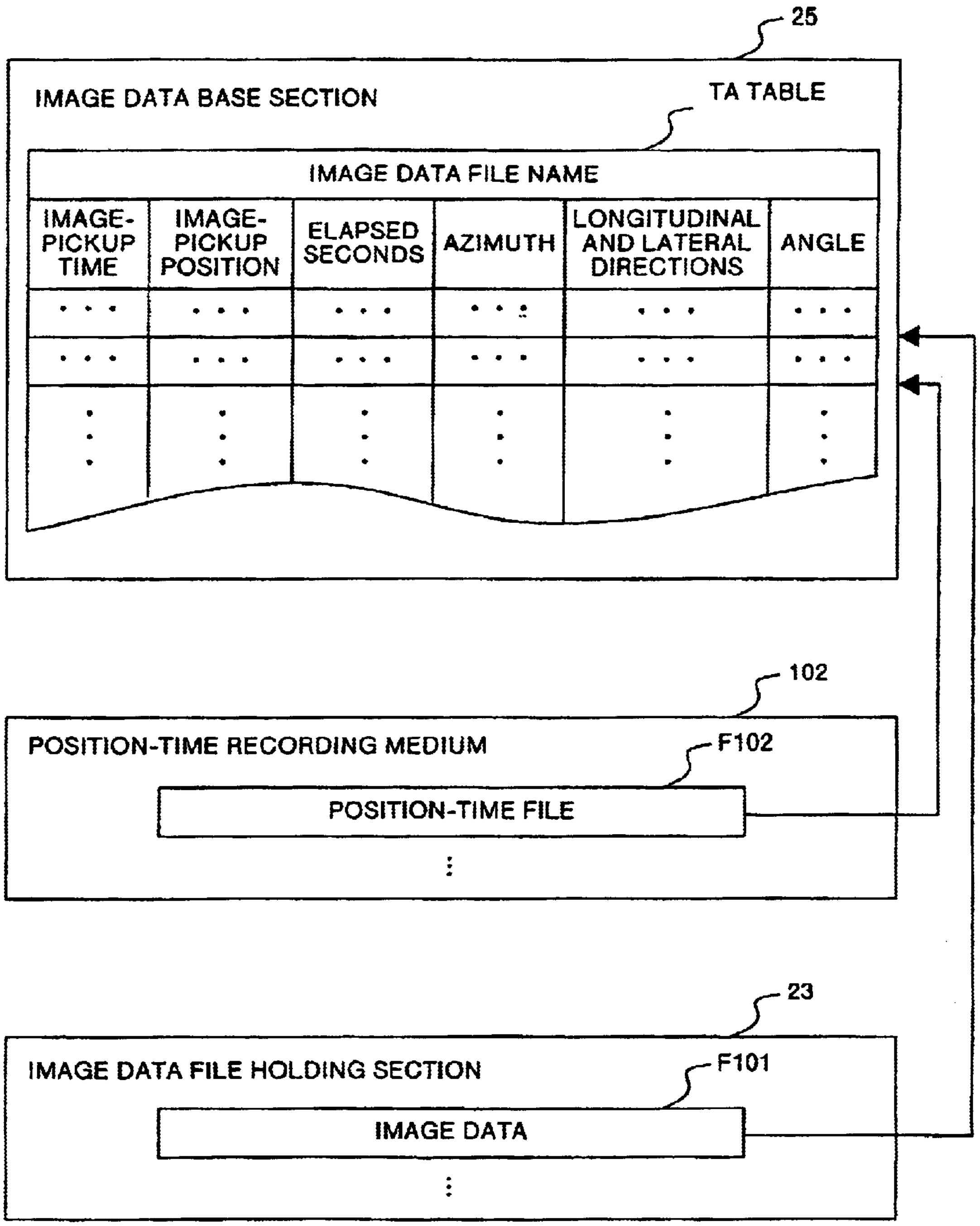
FIG. 2 is a drawing that shows the contents of data in an image database section shown in FIG. 1.

As shown in FIG. 2, the image database section 25 stores the matching relationship between the position-time data and the sequence of image data as a table TA. One table TA stores an image data file name that is generated for each file (image data file F101) of the sequence of image data, and represents a file name of the sequence of image data. The matching relationship is recorded as an image database that is arranged in the order of time, with the image-pickup start time of the image data file and a unit of elapsed seconds therefrom being stored as one set. In other words, the image-pickup time of the image data and the image-pickup time (present time) of the position-time data are made coincident with each other, and the image-pickup position, elapsed seconds, azimuth, longitudinal and lateral directions, angle, etc. are recorded in the image database every second in the order of time.

A two-dimensional map data holding section 26 holds two-dimensional map data, and the two-dimensional map data is made in association with the two-dimensional information of latitude and longitude. For example, the two-dimensional map data is electronic map data of 1/2500, issued by the Geographical Survey Institute. A map display section 28, which is realized by a CRT display, etc., outputs and displays a two-dimensional map. A map display processing section 27 acquires corresponding two-dimensional map data from the two-dimensional map data holding section 26, and displays the resulting map on the map display section 28.

A map input section 29, which is realized by a pointing device such as a mouse, is used for inputting and specifying a position on the display screen of the map display section 28. The position detection section 30 detects two-dimensional information consisting of the latitude and longitude of the position specified by the map input section 29.

An image retrieving section 31 retrieves the image database within the image database section 25. An image pickup locus display processing section 32 acquires a two-dimensional range displayed on the map display section 28, and retrieves image data having image positions within the two-dimensional range so that the retrieved image positions are displayed on the map display section 28 as a locus.

The image retrieve section 31 acquires the position specified by the map input section 29 from the position detection section 30, also acquires the name of an image data file having an image pickup position closest to the specified position and the elapsed seconds corresponding to the image pickup position by retrieving the image database section 25, and outputs the resulting data to the image display processing section 33.

The image display processing section 33 receives the name of an image data file and the elapsed seconds corresponding to the image pickup position and acquires the image data file having the image data file name from the image data file holding section 23 so that display image data succeeding to the image data corresponding to the elapsed seconds is outputted and displayed on the image display section 34.

Figure 3:
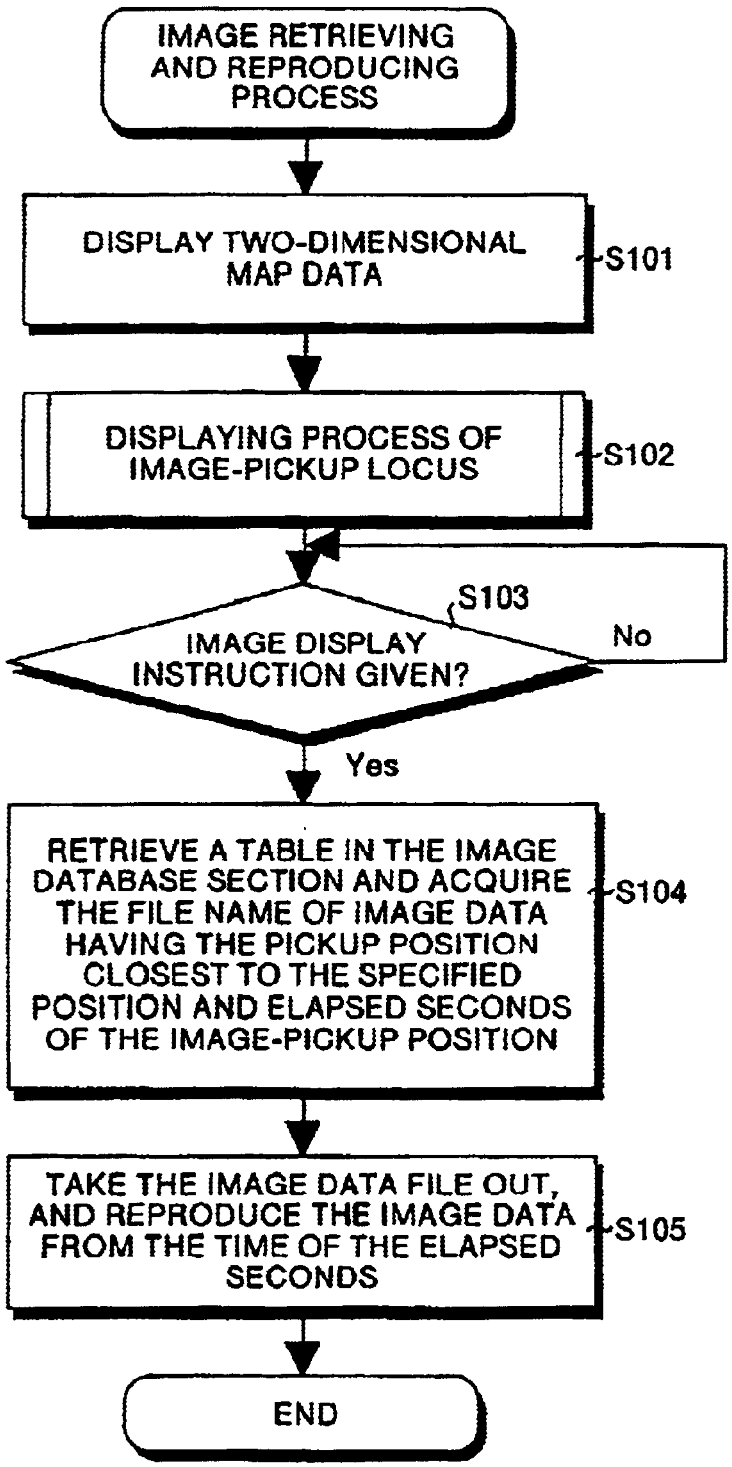
FIG. 3 is a flow chart that shows a sequence of retrieving and reproducing processes of images carried out by the image retrieving device shown in FIG. 1.

Referring to a flow chart shown in FIG. 3, an explanation will be given of a sequence of image retrieving and reproducing processes. Referring to FIG. 3, upon application of power to the image retrieving device 20, the map display processing section reads a predetermined two-dimensional map data from the two-dimensional map data holding section 26 so that the two-dimensional map is outputted and displayed on the map display section 28 (step S101).

Figure 4:
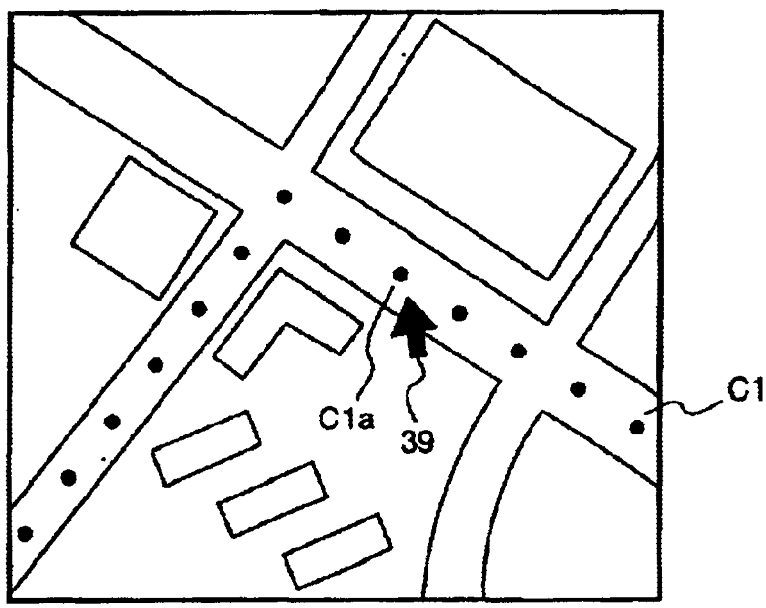
FIG. 4 is a drawing that shows one example of a display screen of a map display section on which a locus of image pickup positions is displayed.

Thereafter, the image pickup locus display processing section 32 acquires the display range of the two-dimensional map displayed on the map display section 28 from the map display processing section 27, and acquires image pickup positions within the display range from the image database section 25 through the image retrieve section 31 so that all the image pickup positions are outputted and displayed on the map display section 28 (step S102). For example, FIG. 4 shows one example of a two-dimensional map displayed on the map display section 28, and a plurality of black points (loci) indicating the image pickup positions are displayed on this two-dimensional map.

Then, the image retrieve section 31 makes a judgment as to whether or not the map input section 29 has specified a position for an image display through the position detection section 30 (step S103). For example, if the map input section 29 specifies the proximity of a locus C1*a* by using a cursor 39 shown in FIG. 4, the position detection section 30 detects the position specified by the cursor 39, that is, the position on the two-dimensional map, and outputs the position to the image retrieve section 31.

Upon receipt of the specification of the image display (step S103, YES), the image retrieve section 31 retrieves the table of the image database section 25, acquires the name of image data file having image data of an image pickup position Cla closest to the image pickup position specified by the cursor 39 and elapsed seconds corresponding to this image pickup position, and outputs the resulting data to the image display processing section 33 (step S104).

The image display processing section 33 acquires the image data file having the inputted image data file name from the image data file holding section 23, and carries out a process for displaying image data succeeding to the image data corresponding to the inputted elapsed seconds on the image display section 34 (step S105), thereby completing the sequence of processes.

In accordance with the first embodiment, sequences of image data picked up by the image pickup recording sections 11-1, 11-2 and image pickup positions acquired by the position acquiring section 12 are managed independently so that even the single position acquiring section 12 is allowed to simultaneously acquire plurality of sequences of image data, and to make them matched with each other. Moreover, in addition to the display of the two-dimensional map, the image pickup locus display processing section 32 displays the locus of image pickup positions on the two-dimensional map so that the user is allowed to positively select and specify desired image data.

Second Embodiment

A second embodiment of the present invention will now be explained. In the first embodiment, the locus C1 is displayed and outputted on the two-dimensional map as a black point so that the user can easily select and specify desired image data. However, in the second embodiment, a slide bar is displayed on the locus of a sequence of image data as a user interface so that the operability for selecting and specifying desired image data is further improved.

Figure 5:
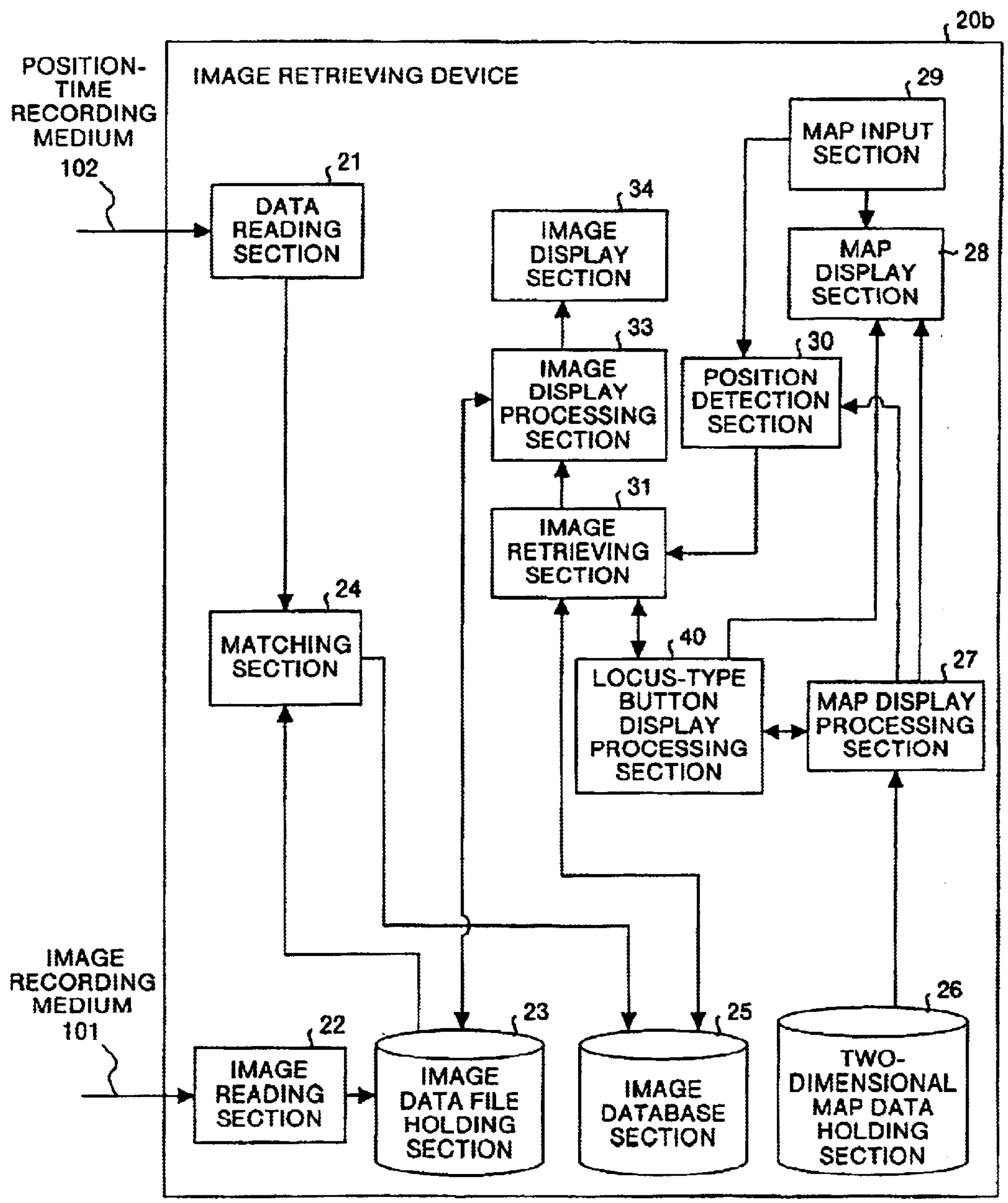
FIG. 5 is a block diagram that shows a construction of an image retrieving device in accordance with a second embodiment of the present invention.

FIG. 5 is a block diagram that shows a construction of an image retrieving device in accordance with the second embodiment of the present invention. As shown in FIG. 5, this image retrieving device 20*b* is provided with a locus-type button display processing section 40 in place of the image pickup locus display processing section 32 of the first embodiment. The other structures are the same as those of the first embodiment, and the same elements are indicated by the same reference numbers. The image pickup locus display processing section 32 and the locus-type button display processing section 40 may be used in a combined manner.

In the same manner as the image pickup display processing section 32, when the two-dimensional map is displayed on the map display section 28 by the map display processing section 27, the locus-type button display processing section 40 acquires a display range of the two-dimensional map displayed on the map display section 28 from the map display processing section 27. Upon acquiring the display range of the two-dimensional map, the locus-type button display processing section 40 retrieves the image database section 25 to acquire the image pickup positions within the display range so that a slide bar 41 having a route of the image pickup positions as a locus is displayed on the two dimensional map in a unit of each sequence of image data.

Figure 6:
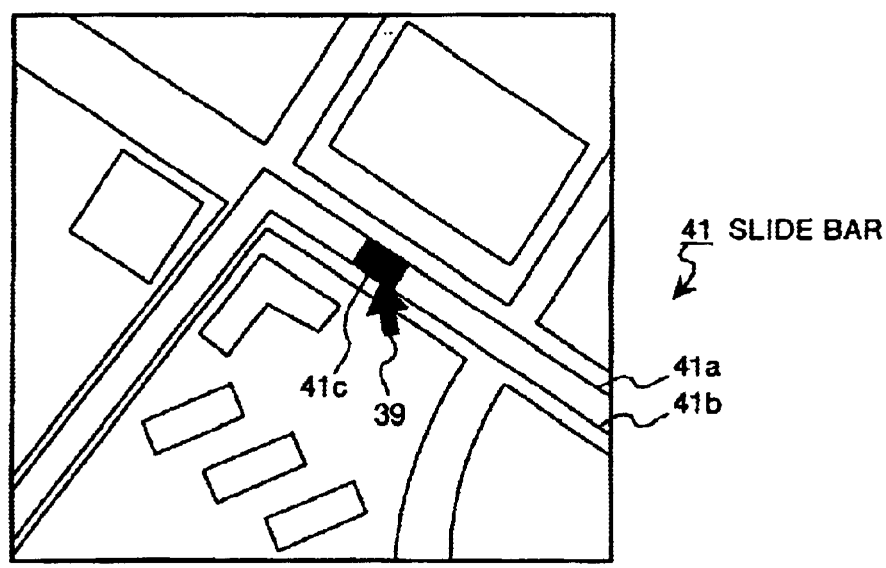
FIG. 6 is a drawing that shows one example of a display screen of the map display section on which a slide bar is displayed.

As shown in FIG. 6, the slide bar 41 is a user interface in which two lines 41*a*, 41*b* like rails are drawn along the image pickup positions in the order of time, with a square button 41*c* placed between the two lines 41*a*, 41*b*, so that the button 41*c* is allowed to freely shift on the locus formed by the two lines 41*a*, 41*b*.

The button 41*c* on the slide bar 41 is placed on the two-dimensional map, and the position of the button 41*c* represents a start point of desired image data. The shift of the button 41*c* is carried out by dragging and releasing it by using a mouse, etc., for operating the cursor 39.

When the position of the button 41c on the slide bar 41 is changed by the map input section 29, the position detection section 30 detects the change in the position of the button 41c so that the changed position is outputted to the image retrieving section 31. The image retrieving section 31 retrieves the table of the image database section 25 to acquire the image data file name of image data located at the position specified by the button 41c and elapsed seconds corresponding to the image pickup position, and outputs the resulting information to the image display processing section 33.

The image display processing section 33 acquires the image data file having the inputted image data file name from the image data file holding section 23, and carries out a process for displaying image data succeeding to the image data corresponding to the inputted elapsed seconds on the image display section 34.

In accordance with the second embodiment, the locus-type button display processing section 40 displays the slide bar serving as a user interface for specifying a desired image start point on the two-dimensional map. Therefore, it is possible to accurately specify a desired image start point.

Third Embodiment

A third embodiment of the present invention will now be explained. In the first embodiment, only the image start point is specified by the map input section 29 so as to reproduce the image data succeeding the specified image position. However, in this third embodiment, a locus forming a route between two points specified on the two-dimensional map is displayed, and image data starting from a position specified on this route is reproduced along this route.

Figure 7:
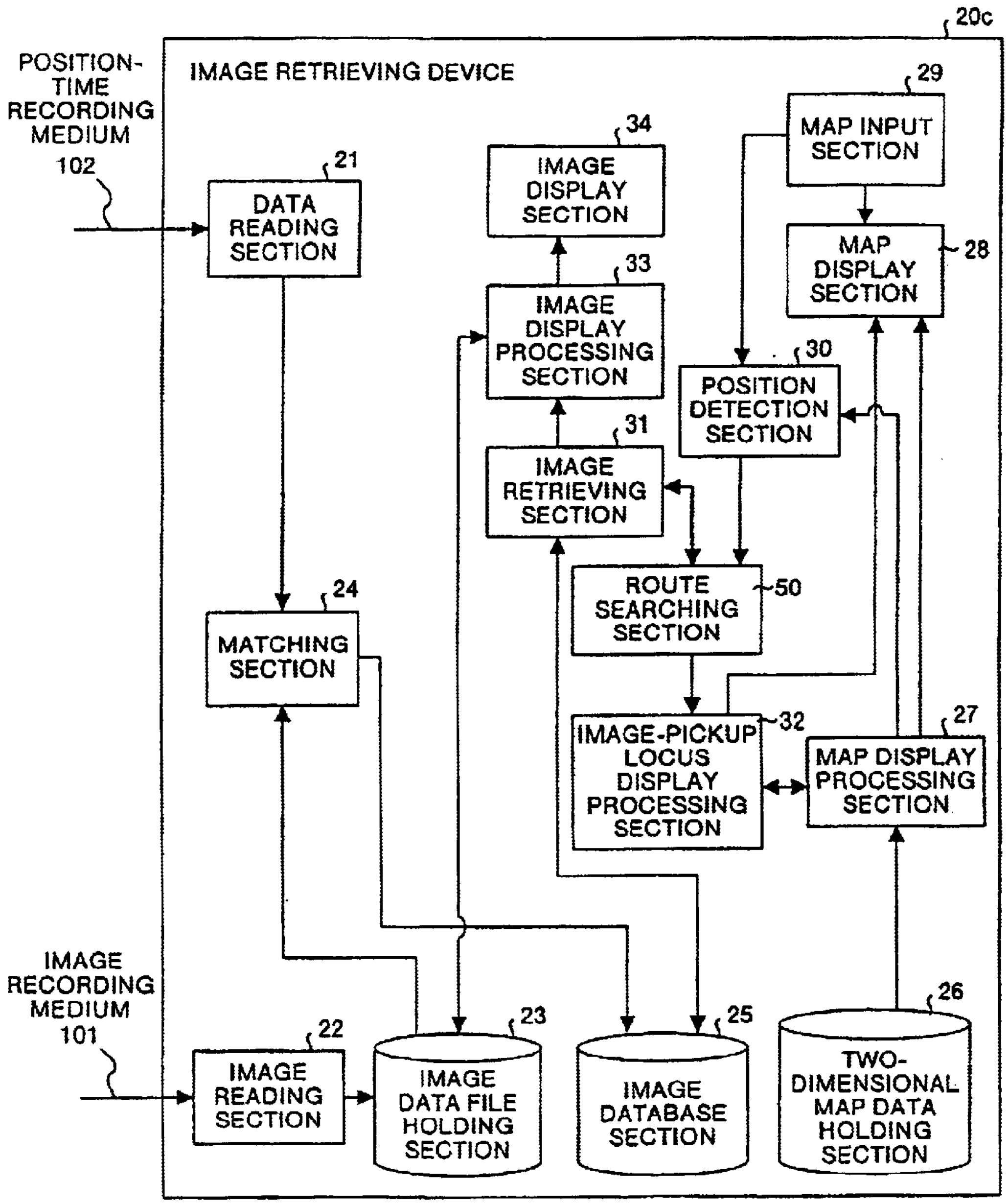
FIG. 7 is a block diagram that shows a construction of an image retrieving device in accordance with a third embodiment of the present invention.

FIG. 7 is a block diagram that shows a construction of an image retrieving device in accordance with the third embodiment of the present invention. As shown in FIG. 7, this image retrieving device 20c has an arrangement in which a route searching section 50 is further added to the image retrieving device 20 shown in the first embodiment. The other structures are the same as those of the first embodiment, and the same elements are indicated by the same reference numbers.

Upon receipt of an start point and an end point specified by the map input section 29 through the position detection section 30, the route searching section 50 generates a route formed by loci of image-pickup positions located between the start point and the end point, and displays the image-pickup positions forming this route on the map display section 28. When the position detection section 30 specifies a position indicating the start of image, the route searching section 50 reproduces image data succeeding the image-pickup position on the route corresponding to this position, along this route.

Figure 8:
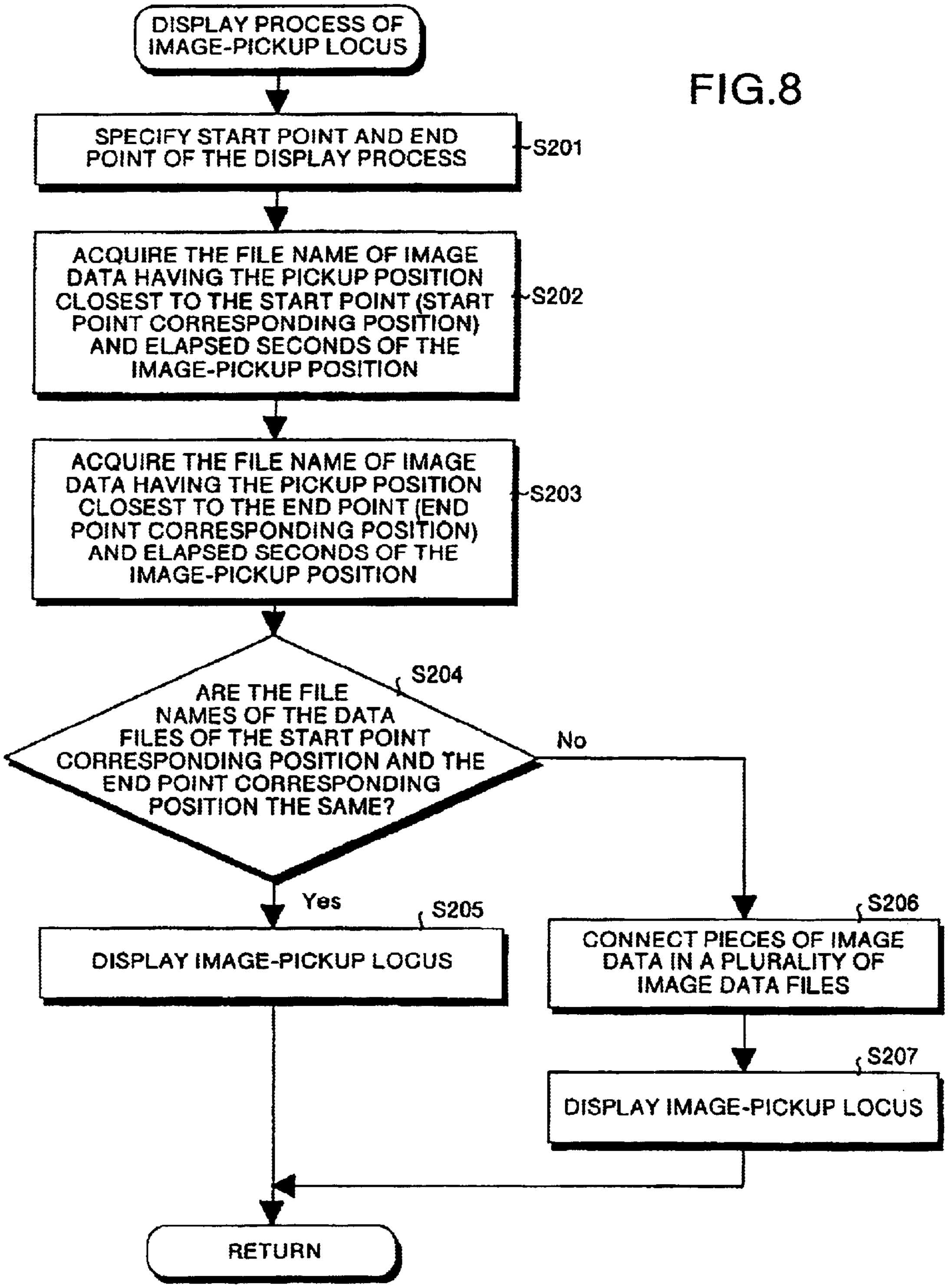
FIG. 8 is a flow chart that shows a sequence of displaying processes of an image pickup locus carried out by the image retrieving device shown in FIG. 7.

Referring to a flow chart shown in FIG. 8, an explanation will be given of a sequence of display processes of the image-pickup locus by the route searching section 50. Referring to FIG. 8, the map input section 29 specifies tm the start point and end point for indicating a route on a a two-dimensional map so as to display a route formed by loci (step S201).

The route searching section 50 acquires the name of an image data file having image data with an image-pickup position (position corresponding to the start point) closest to the start point and the elapsed seconds of this image-pickup position from the image database section 25 through the image retrieving section 31 (step S202). Moreover, the route searching section 50 also acquires the name of an image data file having image data with an image-pickup position (position corresponding to the end point) closest to the end point and elapsed seconds of this image-pickup position from the image database section 25 through the image retrieving section 31 (step S203).

Then, the route searching section 50 makes a judgment as to whether or not the name of the image data file having the initial point corresponding position and the name of the image data file having the end point corresponding position are the same (step S204). If the initial point corresponding position and the end point corresponding position are located in the same image data file (step S204, YES), the image-pickup positions from the initial point corresponding position to the end point corresponding position are outputted to the image-pickup locus display processing section 32 so that the image-pickup locus display processing section 32 displays these image pickup positions on the map display section 28 (step S205), there by completing the sequence of processes.

In contrast, if the initial point corresponding position and the end point corresponding position are not located in the same image data file (step S204, NO), a route formed by connecting image-pickup positions of a plurality of image data files is generated (step S206). Thereafter, the route searching section 50 outputs the image-pickup positions from the initial point corresponding position to the end point corresponding position to the image-pickup locus display processing section 32 so that the image-pickup locus display processing section 32 displays these image pickup positions on the map display section 28 (step S207), thereby completing the sequence of processes.

Figure 9:
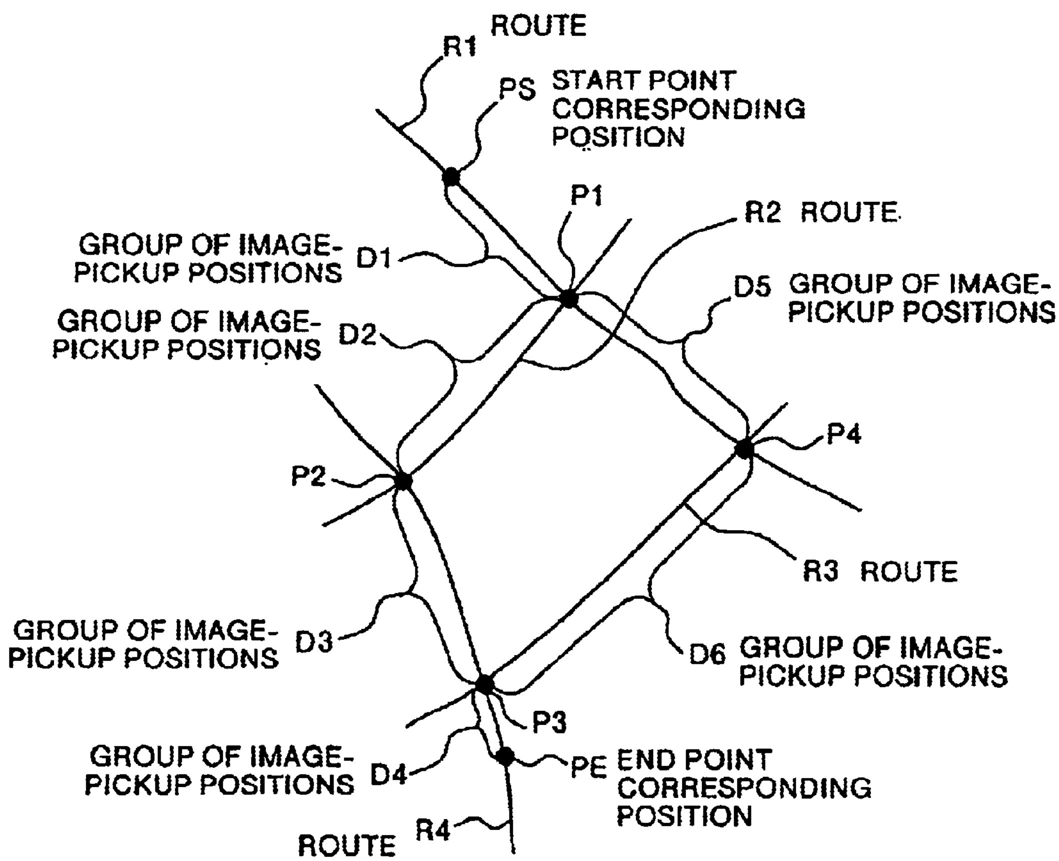
FIG. 9 is an explanatory drawing that shows one example of a route connection carried out by a route searching section.

FIG. 9 is an explanatory drawing that shows one example of the route generating process if the initial point corresponding position and the end point corresponding position are not located in the same image data file. Referring to FIG. 9, on a two-dimensional map, there are four image data files including routes R1, R4 descending to the right and routes R2, R3 descending to the left. If an initial point corresponding position PS and an end point corresponding position PE are specified, the route searching section 50 retrieves for all the image-pickup positions succeeding the initial point corresponding position PS, and makes a judgment as to whether or not there is any image data file that has an image-pickup position located within a predetermined range from any one of the image-up positions, and is different from the image data file of the route R1.

Referring to FIG. 9, at image-pickup position P1, there is an image data file of route R2 that has image-pickup positions within a predetermined range from the image-pickup position P1. The image-pickup position P1 and the image-pickup positions within the predetermined range are located at virtually the same position, it is assumed that the image-pickup positions within the predetermined range are virtually identical to the image-pickup position P1. The route searching section 50 stores a group of image-pickup positions D1 from the initial point corresponding position PS to the image-pickup position P1 serving as a reproduction stop position.

The route searching section 50 further retrieves for all the image-pickup positions succeeding the image-pickup position P1, and makes a judgment as to whether or not there is any image-pickup position of another image data file that is located within a predetermined range from any one of the image-pickup positions. With respect to the image data files succeeding the image-pickup position P1, there are image data files of the route R1 and the route R2. Therefore, processes are carried out on the respective image data files. With respect to the image data file of the route R1, at image-pickup position P4, it detects image-pickup positions of the image data file of the route R3, and stores a group of image-pickup positions D5 from the image-pickup position P1 to the image-pickup position P4. Moreover, with respect to the image data file of the route R2, at image-pickup position P2, it detects image-pickup positions of the image data file of the route R4, and stores a group of image-pickup positions D2 from the image-pickup position P1 to the image-pickup position P2.

Moreover, with respect to the image data files of the route R3 and route R4, it detects image-pickup position P3 respectively, and stores a group of image-pickup positions D6 from the image-pickup position P4 to the image-pickup position P3 as well as a group of image-pickup positions D3 from the image-pickup position P2 to the image-pickup position P3 respectively. Thereafter, at the route R4, it detects the end point corresponding position PE from the image-pickup position P3, and stores a group of image-pickup positions D4 from the image-pickup position P3 to the end point corresponding position PE. Then, the route searching section 50 outputs the stored groups of image-pickup positions D1 to D6 to the image-pickup locus display processing section 32. The image-pickup locus display processing section 32 displays the groups of image-pickup positions D1 to D6 on the map display section 28 as loci.

Based upon the loci of the groups of image-pickup positions D1 to D6 displayed on the display screen on the map display section 28 in this manner, when the user specifies a position in the proximity of any one of the loci as an image start point through the map input section 29, an image-pickup position in the proximity of the specified position is selected, and image data on the route succeeding this image-pickup position is reproduced.

In accordance with the third embodiment, only image-pickup positions on a route between the initial point corresponding position and the end point corresponding position are displayed as loci, and image data can be reproduced from any desired image-pickup position on this route along the route; thus, it is possible to accurately specify desired image data more easily so as to be reproduced. Moreover, even if the initial point corresponding position and the end point corresponding position are located in different image files, it is possible to search for the route automatically, and to reproduce the images as if they were continuous images.

Fourth Embodiment

A fourth embodiment of the present invention will now be explained. In the third embodiment, when image-pickup routes of a plurality of image data files intersect each other, adjacent mage-pickup positions of the respective image-pickup data files are connected so that an image-pickup route connecting the respective image-pickup data files is formed. However, in the fourth embodiment, in order to smoothly reproduce images at the crossing point connecting the different image data file, image data of the crossing point, which has been preliminarily picked up, are used so as to interpolate the image at the time of shifting through the crossing point.

Figure 10:
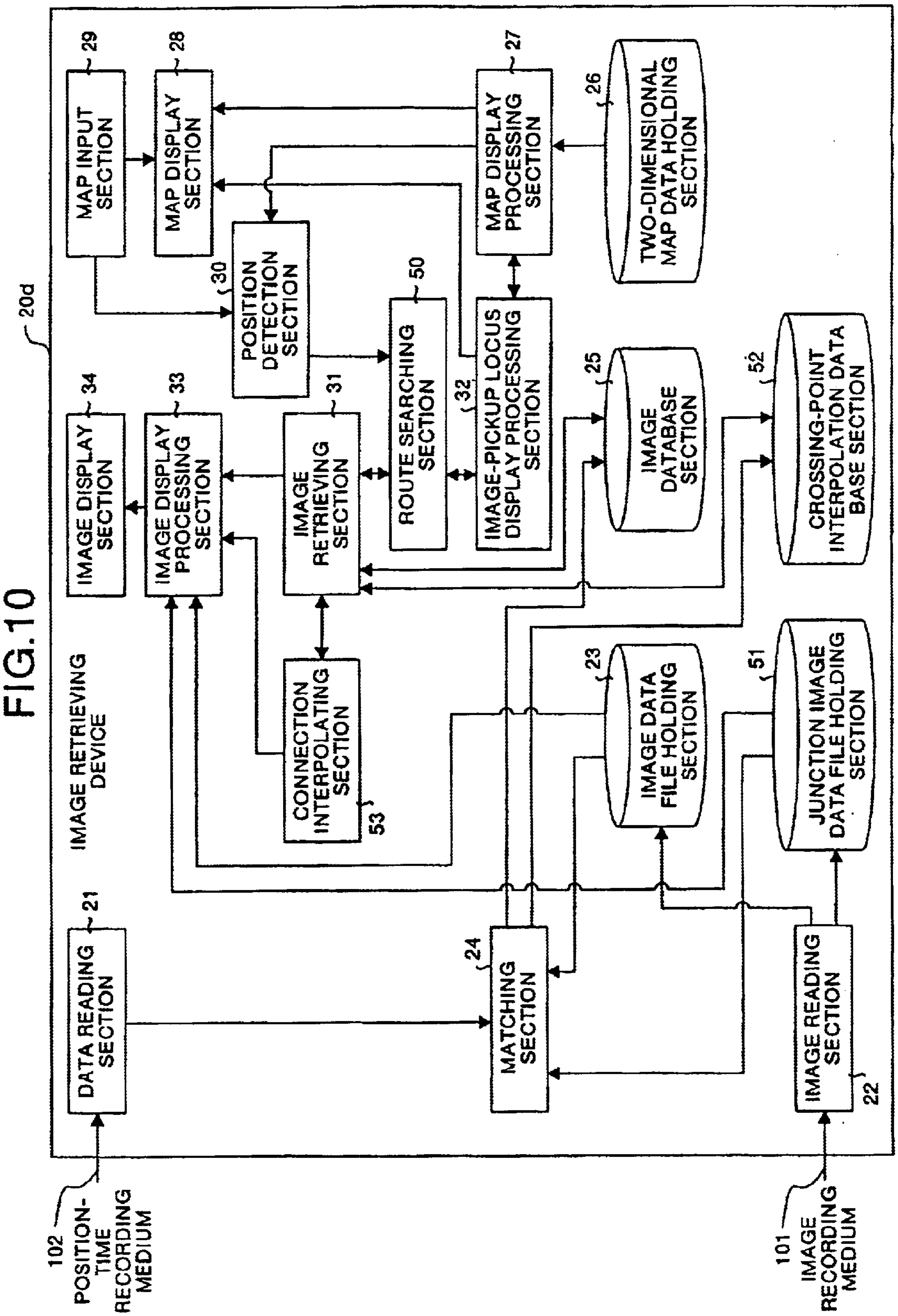
FIG. 10 is a block diagram that shows a construction of an image retrieving device in accordance with a fourth embodiment of the present invention.

FIG. 10 is a block diagram that shows a construction of an image retrieving device in accordance with the fourth embodiment of the present invention. As shown in FIG. 10, this image retrieving device **20*d* is provided with a junction image data file holding section 51 for holding image data at a junction as a junction image data file, a crossing-point interpolation database section 52 for managing attribute information of each piece of image data as a crossing-point interpolation database with respect to each junction image data file, and a connection interpolating section 53** for interpolating images at the time of shifting the junction by using the junction image data. The other constructions p are the same as those of the third embodiment, and the same elements are indicated by the same reference numbers.

The junction image data, held by the junction image data file holding section 51 is image data that is obtained as follows: an image-pickup device such as a video camera is placed in the center of a junction at which a plurality of pieces of image data intersect each other, the viewing point of the image-pickup device is fixed, and image data is obtained by picking up images in the all directions of 360 degrees while the image-pickup device is rotated horizontally clockwise. During the time from the start of an image-pickup recording operation to the stop of the image-pickup recording operation, the azimuth of the viewing point of the image-pickup device is recorded by an azimuth sensor. By recording the azimuth, it is possible to confirm which azimuth the shooting operation is executed at, every second, while the picked up image data of the junction is being reproduced.

The crossing-point interpolation database manages the file name of the crossing-point image data file, the image-pickup position, the elapsed seconds of each piece of the crossing-point image data and the azimuth thereof. With respect to the azimuth, the recording operation is carried out clockwise in units of "degree", "minute" and "second", with the north direction being set at 0 degree.

If, upon successively reproducing image data by using a plurality of image data files, image data within one of the image data files is reproduced up to a junction and when, at this junction, the image data within the other image data file is reproduced, the connection interpolating section 53 interpolates the junction image data formed by picked-up images of this junction, thereby carrying out an interpolating process to provide continuous images.

Figure 11:
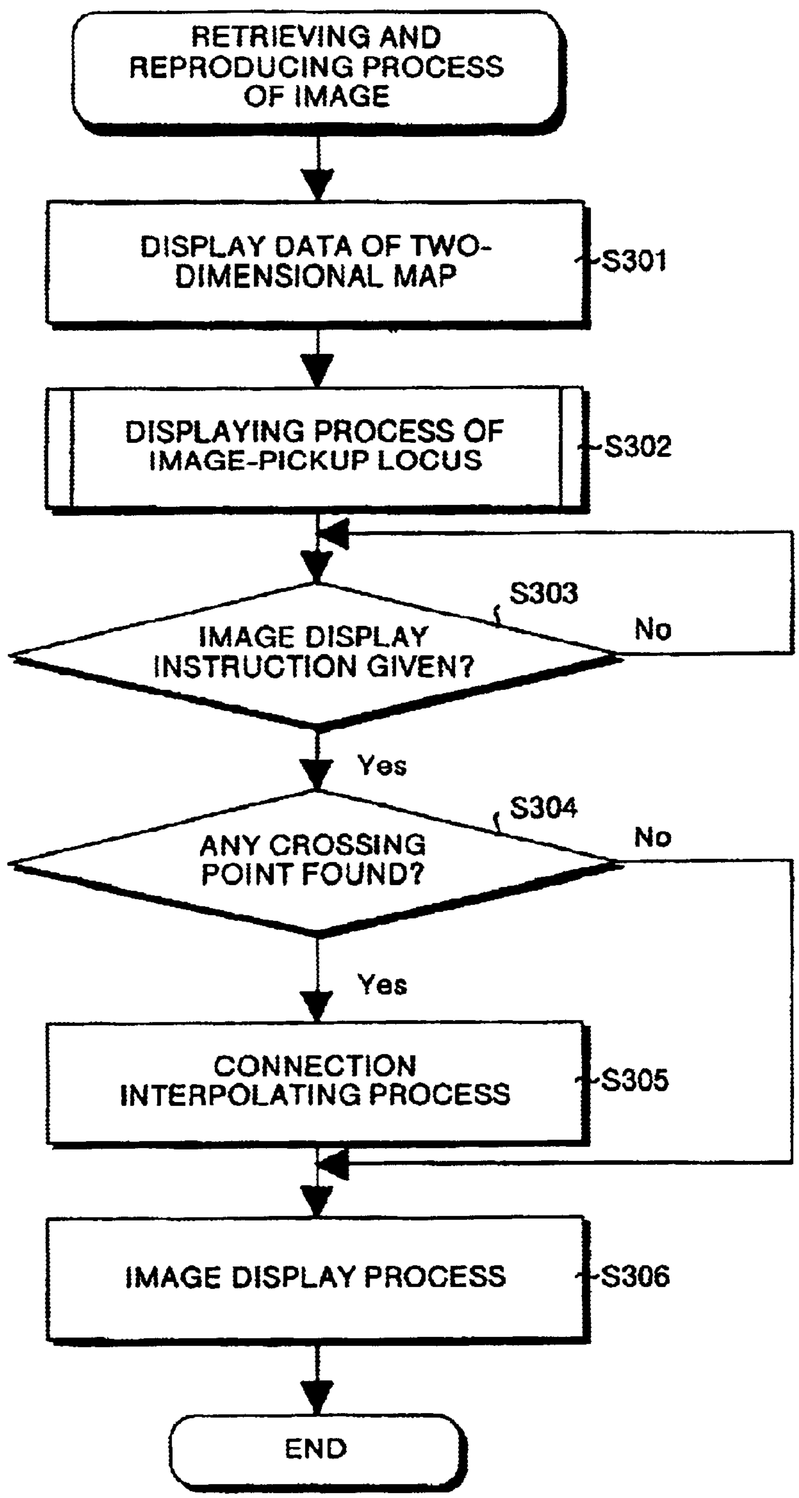
FIG. 11 is a flow chart that shows a sequence of retrieving and reproducing processes of images carried out by the image retrieving device shown in FIG. 10.

Referring to a flow chart shown in FIG. 11, an explanation will be given of a sequence of retrieving and reproducing processes of images in accordance with the fourth embodiment. Referring to FIG. 11, first, the map display processing section 27 displays two-dimensional map data stored in the two-dimensional map data holding section 26 on the map display section 28 (step S301). Thereafter, the route searching section 50 searches for an image-pickup route between the two points, and based upon the results of the search, the image-pickup locus display processing section 32 displays the loci of image-pickup positions indicating this route on the map display section 28 (step S302).

Thereafter, the route searching section 50 makes a judgment as to whether or not there is an instruction for image display given through the map input section 29 (step S303), and if there is such an instruction (step S303, YES), a judgment is made as to whether or not there is any crossing point by judging whether or not any image-pickup position of another image data file is located within a predetermined range (step S304).

If there is any crossing point (step S304, YES), the connection interpolating section 53 carries out an interpolating process for interpolating pieces of image data before and after the crossing point at the crossing point by using the junction image data (step S305), and then reproduces the image data (step S306), thereby completing the present processes. In contrast, if there is no crossing point (step S304, NO), the image data, as it is, is reproduced (step S306), thereby completing the present processes. In other words, the junction image data is interpolated between the image positions P1 to P4 in the third embodiment so that the resulting smooth image data is reproduced.

Figure 12:
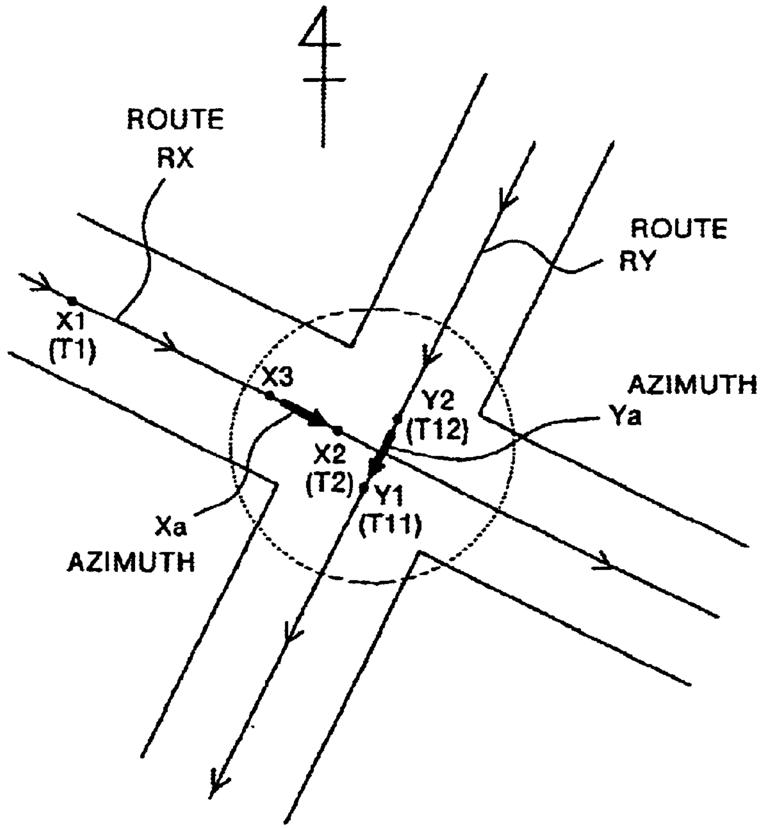
FIG. 12 is an explanatory drawing that shows a connecting process in the vicinity of a crossing point.
Figure 13:
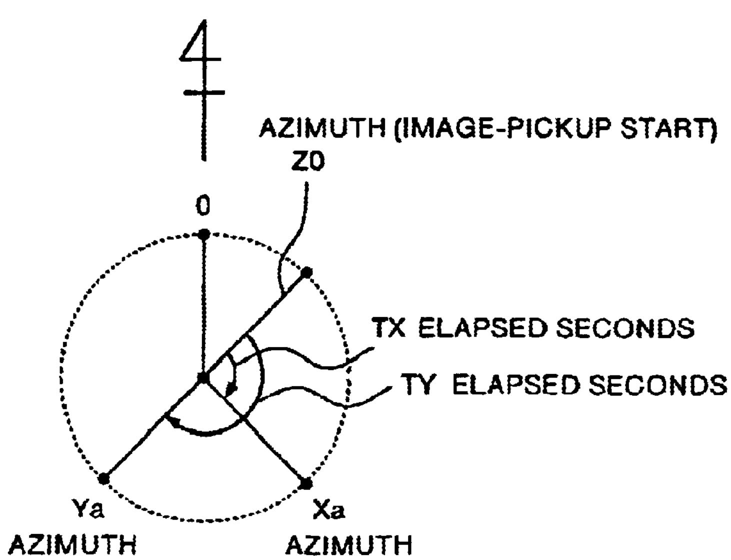
FIG. 13 is a drawing that explains the contents of data held in a crossing-point interpolating database section.

Referring to FIGS. 12 and 13, an explanation will be given of the connection interpolating process by the connection interpolating section 53. FIG. 12 shows the proximity of a crossing point at which the image pickup positions of an image data file having a route RX and the image pickup positions of an image data file having a route RY intersect each other. In the image data having the route RX, time elapses in a descending manner to the right, and in the image data having the route RY, time elapses in a descending manner to the left.

Referring to FIG. 12, when an image-pickup position X1 (image-pickup time T1) within the image data file having the route RX is specified, the route searching section 50 searches for all the image-pickup positions succeeding the image-pickup time T1. Moreover, it retrieves the searched image-pickup positions for any image position that has a distance within a predetermined range, and is located within another image data file. Referring to FIG. 12, an image-pickup position Y1 (image-pickup time T11), which has a distance within a predetermined range from the image-pickup position X2 (image-pickup time T2), and is located within another image data file having the route RY, is detected.

Moreover, the image retrieve section 31 retrieves the image data file having the route RX for an image-pickup position X3 that has an elapsed time earlier than the image-pickup time T2 and is closest to the image-pickup position X2. In this case, the direction obtained when the image-pickup position X2 is viewed from the image-pickup position X3 is calculated from differences in the latitude and longitude indicating the respective image-pickup positions X3, X2, so that the degrees of the direction can be determined, with the north direction being set at 0 degree and the clockwise direction being set as plus direction. Thus, the calculated angle represents the azimuth Xa.

Furthermore, the image retrieve section 31 retrieves the image data file having the route RY for an image-pickup position Y2 that has an elapsed time earlier than the image-pickup time T11 and is closest to the image-pickup position Y1. In this case, the direction obtained when the image-pickup position Y1 is viewed from the image-pickup position Y2 is calculated from differences in the latitude and longitude indicating the respective image-pickup positions Y1, Y2, so that the degrees of the direction can be determined with the north direction being set at 0 degree and the clockwise direction being set as plus direction. Thus, the calculated angle represents the azimuth Yb.

The connection interpolating section 53 retrieves the crossing-point interpolation database section 52 so as to identify the junction image data file having the junction image data picked up at a junction in the proximity of the image-pickup position X2. The connection interpolating section 53 gives an instruction to the image display processing section 33 to reproduce image data within the image data file having the route RX from the image-pickup position X1 to the image-pickup position X2. Thereafter, the connection interpolating section 53 reproduces the junction image data within the identified junction image data file from the azimuth Xa to the azimuth Xb. Moreover, the connection interpolating section 53 reproduces image data within the image data file having the route RY. Thus, with respect to the image data from the image-pickup position X2 to the image-pickup position Y1, the junction image data from the azimuth Xa to the azimuth Xb shown in FIG. 13 is reproduced, and at the time of the end of the reproduction of the image data at the image-pickup position X2, the junction image data having the azimuth Xa is connected thereto. Then, at the time of the start of the reproduction of the image data at the image-pickup position Y1, the junction image data having the azimuth Xb is connected thereto. Thus, it is possible to reproduce the images passing through the junction as continuous images without any discontinuation.

If the value, obtained by subtracting the elapsed seconds TY between the azimuth Z0 and the azimuth Xb from the elapsed seconds TX between the azimuth Z0 of the image-pickup start of the junction image data and the azimuth Xa, is positive, the junction image data is reproduced in a reversed manner. Moreover, if the junction image data comes to an end in the middle of the reproduction of the junction image data, the same junction image data is reproduced again in the same direction from the leading portion.

In accordance with the fourth embodiment, even if image data within different image data files are connected at a junction, the junction image data is interpolated in a gap from the image reaching the junction to the image leaving the junction. Therefore, even in the case of images passing through a junction, the images are reproduced as continuous images without any discontinuation.

Fifth Embodiment

A fifth embodiment of the present invention will now be explained. In the fifth embodiment, provision is made so that an editing process such as a cutting process of an image data file held in the image data file holding section 23.

Figure 14:
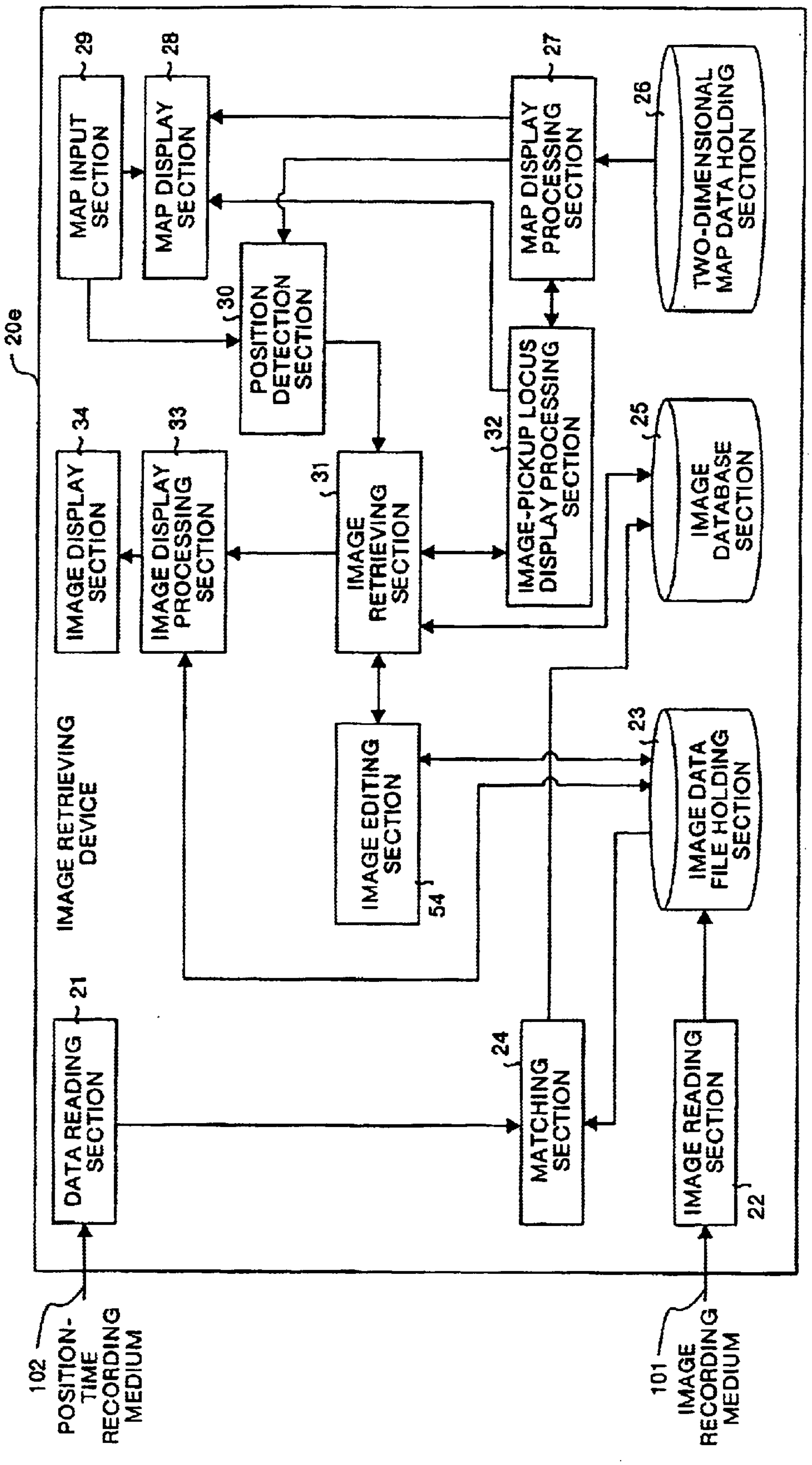
FIG. 14 a block diagram that shows a construction of an image retrieving device in accordance with a fifth embodiment of the present invention.

FIG. 14 is a block diagram that shows a construction of an image retrieving device in accordance with the fifth embodiment of the present invention. As shown in FIG. 14, this image retrieving device 20*e* is provided an image editing section 54 for carrying out an editing process such as a cutting process in an image data file. The other structures are the same as those of the first embodiment, and the same elements are indicated by the same reference numbers.

Figure 15:
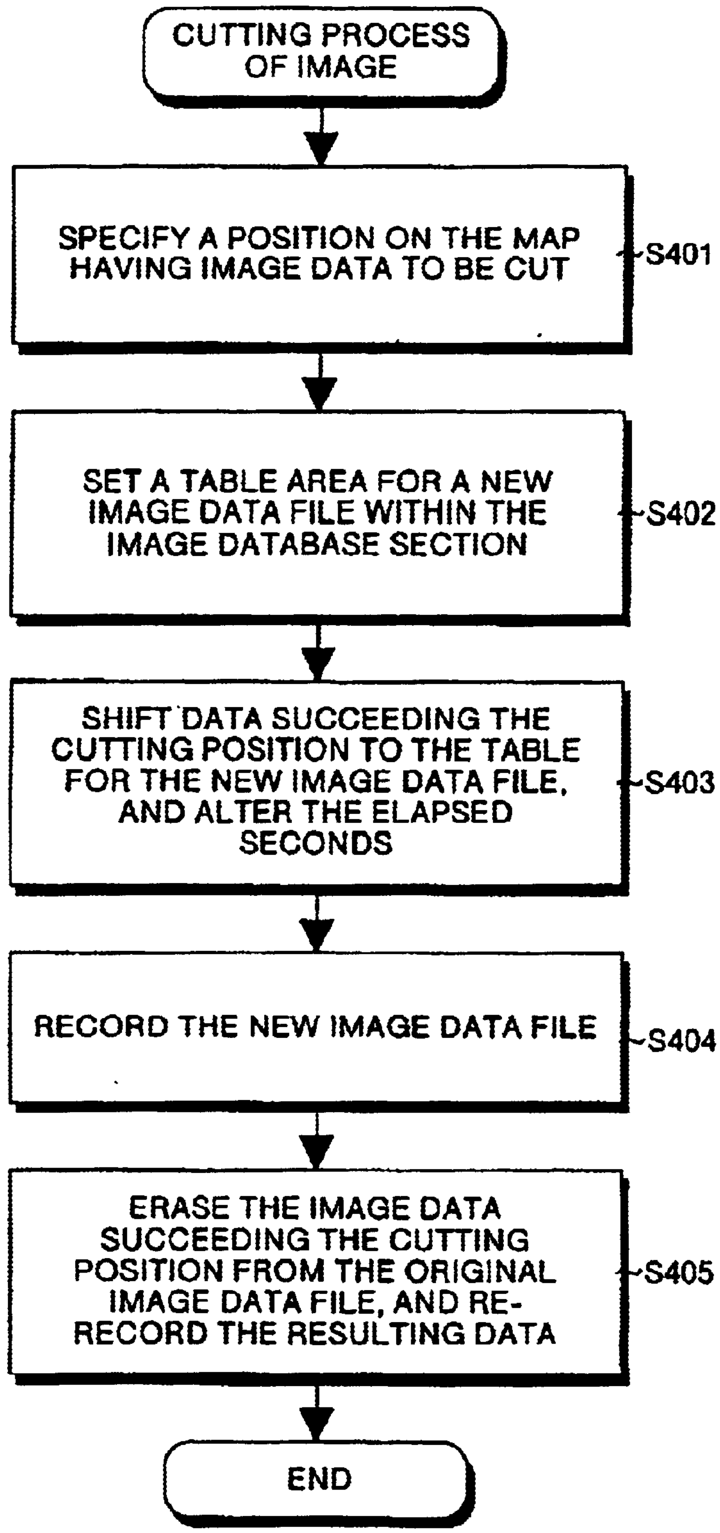
FIG. 15 is a flow chart that shows a sequence of cutting processes of images carried out by the image retrieving device shown in FIG. 14.

Referring to a flow chart shown in FIG. 15, an explanation will be given of a sequence of cutting processes that is one example of image editing processes carried out by the image editing section 54. Referring to FIG. 15, the map input section 29 specifies a position at which an image data file to be subjected to a cutting process is located, on a two-dimensional map displayed on the map display section 28 (step S401).

Thereafter, the image editing section 54 sets a table area for a new image data file within the image database section 25 through the image retrieving section 31 (step S402). Moreover, the image editing section 54 shifts data succeeding the cutting position of the table corresponding to the image data file to be subjected to the cutting process to a table corresponding to the new image data file by using the image retrieving section 31, and adds a new image data file name thereto, and in the shifted data, the value of elapsed seconds is changed to a value obtained by subtracting therefrom the value of the corresponding elapsed seconds up to the cutting position (step S403).

Thereafter, the image editing section 54 reads out image data corresponding to the new image data file, and adds a new image data file name to the sequence of image data thus read, and stores this in the image data file holding section 23 (step S404).

Moreover, the image editing section 54 erases image data succeeding the cutting position within the original image data file, and re-stores the resulting data (step S405), thereby completing the present process.

In accordance with the fifth embodiment, referring to the loci displayed on the map display section 28, image data to be subjected to an editing process can be specified. Therefore, it is possible to easily carry out an editing process on image data more effectively.

Sixth Embodiment

A sixth embodiment of the present invention will now be explained. In the sixth embodiment, in order to uniform the amounts of reproduction of image data in association with deviations in the image-pickup position of image data, an adjustment is made, for example, by thinning the image data stored in the image data file holding section 23.

Figure 16:
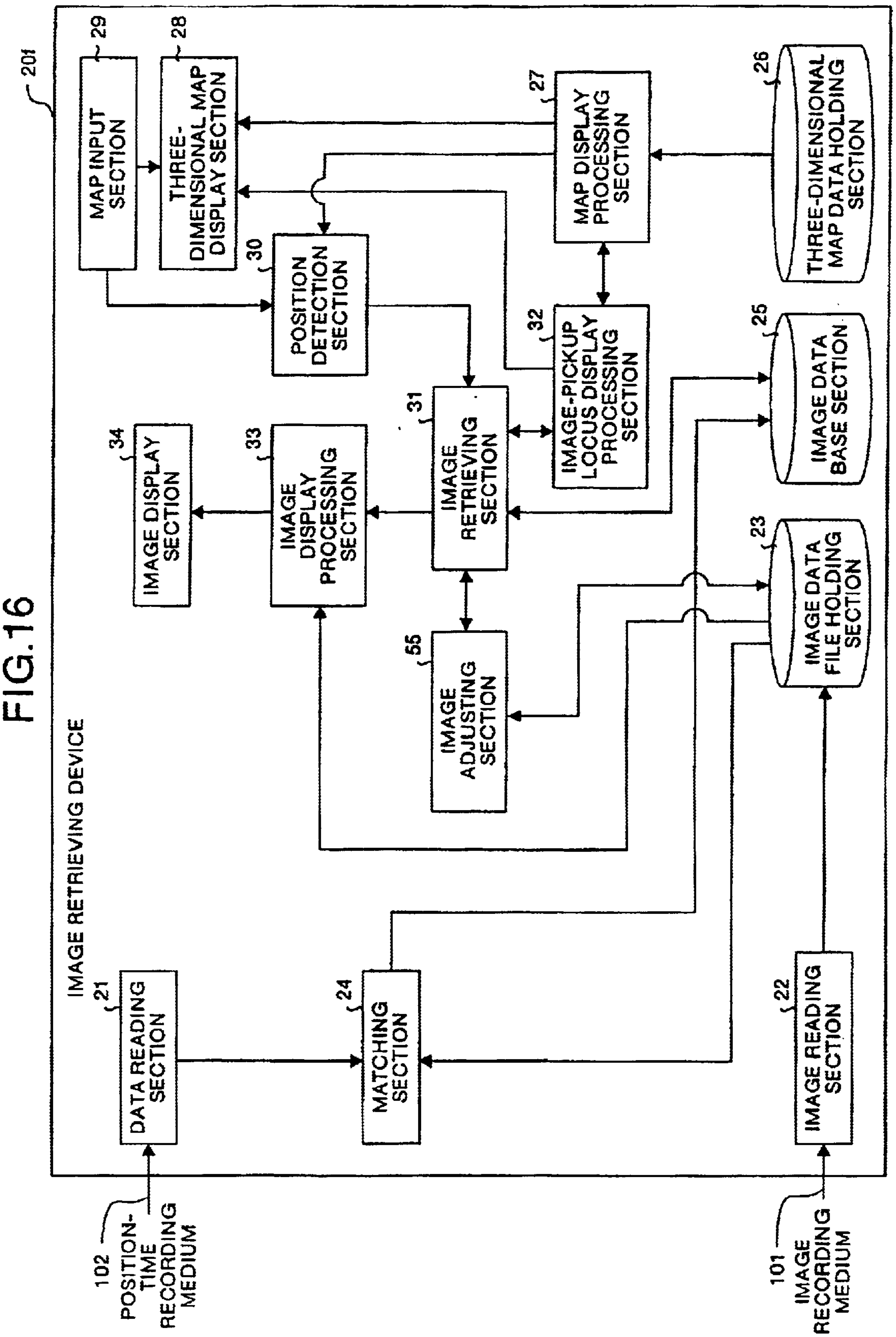
FIG. 16 is a block diagram that shows a construction of an image retrieving device in accordance with a sixth embodiment of the present invention.

FIG. 16 is a block diagram that shows a construction of an image retrieving device in accordance with the sixth embodiment of the present invention. As shown in FIG. 16, this image retrieving device **20*f* is provided with an image adjusting section 55 which carries out an adjustment on image data, for example, by thinning the image data stored in the image data file holding section 23** in order to uniform the amounts of reproduction of image data in association with deviations in the image-pickup position of image data. The other structures are the same as those of the first embodiment, and the same elements are indicated by the same reference numbers.

Figure 17:
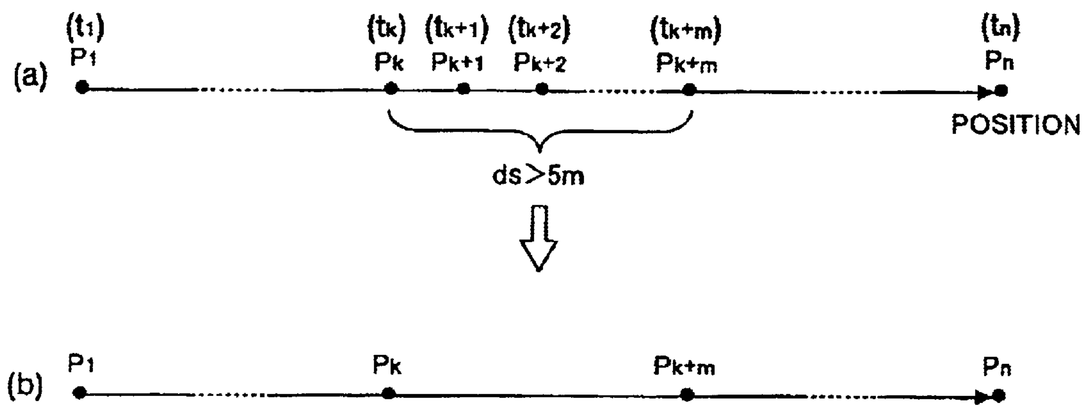
FIG. 17 is a drawing that shows a thinning process of image data carried out by an image adjusting section shown in FIG. 16.

Referring to a flow chart, shown in FIG. 17, an explanation will be given of a sequence of thinning processes that are carried out by the image adjusting section 55. FIG. 17(*a*) shows a relationship between the image position of an image data file stored in the image data file holding section 23 and the imaging time. The image data file, shown in FIG. 17(*a*), has n-number of image-pickup positions P1 to Pn and the corresponding image data. The respective Up image-pickup positions P1 to Pn respectively have imaging times t1 to tn.

The image adjusting section 55 calculates respective distances dk+1 to dk+m between the consecutive image-pickup positions Pk to Pk+m within the image data file. For example, it calculates a distance dk+1 between the image-pickup position Pk and the image-pickup position Pk+1, and a distance dk+2 between the image-pickup position Pk+1 and the image-pickup position Pk+2. Thereafter, the image adjusting section 55 successively adds the calculated distances dk+1 to dk+m. For example, at first, the distance dk+1, as it is, is added, and next, the distance dk+1 and the distance dk+2 are added. Further, the distances dk+1 to dk+3 are added. In this manner, in the order of time, the respective distances dk+1 to dk+m are successively added, and when the added distance ds exceeds a predetermined distance, for example, 5 m, the pieces of image data located on both of the ends of the image-pickup positions thus calculated are allowed to remain, with the pieces of image data located on the image-pickup positions in between being deleted. For example, in FIG. 17(*a*), if the distance ds between the image-pickup position Pk and the image-pickup position Pk+m first exceeds 5 m, the image data from the image-pickup position Pk+1 to Pk+m−1 are deleted (see FIG. 17(*b*)).

The image adjusting section 55 carries out such a thinning process on the image-pickup positions P1 to Pn in the order of time. With this arrangement, the imaging time in association with deviations in the image-pickup position is uniformed so that, when reproduced, the images are reproduced as images that shift at a constant velocity. In the sixth embodiment, the thinning process of the image data is shown as one example of the image adjusting process. However, not limited to this process, if the image pickup time is too short due to deviations in the image-pickup position, the image data may be interpolated.

In accordance with the sixth embodiment, the image adjusting section 55 carries out an image adjusting process such as a thinning process on image data. Therefore, the images can be reproduced as images that shift at a constant velocity, and since redundant image data is not stored, the memory efficiency is improved.

Seventh Embodiment

A seventh embodiment of the present invention will now be explained. Any one of the first to sixth embodiments has displayed image-pickup positions of image data on a two-dimensional map. However, the seventh embodiment displays image-pickup positions of image data on a three-dimensional map.

Figure 18:
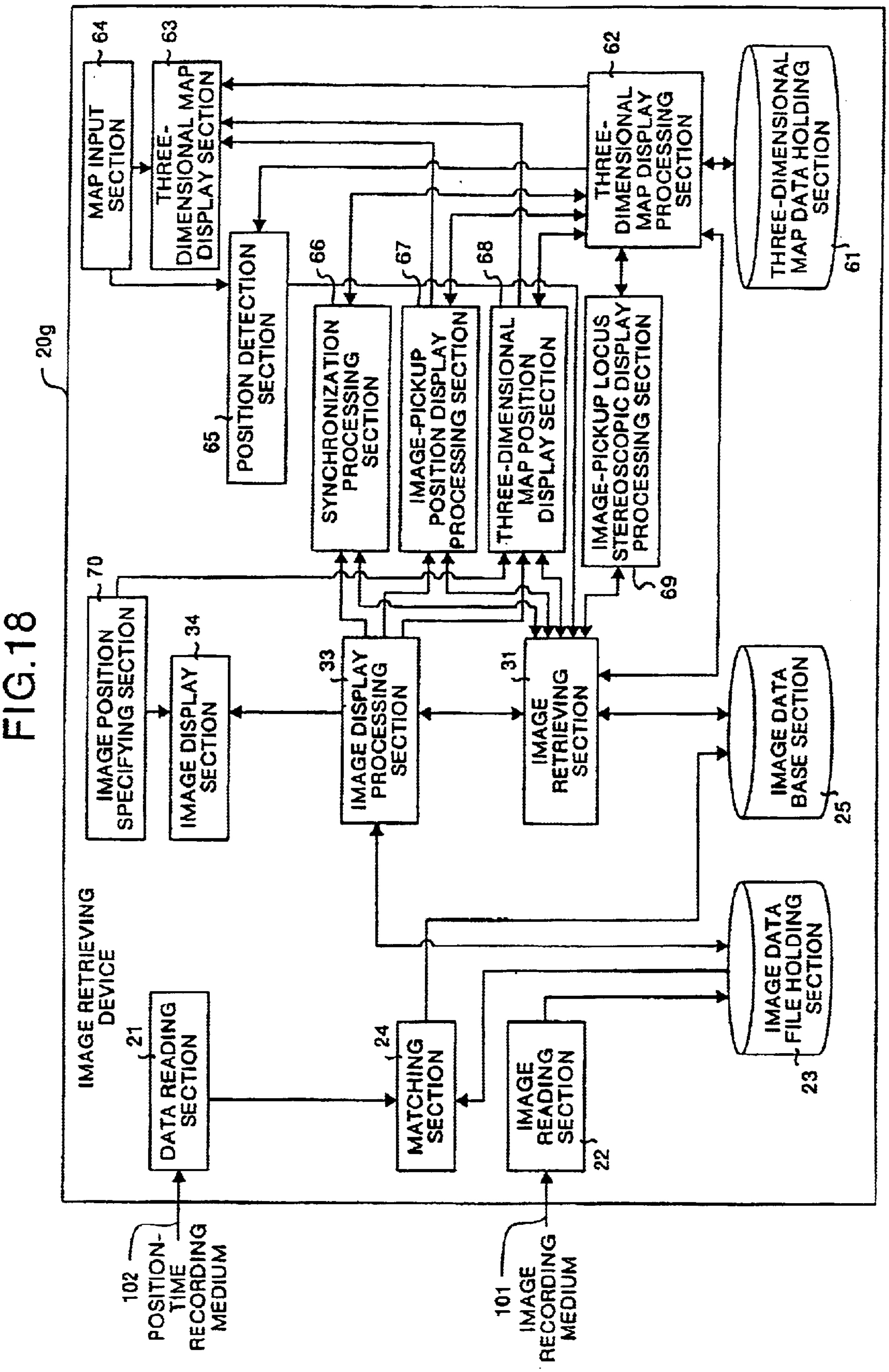
FIG. 18 is a block diagram that shows a construction of an image retrieving device in accordance with a seventh embodiment of the present invention.

FIG. 18 is a block diagram that shows a construction of an image retrieving device in accordance with the seventh embodiment of the present invention. As shown in FIG. 18, this image retrieving device **20*g* is provided with a three-dimensional map data holding section 61 in place of the two-dimensional map data holding section 26. The three-dimensional map data holding section 61** holds three-dimensional map data. The three-dimensional map data includes, for example, a numeric map indicating the undulation of terrains that is issued by the Geographical Survey Institute, a data map indicating the position and height of houses by using vectors that is issued by a known map company, or data described in VRML (Virtual Reality Modeling Language). In these pieces of three-dimensional map data, the shapes of terrains, houses, etc., and the corresponding positions within the data have pieces of positional information of longitude, latitude and altitude.

The three-dimensional map display processing section 62 carries out a process for displaying three-dimensional map data held in the three-dimensional map data holding section 61 on a three-dimensional map display section 63. The three-dimensional map display processing section 62 forms a VRML browser if the three-dimensional map data is described in VRML. The three-dimensional map display processing section 62 stereoscopically displays three-dimensional map data from a viewing point having specified longitude, latitude and altitude. When a building, etc., displayed on the display screen on the three-dimensional map display section 63 displaying the three-dimensional map data stereoscopically, is specified by the map input section 64 such as a mouse, the longitude, latitude and altitude of the building, etc., are displayed.

An image-pickup locus stereoscopic display processing section 69 carries out a process for displaying a locus of image-pickup positions including the altitude on the display screen of a three-dimensional map displayed on the three-dimensional map display section 63 by the three-dimensional map display processing section 62. A three-dimensional map position display section 68 outputs and displays an image pickup range on the three-dimensional map display section 63. A synchronization processing section 66 carries out a synchronizing process for stereoscopically displaying a three-dimensional map on the three-dimensional map display section 63 at the same viewing position as the image-pickup point of the image data displayed on the image display section 34.

An image position specifying section 70 specifies an image position of a building etc., within images being reproduced through the display screen of the image display section 34. The three-dimensional map position display section 68 displays the three-dimensional position corresponding to the image position of the building, etc., specified by the image position specifying section 70 on the three-dimensional map display screen of the three-dimensional map display section 63. The image database section 25 manages the three-dimensional image-pickup position by the image-pickup position including altitude in addition to longitude and latitude. The construction is the same as that shown in the first embodiment, and the same elements are indicated by the same reference numbers.

Figure 19:
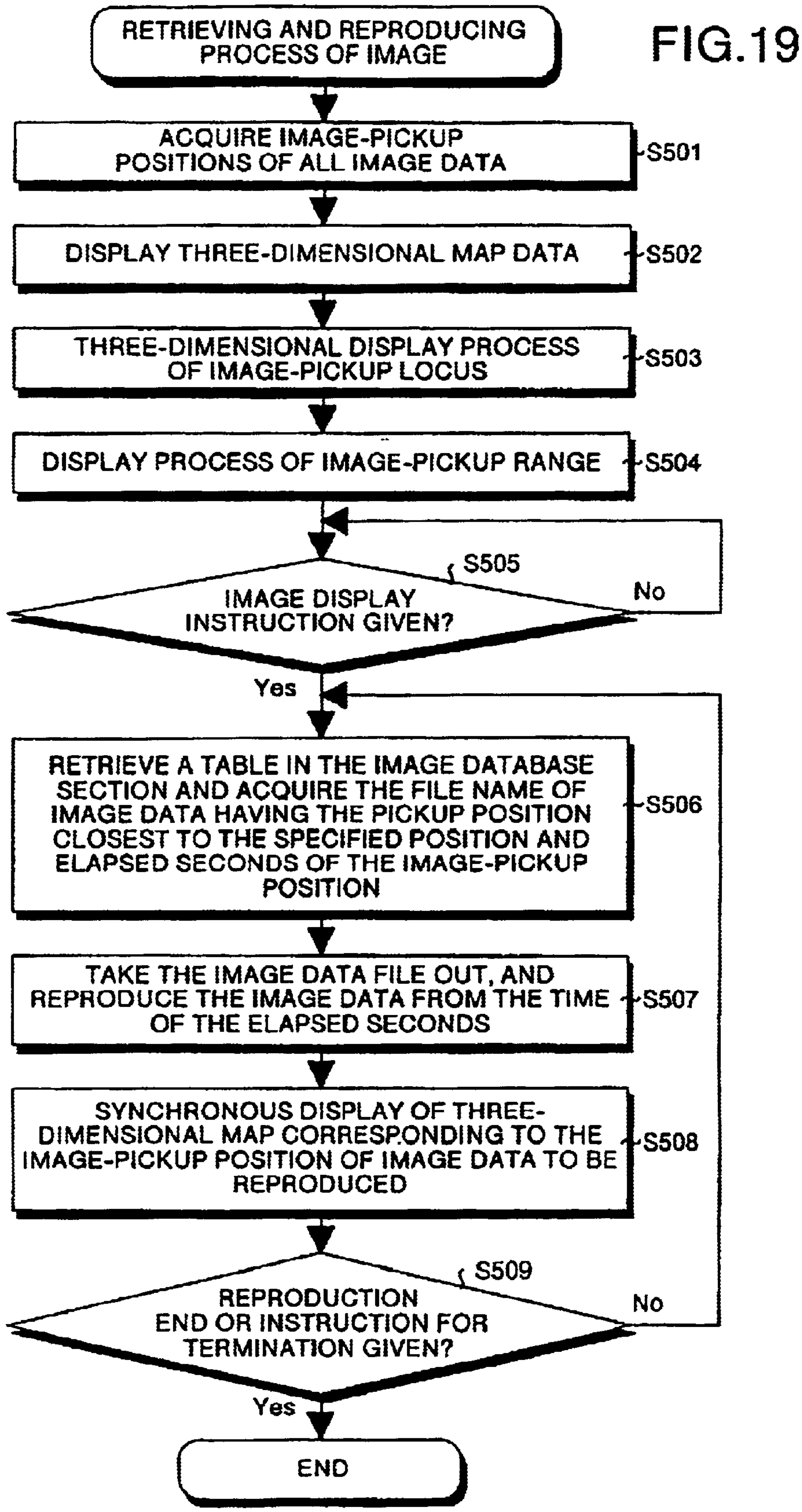
FIG. 19 is a flow chart that shows a sequence of retrieving and reproducing processes of images carried out by the image retrieving device shown in FIG. 18.

Referring to FIG. 19, an explanation will be given of a sequence of retrieving and reproducing processes of images that are carried out by the image retrieving device 20*g*. Referring to FIG. 19, first, the three-dimensional map display processing section 62 acquires image-pickup positions of all the image data from the image database section 25 through the image retrieving section 31 (step S501). Thereafter, the three-dimensional map display processing section 62 acquires three-dimensional map data stereoscopically includes image-pickup positions of all the image data from the three-dimensional map data holding section 61, and displays the corresponding three-dimensional map on the three-dimensional map display section 63 (step S502). Thereafter, the image-pickup locus stereoscopic display processing section 69 acquires three-dimensional image-pickup positions within a display range of the three-dimensional map currently displayed on the three-dimensional map display section 63 by retrieving the image database section 25, and displays these on the three-dimensional map displayed on the three-dimensional map display section 63 as a locus (step S503). Moreover, the image-pickup position display processing section 67 retrieves the image database section 25 through the image retrieving section 31 so as to acquire the azimuth, longitudinal and lateral directions, and angles corresponding to each image-pickup position currently displayed; thus, arrows corresponding to the image-pickup directions, extended from each image-pickup position, are displayed on the three-dimensional map, and vector lines are displayed on the three-dimensional map in accordance with the angles that correspond to the limits within the image-pickup range from the image-pickup position (step 504) The vector lines are represented in specific colors indicating the image-pickup range.

Thereafter, a judgment is made as to whether or not an instruction for image display has been given by reference to the locus on the display screen of the three-dimensional map display section 63 (step S505). If there is an instruction for image display (step S505, YES), the image retrieve section 31 retrieves the table within the image database 25 so as to acquire the name of an image data file having image data with an image-pickup position closest to the specified position and the elapsed seconds of this image-pickup position (step S506).

Then, the image display processing section 33 takes the retrieved image data file out, and allows the image display section 34 to reproduce the image data in a manner so as to succeed the elapsed seconds (step S507). The synchronization processing section 66 carries out a synchronous display controlling operation on the three-dimensional map corresponding the image-pickup position of the image data to be reproduced (step S508).

Thereafter, a judgment is made as to whether or not the reproduction of the image is finished or whether or not any instruction for termination is given (step S509), and if the reproduction of the image is not finished or if there is no instruction for termination (step S509, NO), the sequence proceeds to step S506 so as to display the images and to carry out a synchronized display of a three-dimensional map synchronizing to the image-pickup position, and if the reproduction of the image is finished or if there is an instruction for termination (step S509, YES), the present sequence of processes is finished.

Figure 20:
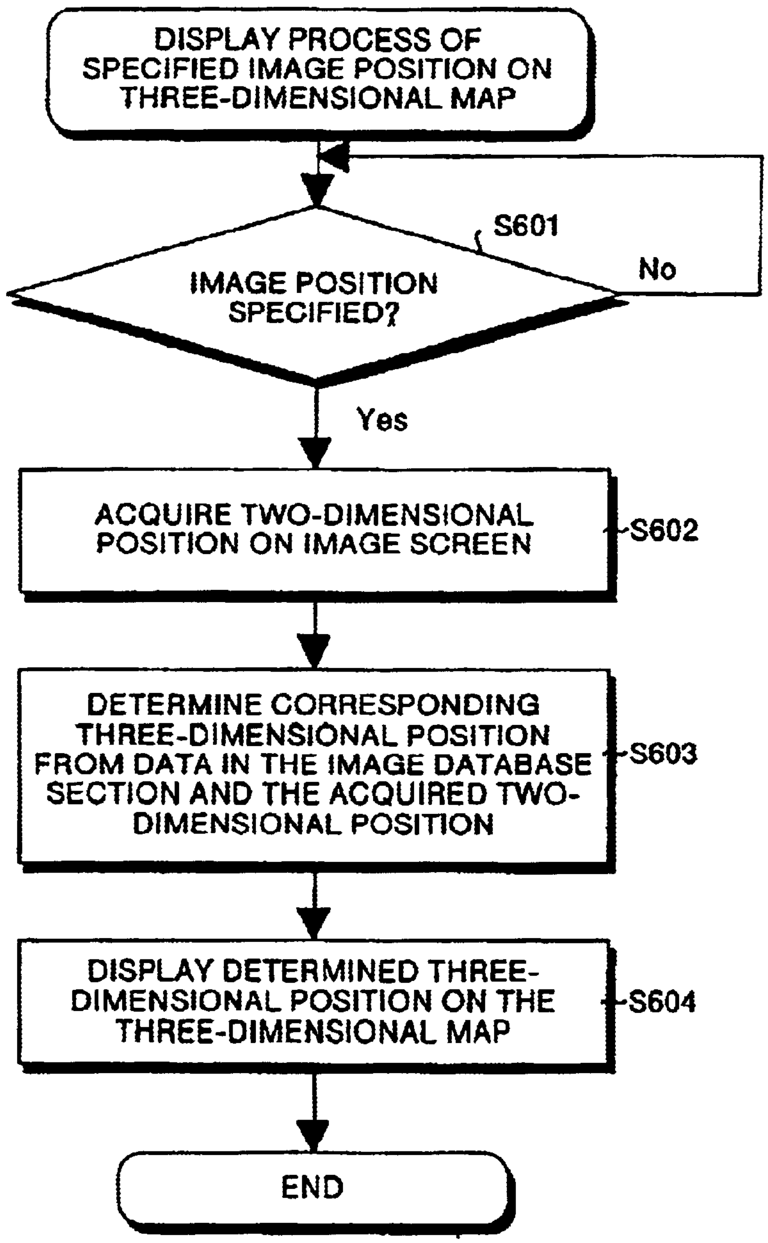
FIG. 20 is a flowchart that shows a sequence of displaying processes of specified image positions on a three-dimensional map carried out by a three-dimensional map position display section shown in FIG. 18.

Next, referring to a flow chart shown in FIG. 20, an explanation will be given of a sequence of processes of the display process on the three-dimensional map at the specified image position given by the image position specifying section 70. First, the three-dimensional map position display section 68 makes a judgment as to whether or not the image position specifying section has specified one point within the image on the display screen during display of images in reproduction or in suspension on the image display section 34 (step S601).

If one point within the image is specified (step S601, YES), a two-dimensional position of this point on the display screen is acquired (step S602). This two dimensional position is referred to as a position on coordinates in which, for example, the center of an image being reproduced is set to "0", that is, the origin, Y-axis is given by setting the distance to the upper end of the display screen to 100 and the distance to the lower end thereto to −100, and X axis is given by setting the distance to the right end thereof to 100 and the distance to the left end thereof to −100.

Moreover, the three-dimensional map position display section 68 retrieves the image-pickup position, azimuth, longitudinal and lateral directions and angles of the image being reproduced, and based upon these pieces of attribute information and the two-dimensional position thus acquired, it determines a three-dimensional position on the three-dimensional map (step S603). The determination of this three-dimensional position is made, for example, as follows: a vector is drawn on a map three-dimensionally displayed, with the current image-pickup position as a starting point, and if the vector angle in the viewing point direction is set to 0 degree, the upper limit angle within the image-pickup range from the viewing point direction is $\alpha$ degrees, the right limit angle within the image-pickup range from the viewing point direction is $\beta$, and the value in the two-dimensional position is represented by (X, Y), a display is given with the end point of the vector being directed upward by $\alpha \times Y/100$ degrees and being tilted rightward by $\beta X/100$ degrees. The pointing end of this vector forms a position on the three-dimensional map corresponding to the position specified on the image screen. Thereafter, the three-dimensional map position display section 68 displays a mark on the display screen of the three-dimensional map display section 63 based upon the three-dimensional position thus determined (step S604), thereby completing the present processes.

In accordance with the seventh embodiment, since the locus of image data is displayed on a three-dimensional map, it becomes possible to specify image data more easily. Moreover, since the reproducing images and the displayed three-dimensional map are given in synchronism with each other, it is possible to confirm the image-pickup range stereoscopically, in a more intuitive manner. Furthermore, when a desired position within the reproduced image is specified, the position corresponding to this position is displayed on the three-dimensional map so that a building, etc., within the image is positively confirmed more easily.

Eighth Embodiment

An eighth embodiment of the present invention will now be explained. In the eighth embodiment, a three-dimensional model is composed into reproduced images, or composed into a three-dimensional map.

Figure 21:
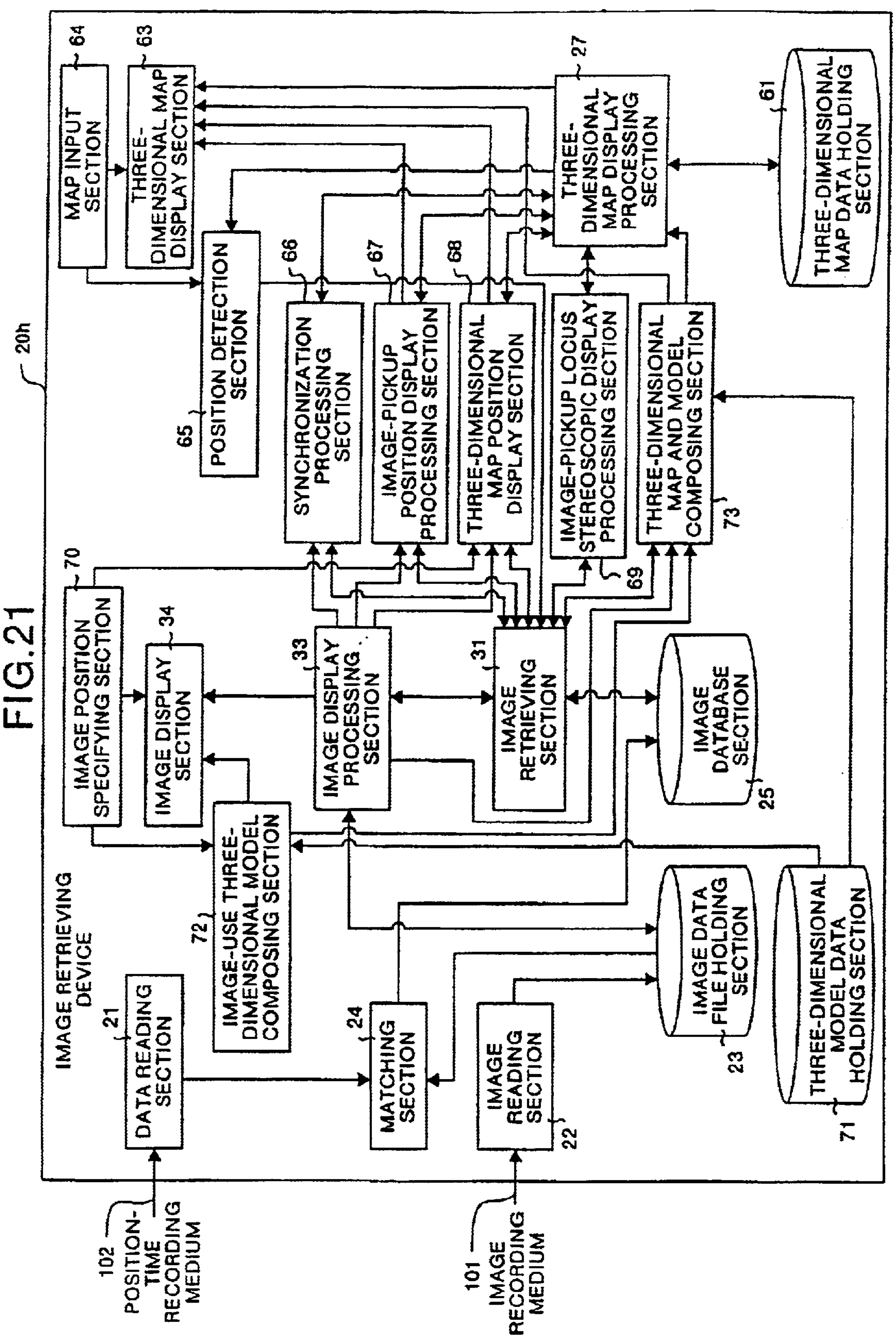
FIG. 21 is a block diagram that shows a construction of an image retrieving device in accordance with an eighth embodiment of the present invention.

FIG. 21 is a block diagram that shows a construction of an image retrieving device in accordance with the eighth embodiment of the present invention. As shown in FIG. 21, this image retrieving device 20*h* is provided with a three-dimensional model data holding section 71, a image-use three-dimensional model composite section 72 and a three-dimensional-map-use three-dimensional model composing section 73. The other constructions are the same as those of the seventh embodiment, and the same components are represented by the same reference numbers.

Referring to FIG. 21, the three-dimensional model data holding section 71 holds three-dimensional model data such as a rectangular parallelepiped having a three-dimensional shape. This three-dimensional model is a computer graphic (CG) model. The image-use three-dimensional model composing section 72 composes the three-dimensional model into an image position specified by the image position specifying section 70 and displays the resulting image. The three-dimensional-map use composing section 73 composes the three-dimensional model at the three-dimensional position corresponding to the image position specified by the image position specifying section 70, and displays the resulting image on the three-dimensional map display section 63.

Figure 22:
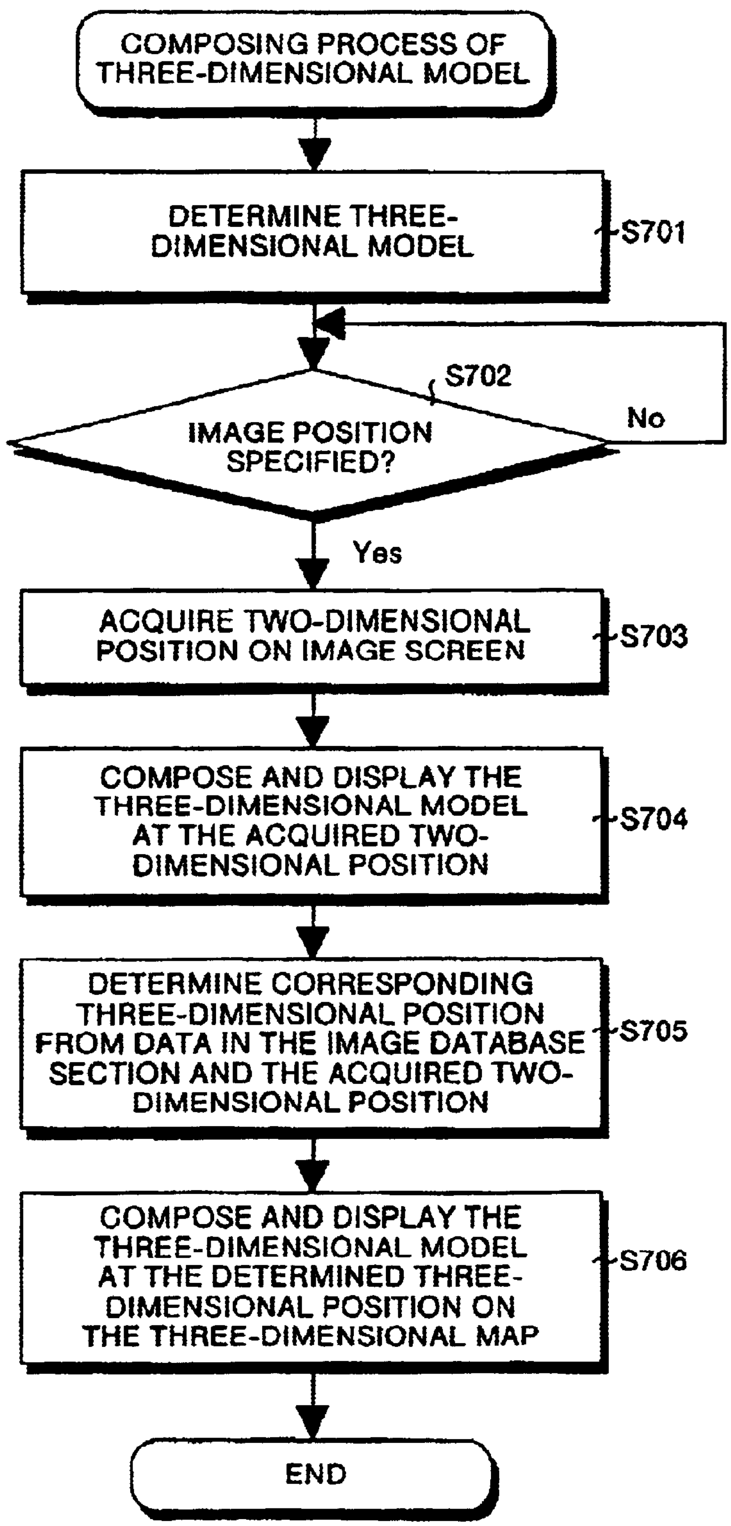
FIG. 22 is a flow chart that shows a sequence of composing processes of a three-dimensional model carried out by the image retrieving device shown in FIG. 21.

Referring to a flow chart shown in FIG. 22, an explanation will be given of the composite process of the three-dimensional model. Referring to FIG. 22, first, a three-dimensional model to be displayed is preliminarily determined (step S701). Then, the image-use three-dimensional model composing section 72 makes a judgment as to whether or not the image position specifying section 70 has specified an image position on the display screen of the image display section 34 (step S702). If an image position is specified (step S702, YES), the image-use three-dimensional model composing section 72 acquires a two-dimensional position of the image position specified on the image screen (step S703). This two dimensional position is referred to as a position on coordinates in which, for example, the center of an image being reproduced is set to "0", that is, the origin, Y-axis is given by setting the distance to the upper end of the display screen to 100 and the distance to the lower end thereto to −100, and X axis is given by setting the distance to the right end thereof to 100 and the distance to the left end thereof to −100.

Thereafter, the image-use three-dimensional model composing section 72 acquires the three-dimensional model data to be composed from the three-dimensional model data holding section 71, composes the three-dimensional model into the specified image position, and displays the resulting image (step S704); then, it outputs the two-dimensional position of the specified image position to the three-dimensional-map-use three-dimensional model composing section 73.

Based upon the attribute information in the image database section 25 and the inputted two-dimensional position, the three-dimensional-map-use three-dimensional model composing section 73 determines a three-dimensional position on the three-dimensional map corresponding to the specified image position (step S705). Then, it composes the three-dimensional model into the three-dimensional position on the three-dimensional map, and displays this on the three-dimensional map display section 63 (step S706), thereby completing the present processes.

Upon composing a three-dimensional model into the image of the image display section 34 or the three-dimensional map display section 63, the image-use three-dimensional model composing section 72 or the three-dimensional-map-use three-dimensional model composing section 73 deforms the size and orientation of the three-dimensional model so as to be composed therein.

In accordance with the eighth embodiment, a desired three-dimensional model is composed into a desired position of the image being reproduced and the corresponding position on the three-dimensional map, and the resulting image is displayed. Therefore, it is possible to create a further realistic image that would not be expressed by only the three-dimensional model, by using images in the actual space.

Ninth Embodiment

A ninth embodiment of the present invention will now be explained. In the first embodiment, the synchronization between the image-pickup recording start of images by the image-pickup recording section 11-1, 11-2 and the recording start of the position and time by the position-time recording section 16 are carried out a manual operation. However, in the ninth embodiment, the synchronization between the image-pickup recording start of images and the recording start of the position and time are carried out automatically.

Figure 23:
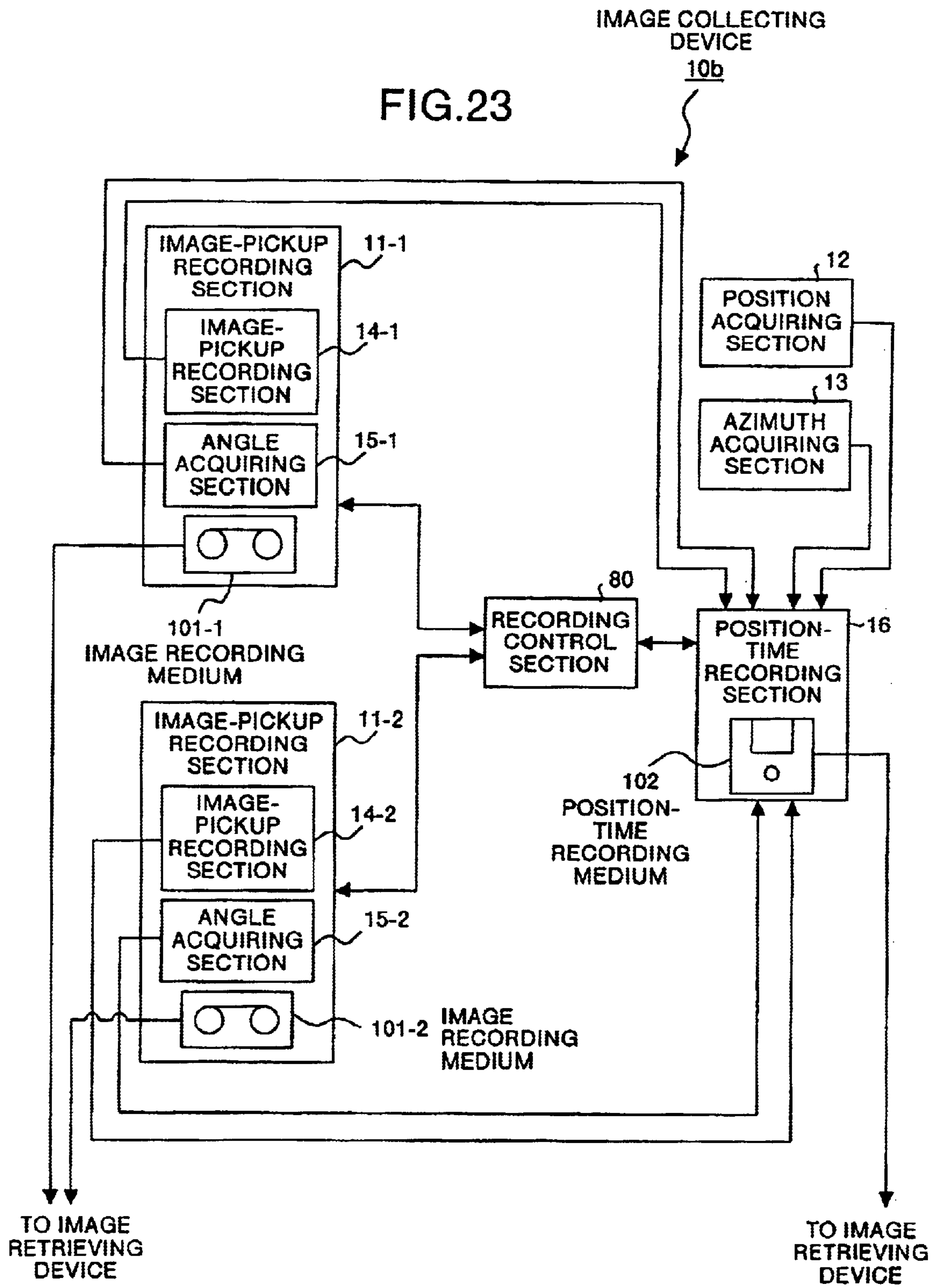
FIG. 23 is a block diagram that shows a construction of an image collecting device in accordance with a ninth embodiment of the present invention.

FIG. 23 is a block diagram that shows a construction of an image collecting device in accordance with the ninth embodiment of the present invention. As shown in FIG. 23, this image collecting device 10*b* is provided with a recording control section 80, and the other constructions are the same as the image collecting device 10 shown in the first embodiment. Therefore, the same elements are indicated by the same reference numbers.

As shown in FIG. 23, the recording control section 80 is connected to the image-pickup recording sections 11-1, 11-2 and the position-time recording section 16. Thus, upon input of the image-pickup start, an instruction for the recording start is simultaneously outputted to the image-pickup recording sections 11-1, 11-2 and the position-time recording section 16, thereby allowing the respective image-pickup recording sections 11-1, 11-2 and the position-time recording section 16 to start recording.

In accordance with the ninth embodiment, the image-pickup recording start of images and the recording start with respect to the position and time are automatically carried out in synchronism with each other. Therefore, it is possible to eliminate deviations in time between the image recording and the position-time recording, and consequently to carry out an image collecting process with high precision.

Tenth Embodiment

A tenth embodiment of the present invention will now be explained. In any one of the first to ninth embodiments, the image collecting device and the image retrieving device are electrically independent from each other, with the result that image data and position-time data are inputted to the image retrieving device through the image recording medium 101-1, 101-2 and the position-time recording medium 102 so that these are managed as image data having attribute information such as image-pickup positions, and retrieved and displayed. However, in the tenth embodiment, one or more pieces of image data, simultaneously picked up, are retrieved and displayed virtually in real time.

Figure 24:
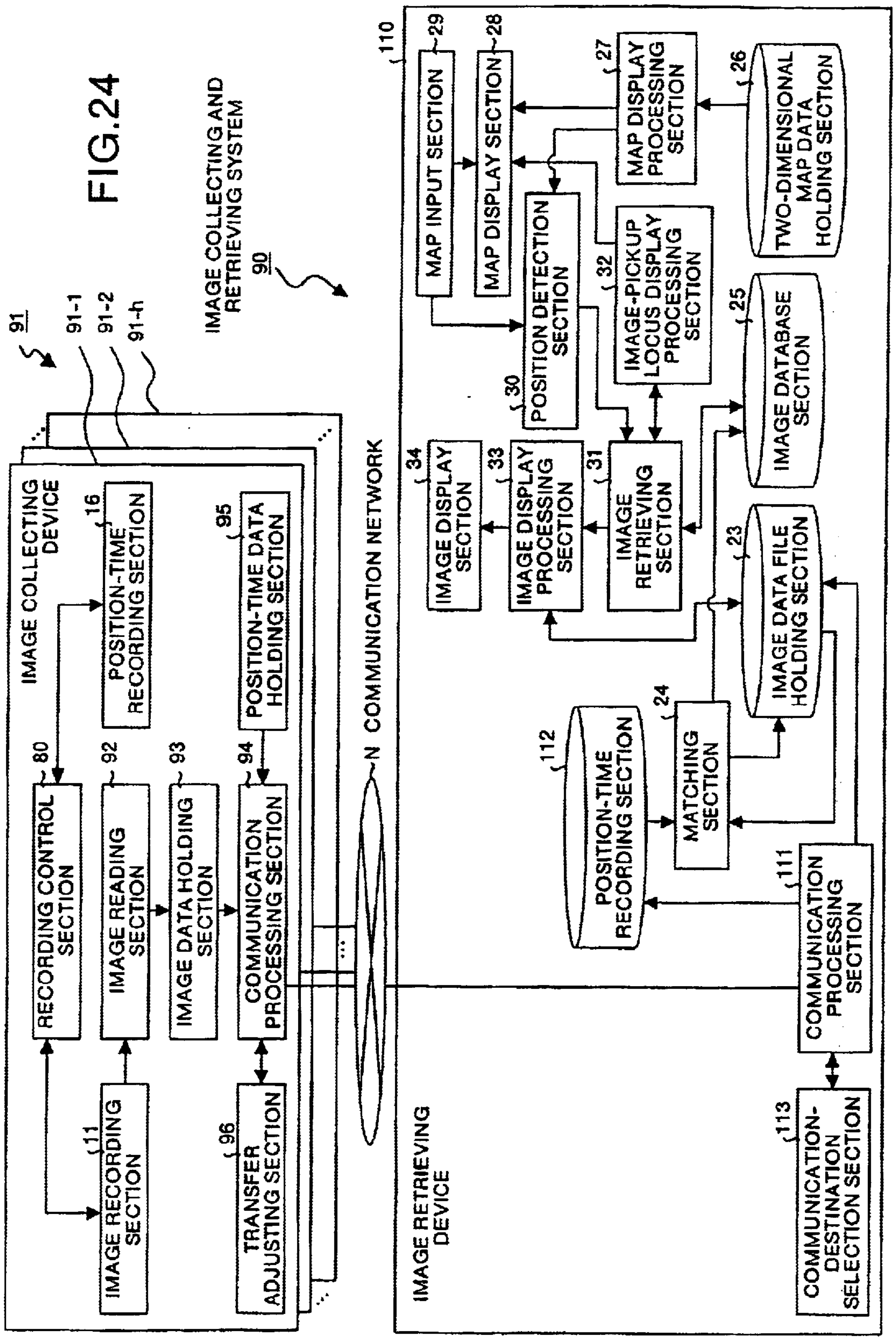
FIG. 24 is a block diagram that shows an image collecting and retrieving system in accordance with a tenth embodiment of the present invention.

FIG. 24 is a block diagram that shows a construction of an image collecting and retrieving system in accordance with the tenth embodiment of the present invention. As shown in FIG. 24, this image collecting and retrieving system 90 is provided with a plurality of image collecting devices 91-1 to 91-n and an image retrieving device 110 that are connected to a communication network N.

In the same manner as the ninth embodiment, the recording control section 80 of each of the image collecting devices 91-1 to 91-n carries out a synchronization controlling operation between the image-pickup recording by the image-pickup recording section 11 and the position-time recording by the position-time recording section 16. In the same manner as any one of the first to ninth embodiments, the position-time recording section 16 records position-time data acquired by the position acquiring section 12 using GPS.

An image reading section 92 reads images recorded by the image-pickup recording section 11 as electronic digital data, and allows an image data holding section 93 to hold these as image data. The position-time data, recorded by the position-time recording section 16, is held by a position-time data holding section 95.

A communication processing section 94 carries out a communication process for transferring the image data and the position-time data, successively held by the image data holding section 93 and the position-time data holding section 95, to the image retrieving device 110 through the communication network N. A transfer adjusting section 96 adjusts the amount of data to be transferred in accordance with an instruction from the image retrieving device 110.

On the other hand, the image retrieving device 110 has an arrangement in which: the data reading section 21 and the image reading section 22 are removed from the image retrieving device 20 shown in the first embodiment, and instead of these, the following devices are newly provided: a position-time recording section 112 for holding position-time data, a communication processing section 111 for carrying out a communication process to the image collecting devices 91-1 to 91-n through the communication network N, and a communication destination selecting section 113 for carrying out a selection for switching communication destinations in a time-divided manner if a communication is made to the image collecting devices 91-1 to 91-n. The other constructions are the same as those of the image retrieving device 20 shown in the first embodiment, and the same elements are indicated by the same reference numbers.

The communication processing section 111 receives the image data and the position-time data inputted from the respective image collecting devices 91-1 to 91-n through the communication network N, and stores these in the image data file holding section 23 and the position-time recording section 112, respectively. A different file name is added to each piece of the image data and the position-time data with respect to each of the image collecting devices 91-1 to 91-n, and the data is then stored. This is because the pieces of image data picked up by the respective image collecting devices 91-1 to 91-n have the same image-pickup time. The position-time data held in the position-time recording section 112 and the image data held in the data file holding section 23 are matched with each other based upon the image-pickup time with respect to each image data file, and the matched attribute information is held in the image database section 25 as image database. In this case, the matching processes are carried out on the image data in the descending order from the image data having the oldest image-pickup time.

If the amount of receiving data is too much to transfer all the data to the position-time recording section 112 and the image data file holding section 23, the communication processing section 111 informs the corresponding image collecting devices 91-1 to 91-n of a delay of data transfer. Upon receipt of the information of a delay in the data transfer, the transfer adjusting section 96 of each of the image collecting device 91-1 to 91-n stops the data transfer for a predetermined stop time, for example, one second, and after a lapse of one second, the data transfer for transferring new image data is resumed. In other words, the transfer adjusting section 96 adjusts the amount of data to be transferred by thinning the image data for a fixed time.

In accordance with the tenth embodiment, the image data and the position-time data transferred from the image collecting devices 91-1 to 91-n are acquired in real time, and on the image retrieving device 110 side, it is possible to always confirm the newest image and the image-pickup position thereof in real time.

Eleventh Embodiment

An eleventh embodiment of the present invention will now be explained. In the first embodiment, image-pickup loci are displayed on the map display section 28, and the image picked up from the corresponding image-pickup position is displayed on the image display section 34. However, map attribute information, such as the place name of an image-pickup position, is not given at a fixed position on the screen. In the eleventh embodiment, the map attribute information such as a place name is acquired in association with the image-pickup position, and this is displayed at a fixed position on the screen adjacent to the image display section 34.

Figure 25:
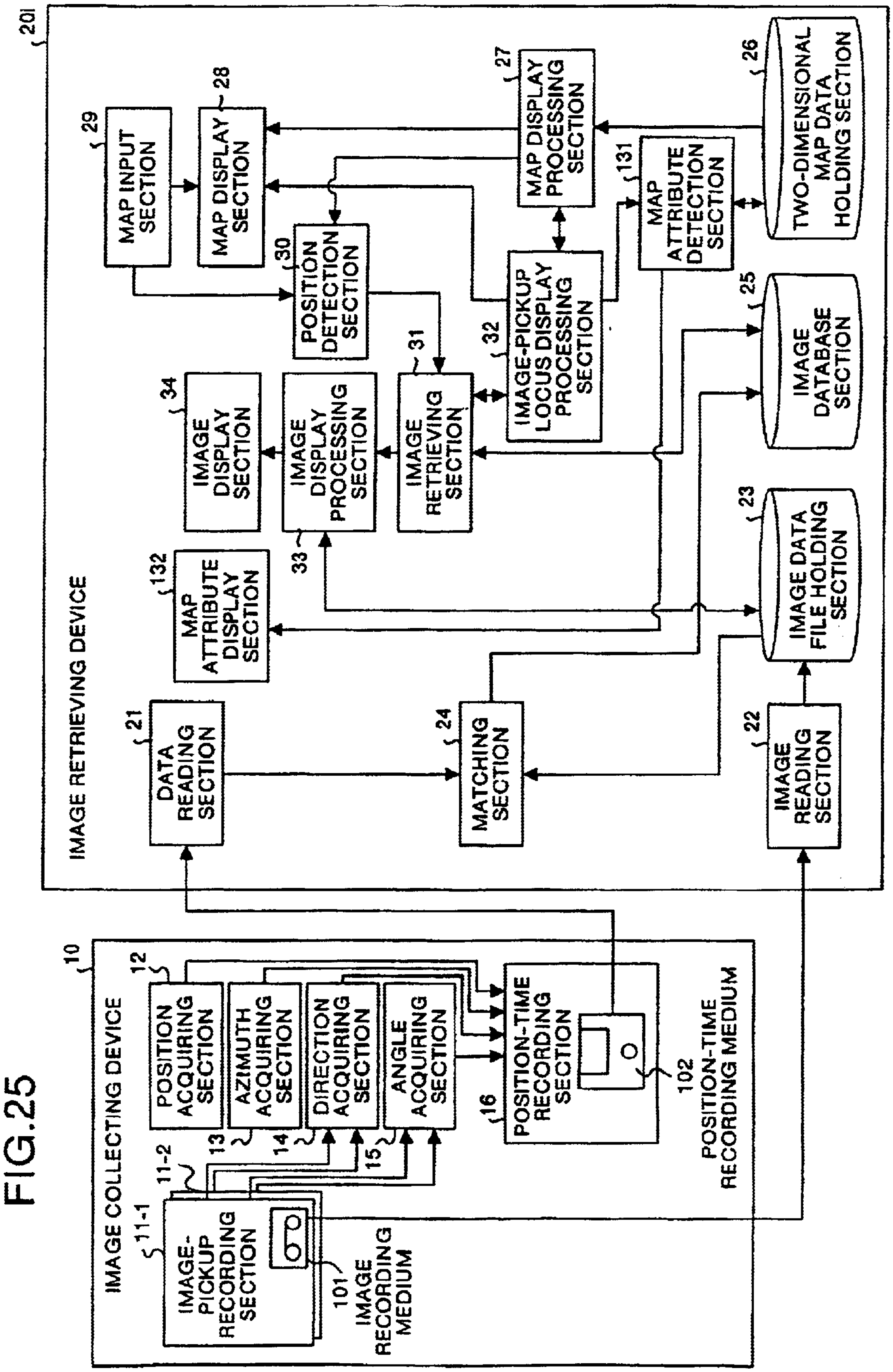
FIG. 25 is a block diagram that shows a construction of an image retrieving device in accordance with an eleventh embodiment of the present invention.

FIG. 25 is a block diagram that shows a construction of an image retrieving device in accordance with the eleventh embodiment of the present invention. Referring to FIG. 25, after the image-pickup locus display processing section 32 has acquired a two-dimensional range to be displayed on the map display section 28, this image retrieving device **20*i* outputs this information of the two-dimensional range to a map attribute detection section 131. The map attribute detection section 131 retrieves the two-dimensional map data holding section 26 for map attribute information located within the two-dimensional range, and outputs the resulting information to a map attribute display section 132. The map attribute display section 132 displays the map attribute information. By placing the map attribute display section 132 at a fixed position adjacent to the image display section 34**, it becomes possible to display the map attribute information such as a place name at the fixed position on the screen. The other constructions are the same as those of the first embodiment, and the same elements are indicated by the same reference numbers.

Figure 26:
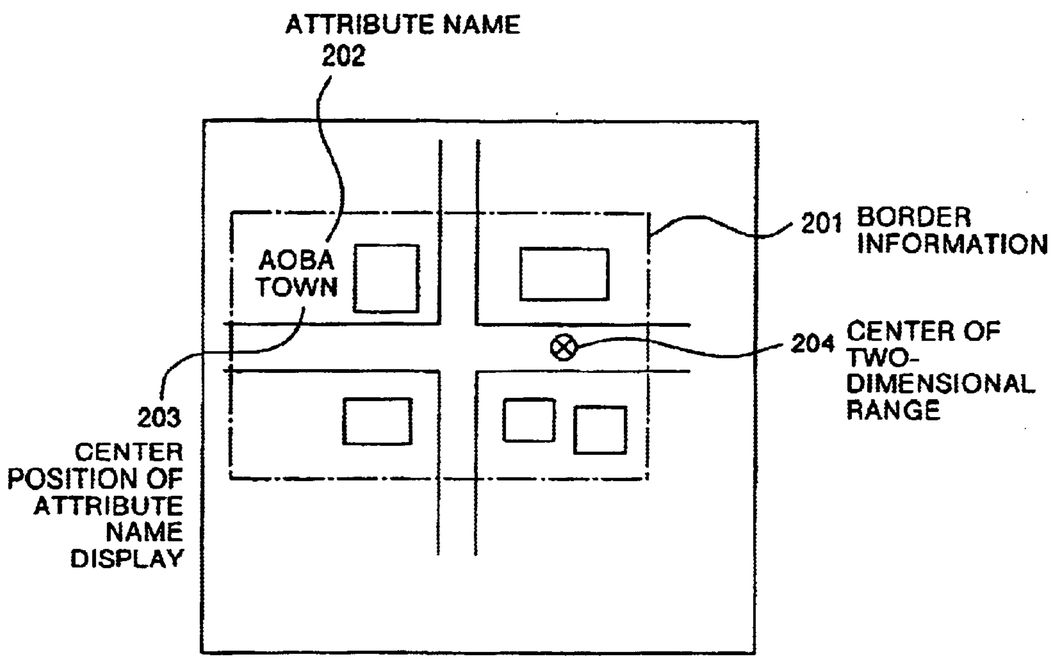
FIG. 26 is a drawing that explains a state of a map attribute retrieving process on a two-dimensional map.

Referring to FIG. 26, an explanation will be given of a case in which the image attribute detection section 131 detects the map attribute. FIG. 26 shows two-dimensional map information. This two-dimensional map information consists of border information 201 of cities, towns, villages and streets, attribute names 202 that are map attribute information within the border and center positions 203 for attribute name display. However, it is not provided with map attribute information at an arbitrary point on the map.

Upon receipt of the center 204 of the two-dimensional range acquired from the image-pickup locus display processing section 32, the map attribute detection section 131 retrieves for an attribute name 202 having the center position 203 for attribute name display that is closest to the center 204 of the two-dimensional range, and located in a range that does not bridge any border information 201, and outputs the resulting attribute name to the map attribute display section 132 as map attribute information.

Twelfth Embodiment

A twelfth embodiment of the present invention will now be explained. In the eleventh embodiment, the map attribute such as a place name is displayed on the map attribute display section 132. However, images having the corresponding place name as the image-pickup point are neither retrieved nor displayed. In the twelfth embodiment, the map attribute information is held in the image database section 25 so that images having the image-pickup position that is coincident with the corresponding position of the map attribute information are reproduced and displayed.

Figure 27:
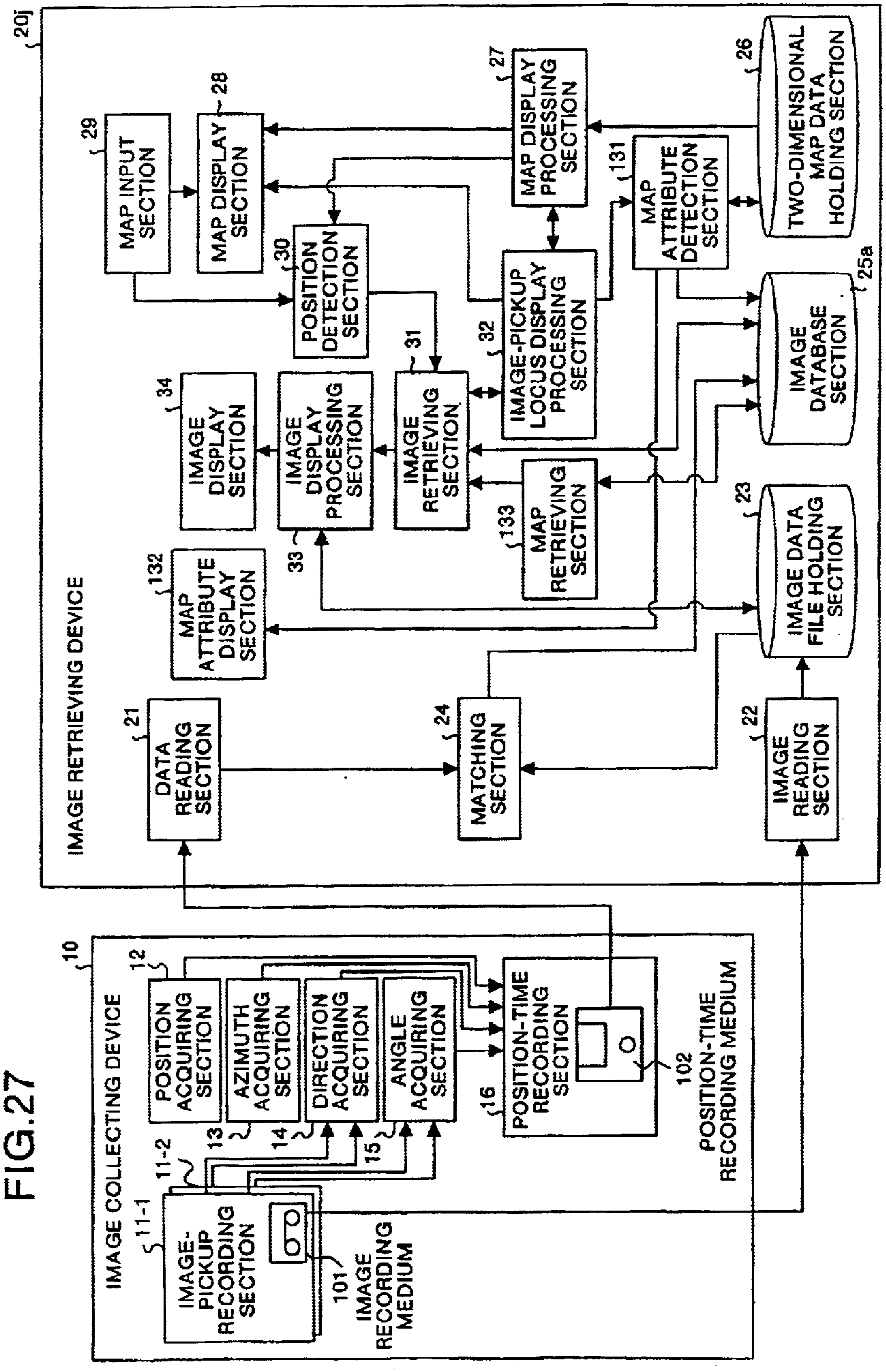
FIG. 27 is a block diagram that shows a construction of an image retrieving device in accordance with a twelfth embodiment of the present invention.

FIG. 27 is a block diagram that shows a construction of an image retrieving device in accordance with the twelfth embodiment of the present invention. In this image retrieving device **20*j* shown in FIG. 27, an image database 25*a* holds the map attribute information detected by the map attribute detection section 131 in a manner so as to form a pair with the image-pickup information. The map retrieving section 133 retrieves the image database section 25***a* for the image-pickup position information that is coincident with the character string of the map attribute, and outputs the resulting information to the image retrieving section 31. The image retrieving section 31 outputs the image pick-up position information corresponding to the map attribute information to the image display section 34 so that the image display section 34 reproduces and displays the image corresponding to the position. The other constructions are the same as those of the eleventh embodiment, and the same elements are indicated by the same reference numbers.

Figure 28:
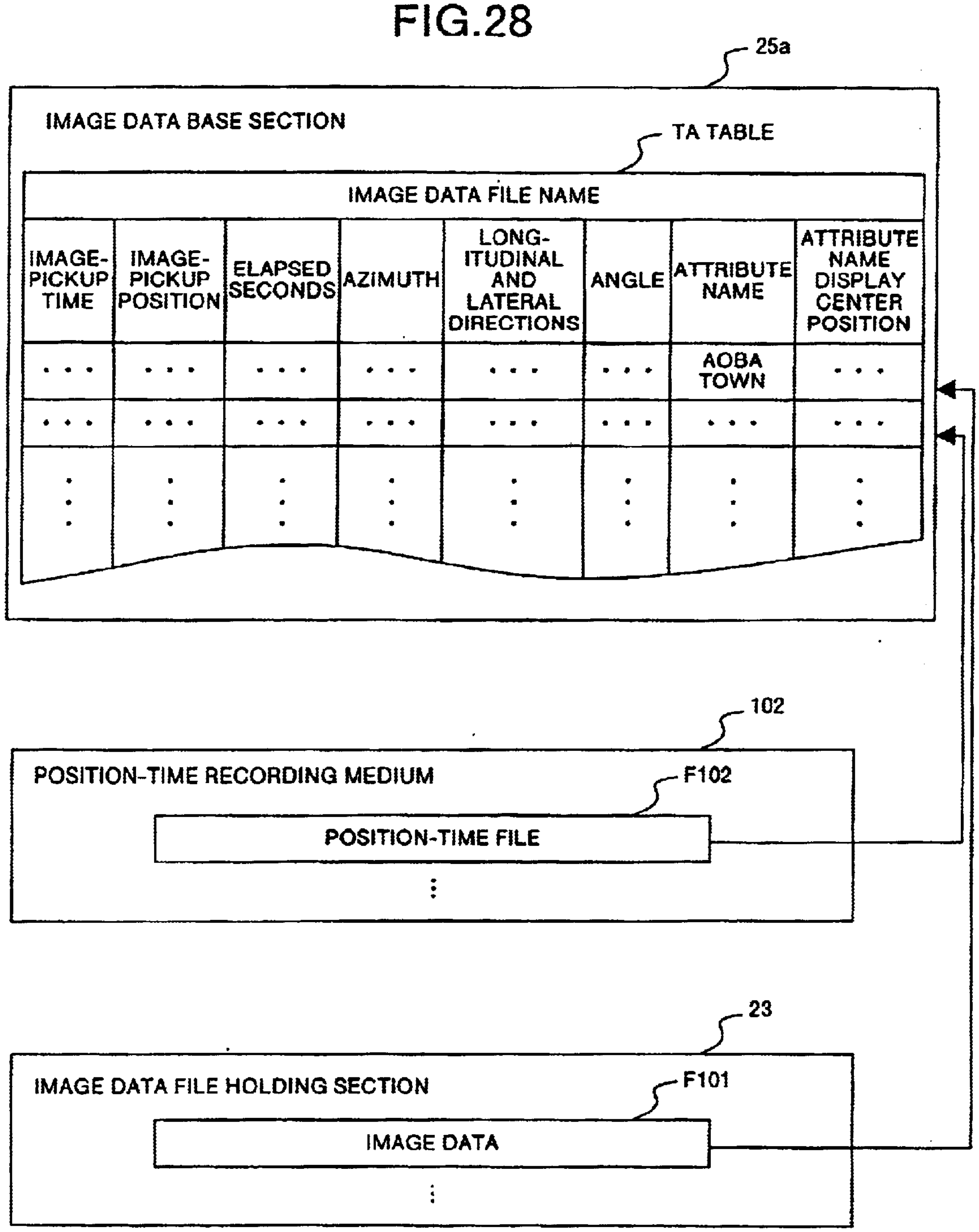
FIG. 28 is a drawing that shows the contents in an image database section shown in FIG. 27.

FIG. 28 shows the contents of a table TA of an image database section 25*a* provided in the twelfth embodiment of the present invention. The image database section 25*a* is allowed to have the map attribute information as shown in FIG. 28 so that it is possible to retrieve for the images having the corresponding image-pickup position by using the map attribute information as a key.

Thirteenth Embodiment

A thirteenth embodiment of the present invention will now be explained. In the first embodiment, the map input section 29 specifies an image-pickup position on the map so that the corresponding images are reproduced and displayed on the image display section 34. However, it does not have an arrangement in which, by specifying a position at which a subject such as a house is located on the map, the corresponding images of the subject are reproduced and displayed. In the thirteenth embodiment, each of the subject positions of the images and each of the image-pickup positions are matched with each other in such a manner that by specifying a certain position at which a subject is located on the map, the corresponding images are reproduced and displayed.

Figure 29:
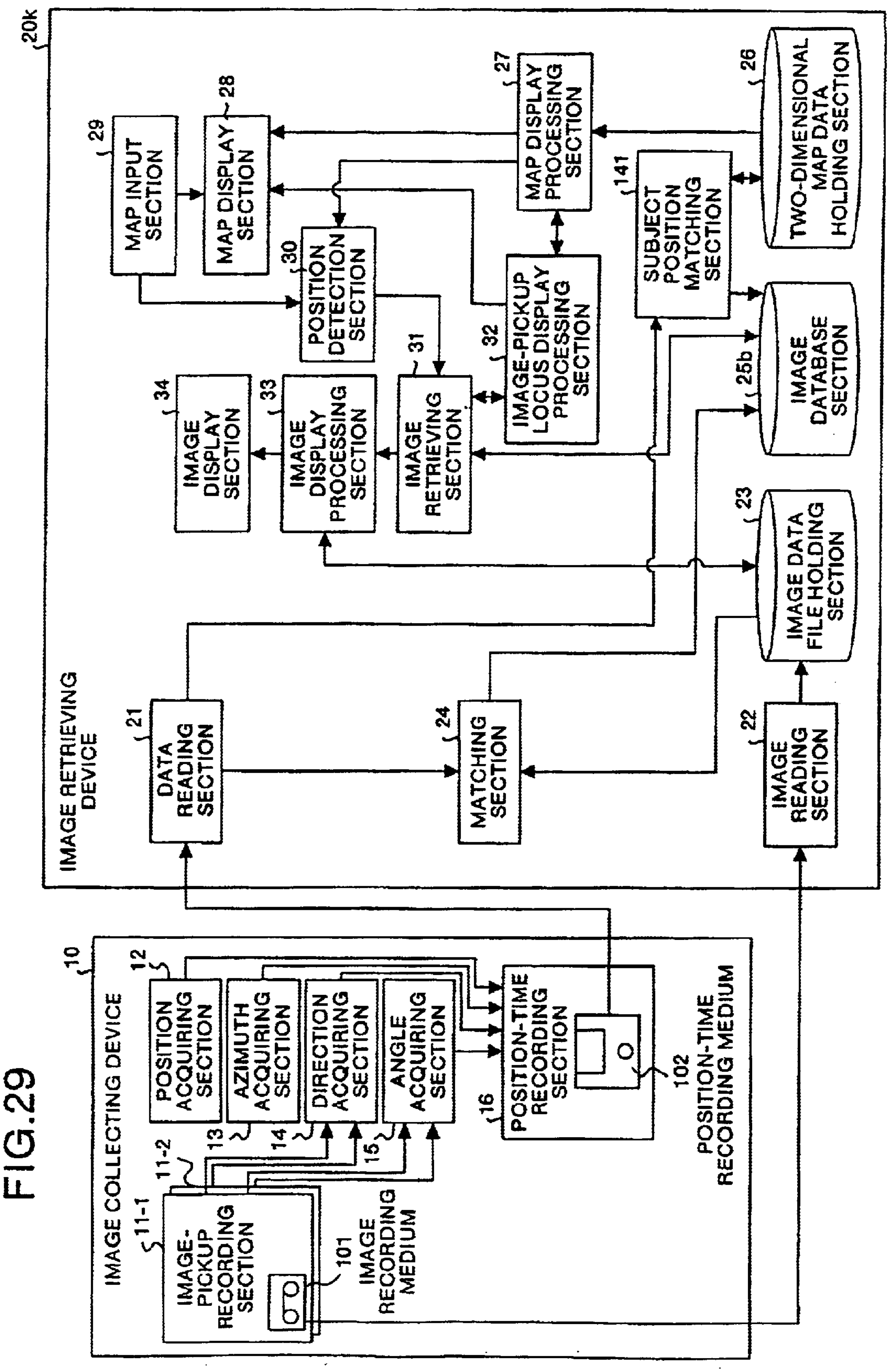
FIG. 29 is a block diagram that shows a construction of an image retrieving device in accordance with a thirteenth embodiment of the present invention.

FIG. 29 is a block diagram that shows a construction of an image retrieving device in accordance with the thirteenth embodiment of the present invention. Referring to FIG. 29, the image retrieving device 20*k* outputs data of the image-pickup position read by the data reading section 21 not only to the matching section 24, but also to a subject-position matching section 141. The subject-position matching section 141 uses two-dimensional map information held in the two-dimensional map data holding section 26 so as to calculate advancing directions of the subject position and the image collecting device 10, and outputs the results thereof to the image database section 25*b*.

The image database section 25*b* records the subject-position information and advancing directions together with the information described in the first embodiment of the present invention. The map input section 29 inputs a subject position, and outputs this to the position detection section 30. The position detection section 30 retrieves for the images corresponding to the subject position through the image retrieving section 31, and outputs the resulting images to the image display processing section 33. The image display section 34 displays the images that correspond to the subject position. The other constructions are the same as those of the first embodiment, and the same elements are indicated by the same reference numbers.

Figure 30:
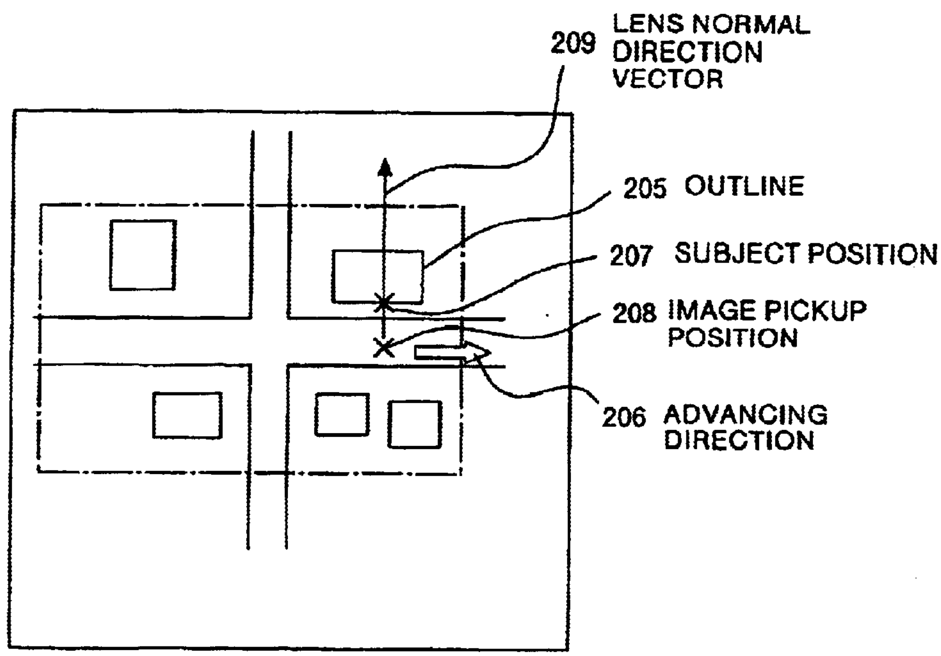
FIG. 30 is a drawing that explains a matching process between a subject position and an image pickup position on a two-dimensional map.

Referring to FIG. 30, an explanation will be given of a matching method between the subject position and the image-pickup position that is carried out by the subject-position matching section 141. FIG. 30 shows two-dimensional map information in which an outline 205 of a house serving as a subject is drawn. Based upon the image-pickup time information in the image database section 25*b*, comparisons are made between the pieces of image-pickup position information, that is, between the time ti and a period of time $t2=t1+\Delta t$ so that the advancing direction of the image collecting device 10 is calculated. Since the lens direction of the image collecting device has been preliminarily fixed to, for example, 90 degrees to the left with respect to the advancing direction 206, the subject position 207 is set to a point at which a vector 209 in the normal direction to the lens, released from the point located at the image-pickup position 208, is allowed to cross the outline 205 of the house at the position closest to the lens. In this manner, the subject position 207 and the image-pickup position 208 are matched with each other.

Figure 31:
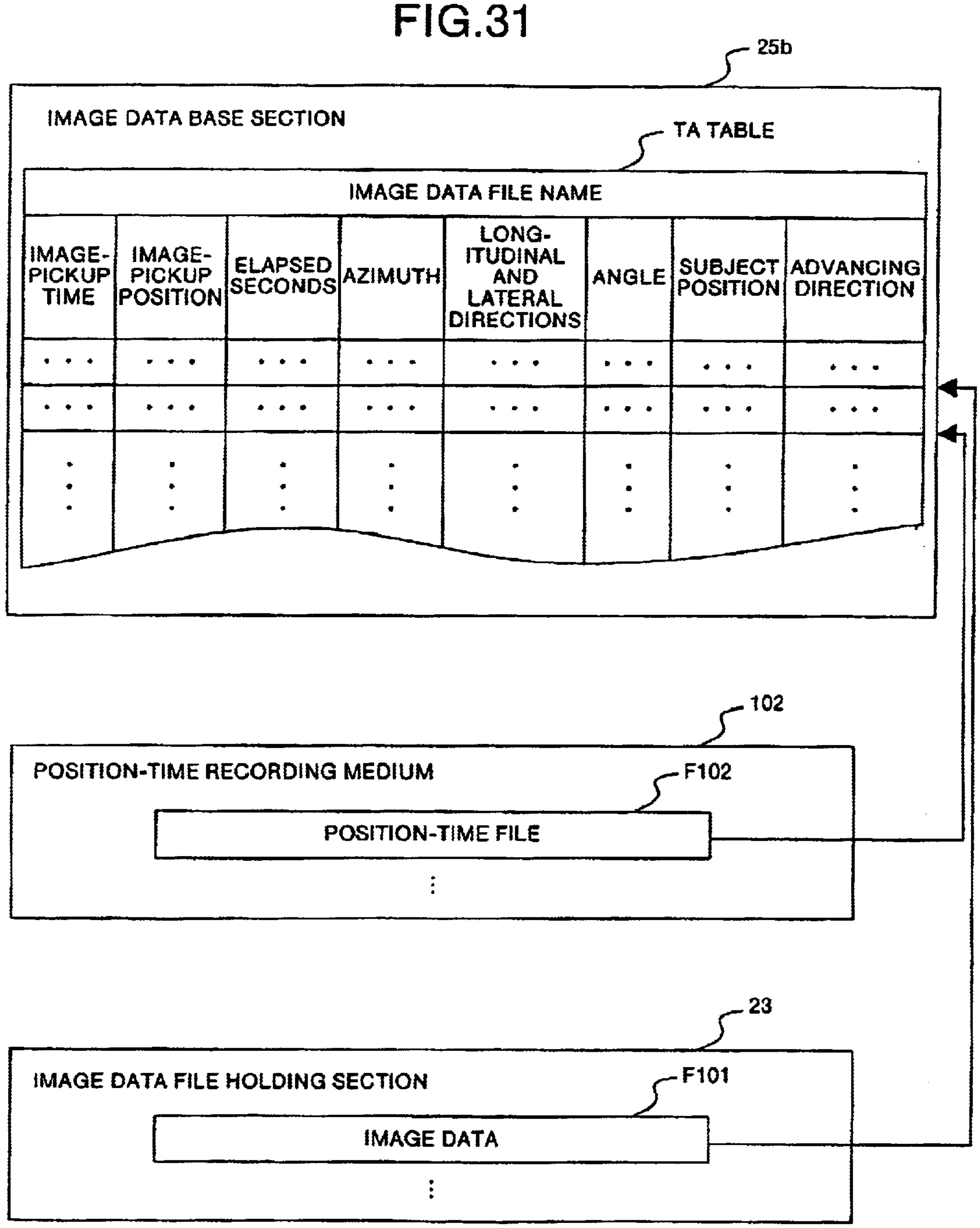
FIG. 31 is a drawing that shows the contents of an image database section shown in FIG. 29.

FIG. 31 shows the contents of a table TA of an image database section 25*b* provided in the thirteenth embodiment of the present invention. The image database section 25*b* is allowed to have the subject position information and the advancing direction as shown in FIG. 31 so that it is possible to retrieve the image database 25*b* for the data having the subject-position information close to the subject position, by using the subject position as a key, and consequently to retrieve images having the corresponding image-pickup position.

Fourteenth Embodiment

A fourteenth embodiment of the present invention will now be explained. In the thirteenth embodiment, the subject image is displayed on the imaged is play section 34. However, since the wall face of the subject does not necessarily make a right angle with respect to the lens face, the wall face of the subject of the images does not necessarily faces right in front. In the fourteenth embodiment, the angle made by the subject face of the images with respect to the lens is detected, and distortion caused by the angle is corrected when displayed so that the images in which the wall face of the subject faces right in front are displayed.

Figure 32:
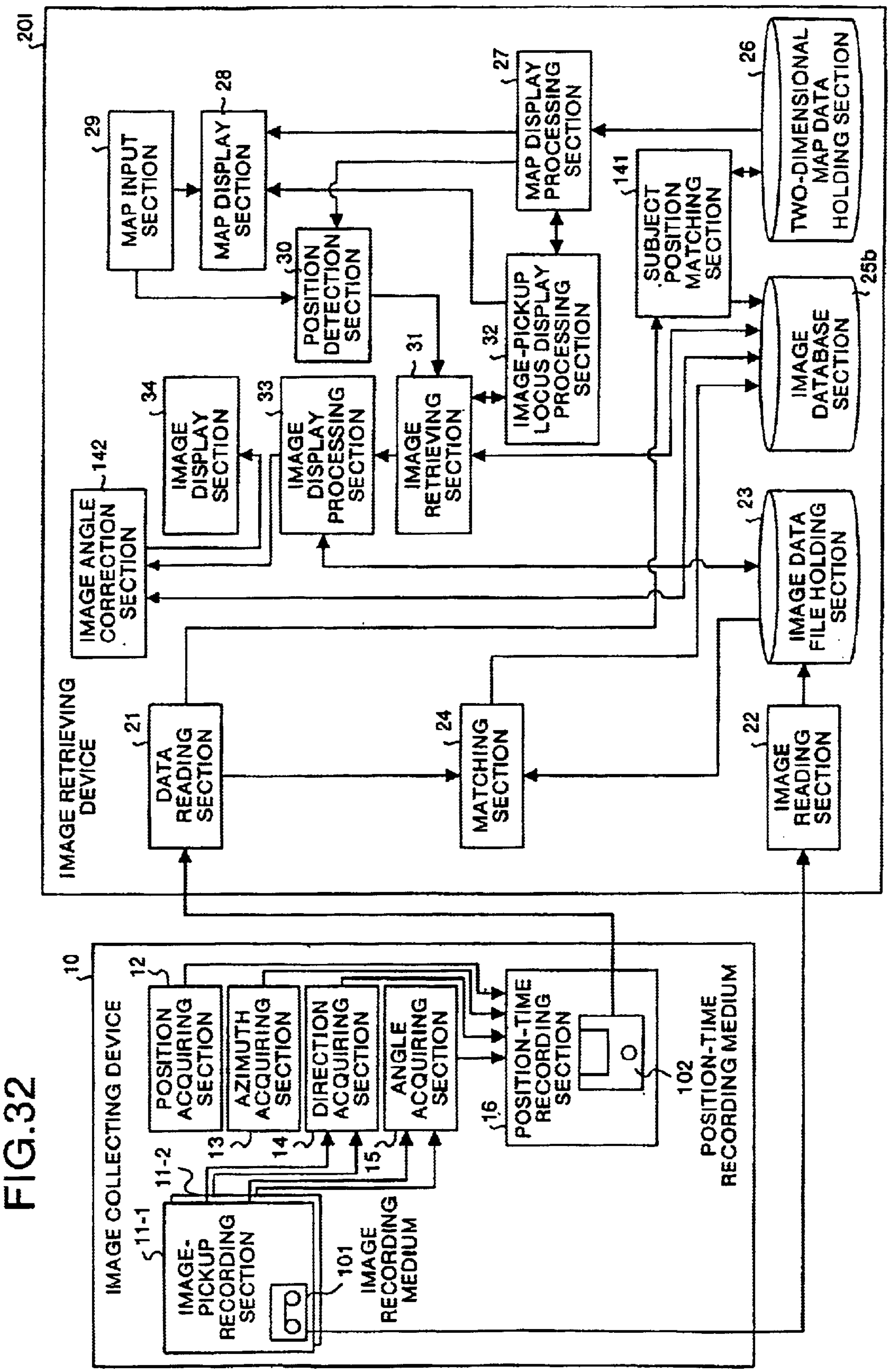
FIG. 32 is a block diagram that shows a construction of an image retrieving device in accordance with a fourteenth embodiment of the present invention.

FIG. 32 is a block diagram that shows a construction of an image retrieving device in accordance with the fourteenth embodiment of the present invention. As shown in FIG. 32, in this image retrieving device 201, in addition to the subject-position information explained in the thirteenth embodiment, the subject-position matching section 141 finds an angle between the line of the outline 205 of a house closest to the image pickup position and the advancing direction of the image collecting device 10, and stores the angle in the image database section 25*b*.

Moreover, the image retrieving device 201 processes the image data corresponding to the subject contained in the display processing section 33 by using the operation explained in the thirteenth embodiment, and outputs the resulting image data to an image angle correction section 142. The image angle correction section 142 corrects distortion in the images due to the above-mentioned angle stored in the image database section 25*b*, and outputs the resulting images in which the distortion has been corrected to the image display section 34. The other constructions are the same as those of the thirteenth embodiment, and the same elements are indicated by the same reference numbers.

Figure 33:
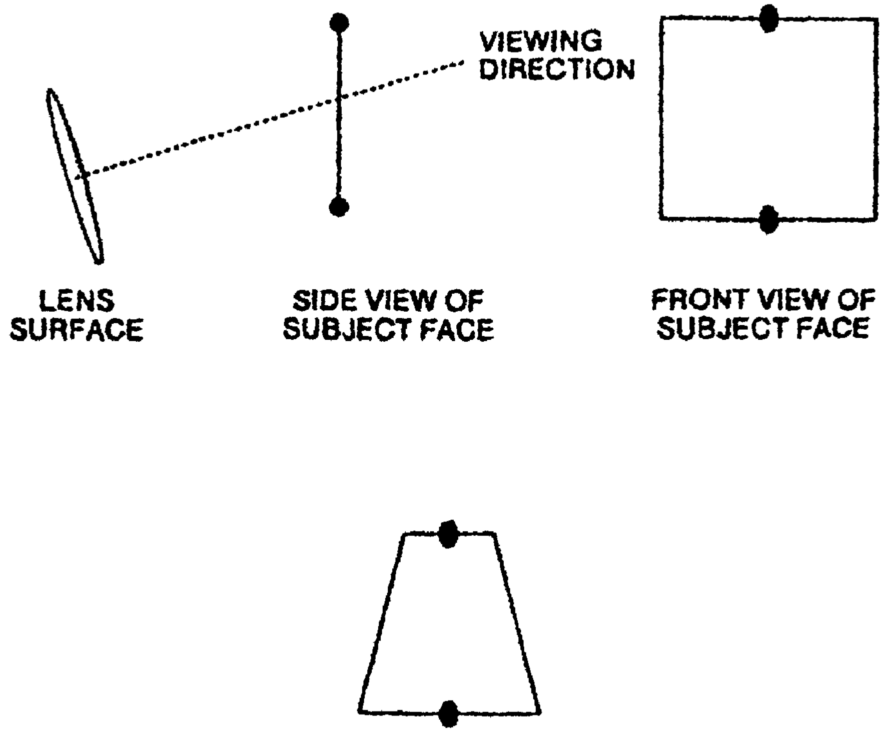
FIG. 33 is a drawing that shows one example of a distortion caused by the angle between the subject face and the lens face.
Figure 34:
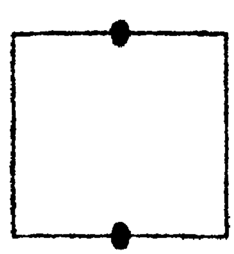
FIG. 34 is a drawing that shows one example in which the distortion caused by the angle between the subject face and the lens face has been corrected.

Referring to FIGS. 33 and 34, an explanation will be given of the process in which the image angle correction section 142 corrects distortion in the images due to the angle. FIG. 33 shows a trapezoidal distortion that is generated when the lens face is not in parallel with the subject face. The trapezoidal distortion is fixed depending on angles between the lens face and the subject face. Therefore, this trapezoid is corrected so as to obtain an image free from the distortion as shown in FIG. 34. In this case, although portions other than the corresponding wall face are subject to new image distortion due to the correction, the distortion in the other portions is ignored since only the corresponding wall face is taken into consideration.

Fifteenth Embodiment

A fifteenth embodiment of the present invention will now be explained. In the fourteenth embodiment, the subject image that has been subjected to the angle correction is displayed on the image display section 34 with respect to each image screen. However, depending on the layout of the lens face, there are some cases in which the angle to be corrected is fixed all through the image, and in such cases, it is not efficient to calculate the angle to be corrected with respect to each of the screens. In the fifteenth embodiment, the distortion of images obtained from an image collecting device 10 that is placed with the lens face being set to have a known fixed angle difference from the horizontal direction is corrected with respect to the entire image.

Figure 35:
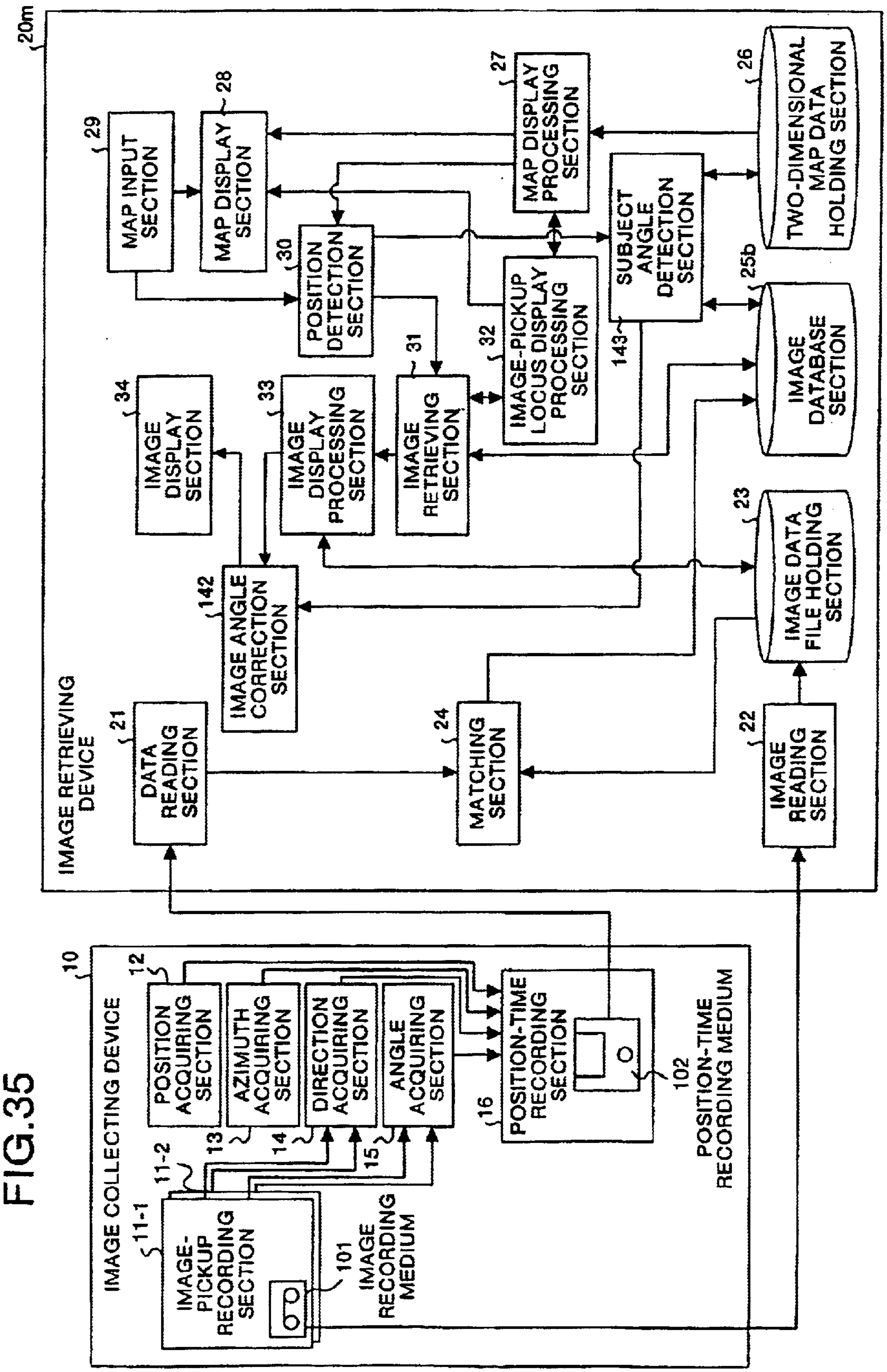
FIG. 35 is a block diagram that shows a construction of an image retrieving device in accordance with a fifteenth embodiment of the present invention.

FIG. 35 is a block diagram that shows a construction of an image retrieving device in accordance with the fifteenth embodiment of the present invention. As shown in FIG. 35, in this image retrieving device 20*m*, the image angle correction section 142 corrects the distortion of images due to the known angle difference with respect to images obtained from the image display processing section 33, and outputs the resulting images to the image display section 34. The operation of the image angle correction go section 142 is the same as that of the fourteenth embodiment. However, the angle to be corrected is preliminarily set.

The position detection section 30 outputs the image-pickup position information also to the subject-angle detection section 143. The subject-angle detection section 143 retrieves the image database section 25*b* for the subject position and the advancing direction of the image collecting device 10 with respect to the image-pickup position, and based upon the advancing direction, calculates the angle of the lens face of the image collecting device 10. Moreover, the subject-angle detection section 143 detects the house outline information corresponding to the subject position that is held in the two-dimensional map data holding section 26 with respect to this image-pickup position, and also detects the angle between the lens face and the subject face, and then outputs the resulting data to the image angle correction section 142.

The image angle correction section 142 corrects the distortion of images due to the above-mentioned angle with respect to the image data obtained from the image display processing section 33, and outputs the resulting data to the image display section 34. The other constructions are the same as those of the first embodiment, and the same elements are indicated by the same reference numbers. With this arrangement, the image retrieving device 20*m* makes it possible to correct the distortion of images due to the angle between the subject and the lens, and to properly retrieve and display the images.

Sixteenth Embodiment

A sixteenth embodiment of the present invention will now be explained. In the first embodiment, the image-pickup loci are displayed on the image display section 28, and these image-pickup loci are determined by receiving GPS signals. Therefore, due to errors, etc., upon receiving the GPS signals, there is a deviation from the actual image-pickup position, and on the map, the image-pickup locus is not necessarily coincident with the road from which the images are pickup up. In the sixteenth embodiment, based upon the road information on the map, etc., the locus is corrected in the map display section 28, and properly placed on the corresponding road.

Figure 36:
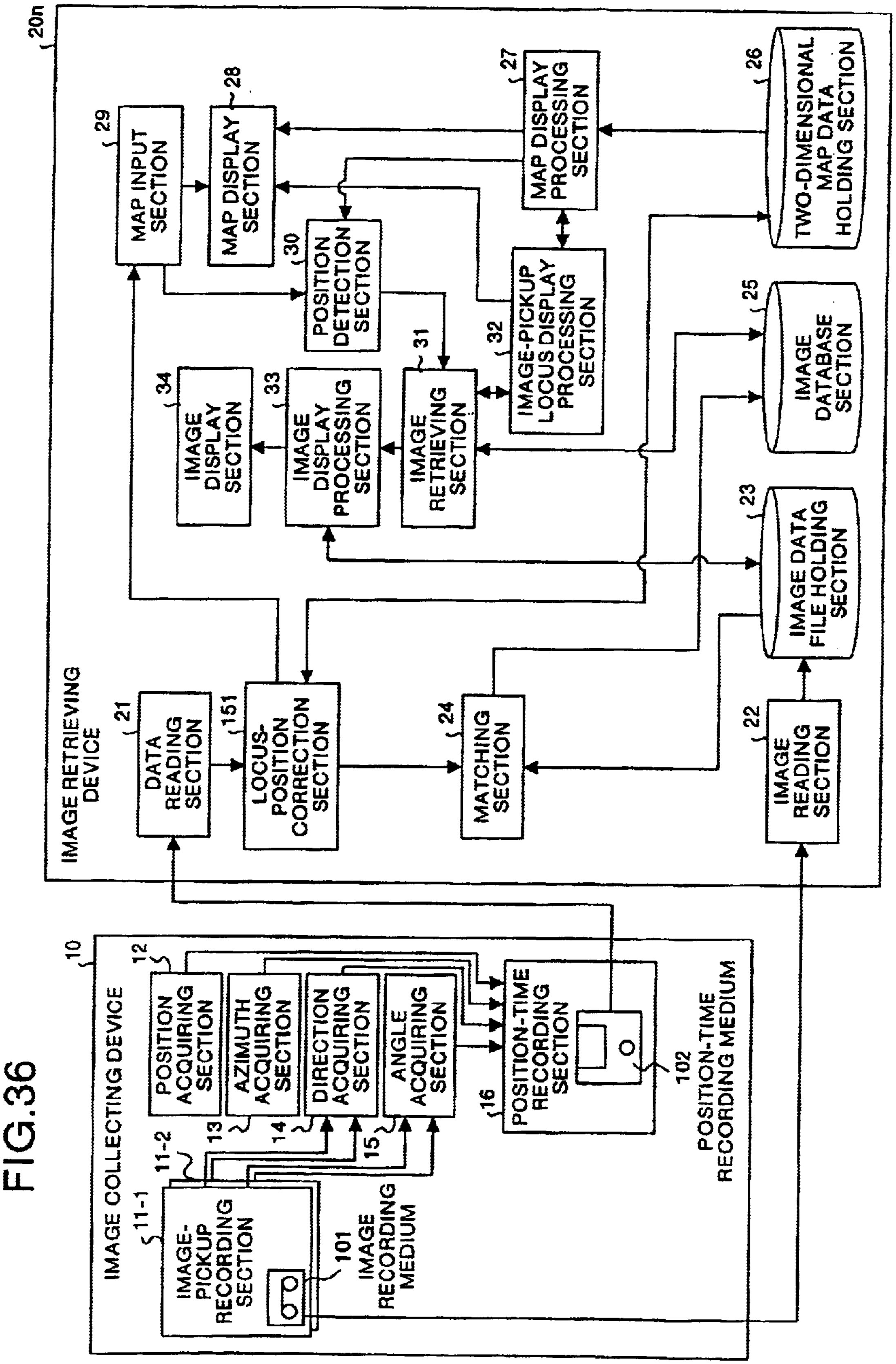
FIG. 36 is a block diagram that shows a construction of an image retrieving device in accordance with a sixteenth embodiment of the present invention.

FIG. 36 is a block diagram that shows a construction of an image retrieving device in accordance with the sixteenth embodiment of the present invention. Referring to FIG. 36, this image retrieving device 20*n* outputs data of the image-pickup position read by the data reading section 21 not to the matching section 24 as in the case of the first embodiment, but to a locus-position correction section 151. Based upon the two-dimensional map stored in the two-dimensional map data holding section 26, this locus-position correction section 151 corrects image-pickup position information along the corresponding road, and outputs the corrected image-pickup position information data to the matching section 24. The other constructions are the same as those of the first embodiment, and the same elements are indicated by the same reference numbers.

Figure 37:
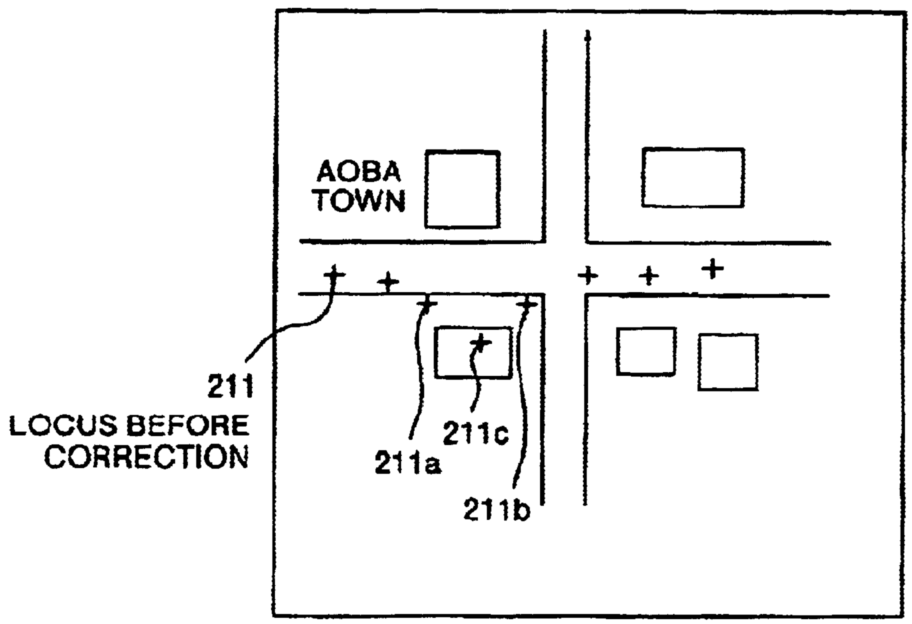
FIG. 37 is a drawing that shows a state of a locus display prior to correction on a two-dimensional map.
Figure 38:
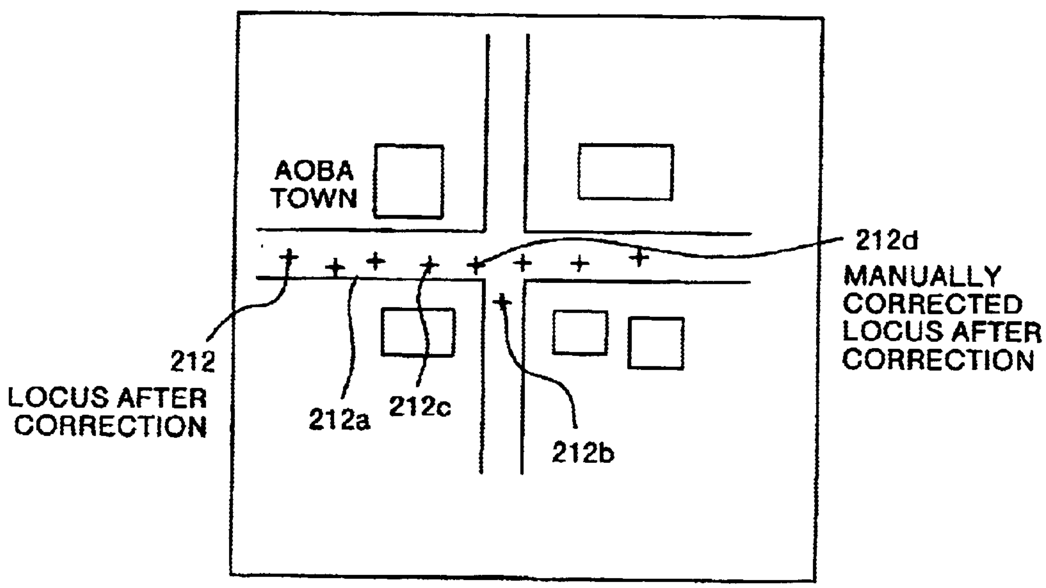
FIG. 38 is a drawing that shows a state of the locus display after correction on the two-dimensional map.

Referring to FIGS. 37 and 38, an explanation will be given of one example of a method by which the locus-position correction section 151 corrects locus positions. FIG. 37 shows two-dimensional map information and loci 211 thereon before the correction, and FIG. 38 shows the two-dimensional map information and loci 212 thereon after the correction.

If some of the loci 211 before the correction are not on the road of the two-dimensional map, a point that is closest to the road is found, and when the distance is less than a predetermined threshold value, for example, as in the case of a locus 211*a* and a locus 211*b*, they are automatically corrected to a point 212*a* and a point 211*b* on the road. Moreover, when the distance is not less than the predetermined threshold value, the two-dimensional map information in the current state and a locus 211*c* before the correction are displayed on the map display section 28, and a correcting operation is manually carried out so that the user corrects the locus 212*c* by using the map input section 29. Moreover, if the position of the automatically corrected locus 212*b* is considered to be not correct by the user based upon the peripheral conditions, the user can correct the locus to 212*d* by using the map input section 29. Thus, it becomes possible to correct locus positions that are not located on the corresponding road.

Seventeenth Embodiment

A seventeenth embodiment of the present invention will now be explained. In the first embodiment, the lens direction of the image collecting device 10 is set to one direction, and in order to pick up images in all circumferential directions including longitudinal and lateral directions, a plurality of image collecting devices are required. However, in a seventeenth embodiment, an image collecting device having a fish-eye lens is placed so that image-pickup operations in all circumferential directions can be carried out by using a single image collecting device.

Figure 39:
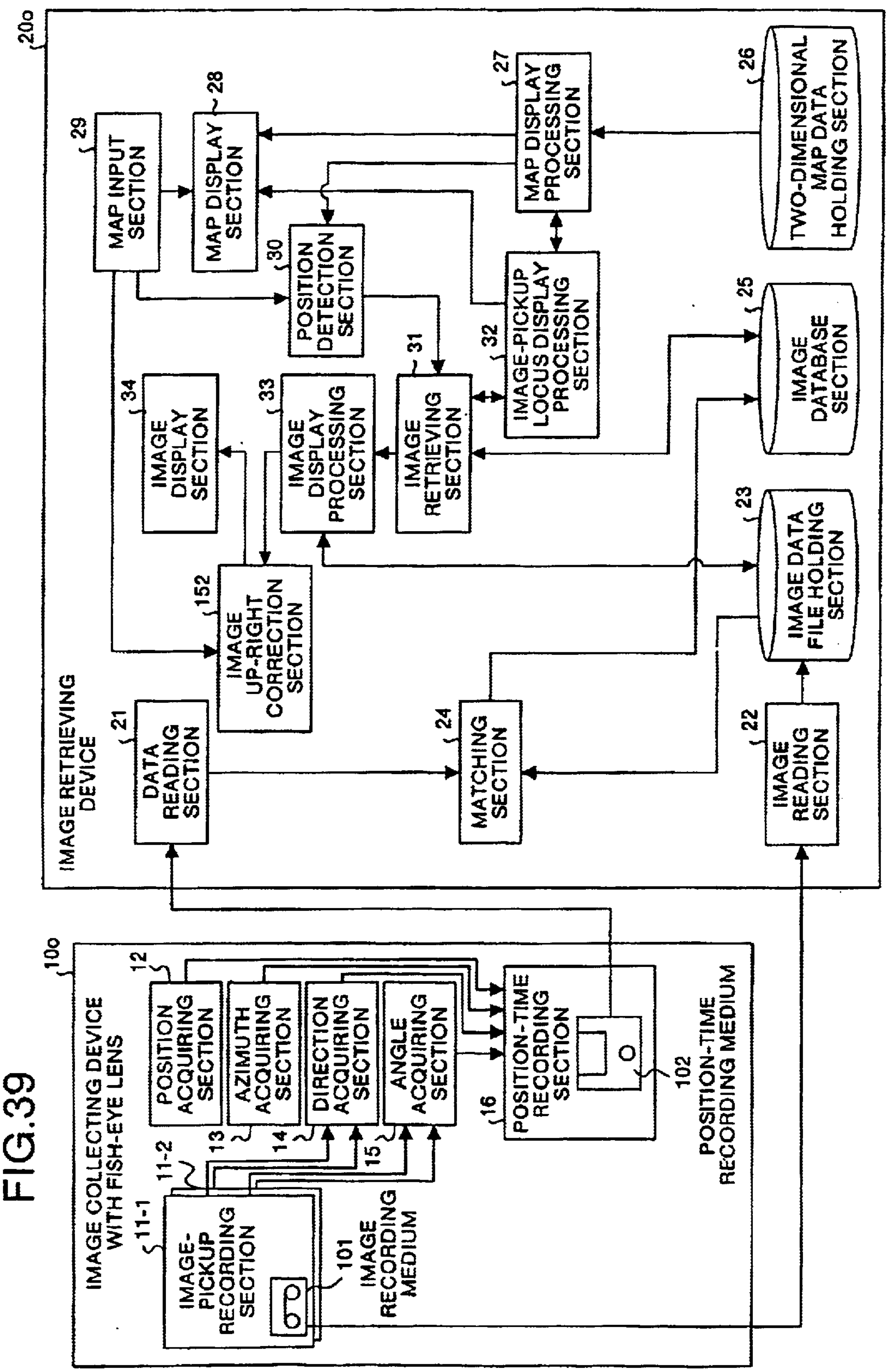
FIG. 39 is a block diagram that shows a construction of an image retrieving device in accordance with a seventeenth embodiment of the present invention.

FIG. 39 is a block diagram that shows a construction of an image retrieving device in accordance with the seventeenth embodiment of the present invention. As shown in FIG. 39, in this image retrieving device 20*o*, an image collecting device 10*o* is provided with a fish-eye lens so that images in all circumferential directions are obtained; thus, the images in all circumferential directions are stored in the image data file holding section 23, and outputted to the image display processing section 33 upon receipt of an instruction from the map input section 29.

The map input section 29 inputs and specifies not only information of the image-pickup position, but also the display direction, and an image up-right correction section 152 selects an image portion in the specified display direction among images in all the circumferential directions obtained from the image display processing section 33, and corrects the image to an up-right image, and outputs the resulting image to the image display section 34. The other constructions are the same as those of the first embodiment, and the same elements are indicated by the same reference numbers.

Figure 40:
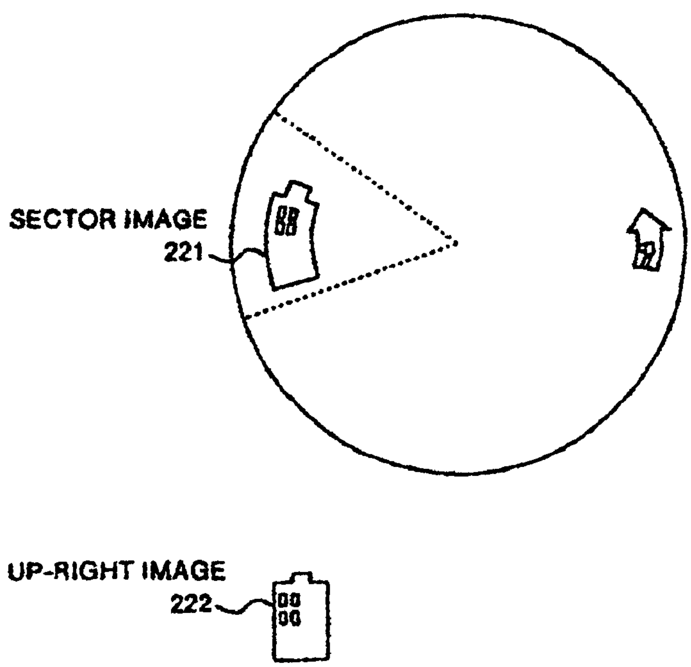
FIG. 40 is a drawing that shows on example of an all-around image.

Referring to FIG. 40, an explanation will be given of one example of a method by which the image up-right correction section 152 corrects the image. FIG. 40 shows an example of the images in all the circumferential directions. Among the images in all the circumferential directions, an are a corresponding to the direction specified by the map input section 29 forms a sector image 221. The shape of this sector image 221 is fixed so that this is proportionally distributed into a rectangular shape to obtain an up-right image 222.

Eighteenth Embodiment

An eighteenth embodiment of the present invention will now be explained. In the first embodiment, the lens direction of the image collecting device 10 is only one direction, and the resulting image is limited to an image obtained by viewing the scenery through a single eye. In the eighteenth embodiment, an image collecting device is provided with two stereoscopic lenses spaced with a fixed distance so that it is possible to obtain an image obtained by viewing the scenery stereoscopically.

Figure 41:
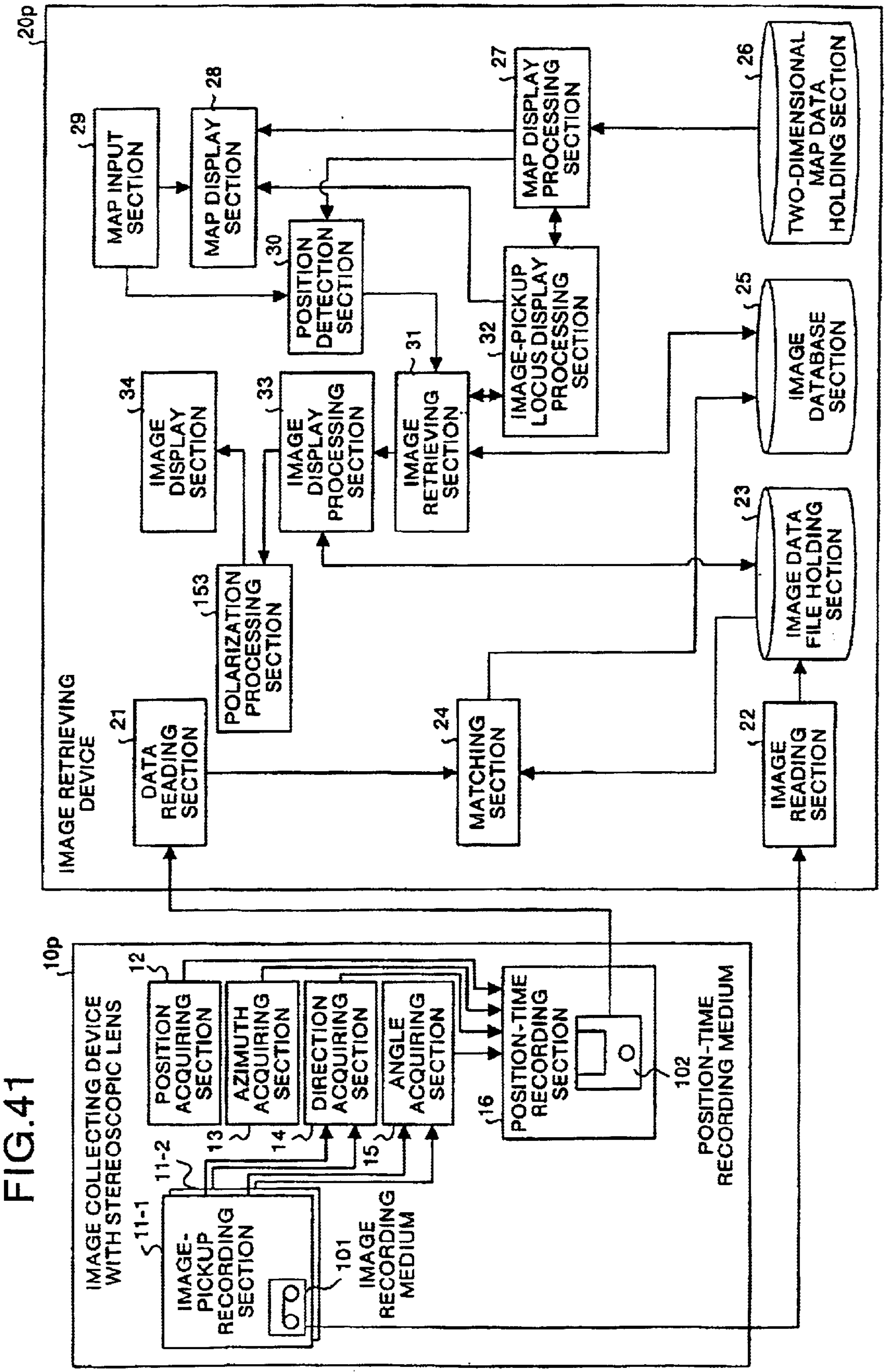
FIG. 41 is a block diagram that shows a construction of an image retrieving device in accordance with an eighteenth embodiment of the present invention.

FIG. 41 is a block diagram that shows a construction of an image retrieving device in accordance with the eighteenth embodiment of the present invention. As shown in FIG. 41, in this image retrieving device 20*p*, an image collecting device 10*p* collects stereoscopic image data through the two stereoscopic lenses spaced with a fixed distance, and the resulting stereoscopic images are held in the image data file holding section 23, and outputted to the image display processing section 33 upon receipt of an instruction from the map input section 29.

The image display processing section 33 carries out the functions described in the first embodiment on the respective two pieces of stereoscopic image data, and the two pieces of stereoscopic image data are outputted to a polarization processing section 153. The polarization processing section 153 carries out longitudinal and lateral polarizing processes on each piece of stereoscopic image data, and outputs the resulting data to the image display section 34, and the image display section 34 displays the two pieces of stereoscopic image data in a combined manner. The other constructions are the same as those of the first embodiment, and the same elements are indicated by the same reference numbers. Thus, the user wearing stereoscopic polarizing glasses is allowed to view the images on the image display section 34 stereoscopically.

Nineteenth Embodiment

A nineteenth embodiment of the present invention will now be explained. In the thirteenth embodiment, the subject images are displayed on the image display section 34, and in this case, the distance between the wall face of the subject and the lens face is not fixed, and the size of the subject image is not in proportion with the size of the actual subject. In the nineteenth embodiment, the distance between the subject face of the images and the lens is detected, and the size of the images determined by this distance is corrected when it is displayed so that the images having a size that is in proportion with the size of the subject are displayed.

Figure 42:
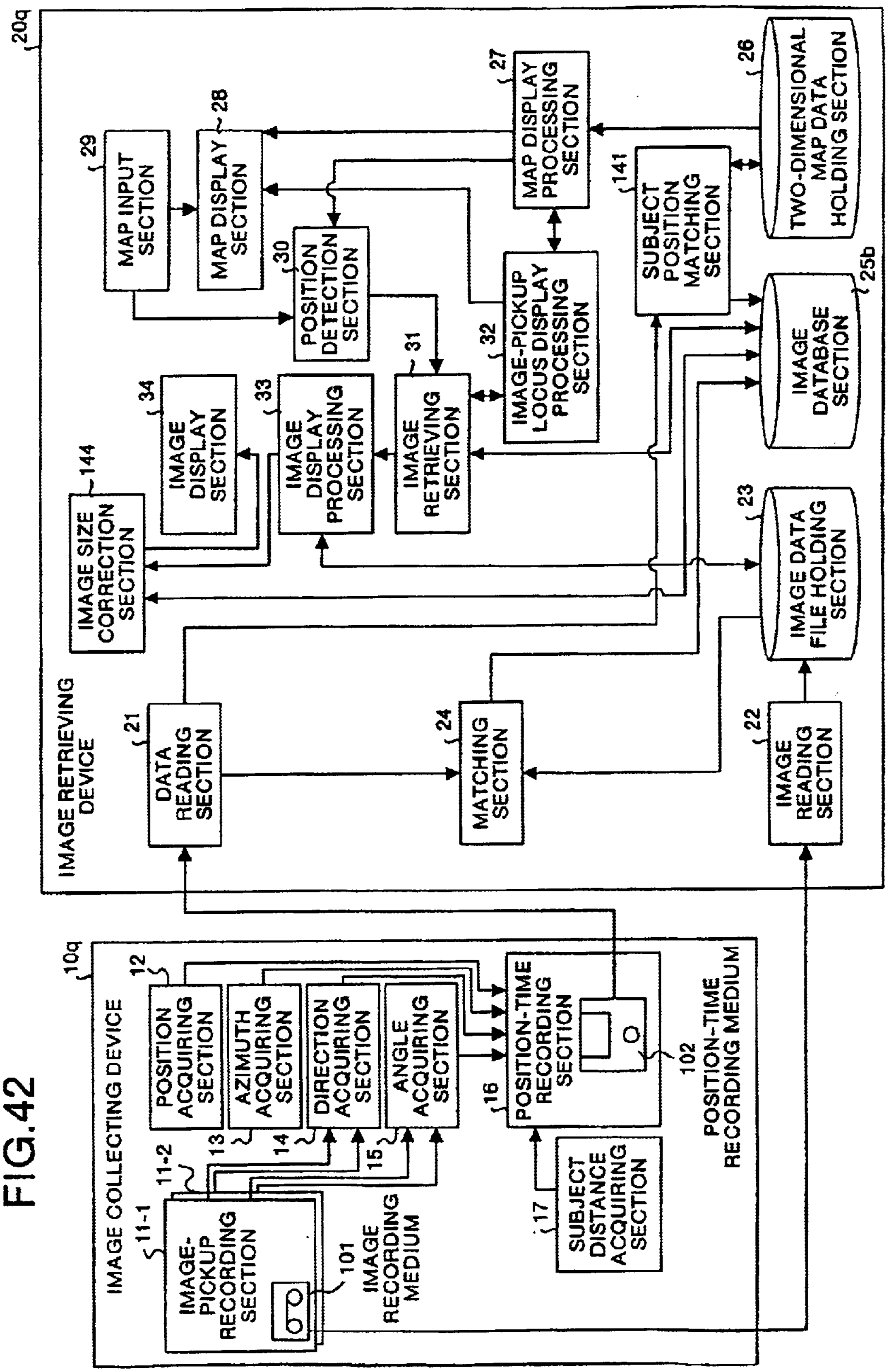
FIG. 42 is a block diagram that shows a construction of an image retrieving device in accordance with a nineteenth embodiment of the present invention.

FIG. 42 is a block diagram that shows a construction of an image retrieving device in accordance with the nineteenth embodiment of the present invention. As shown in FIG. 42, in this image collecting device 10*q*, a subject distance acquiring section 17 acquires the distance from the lens position to the subject face, and the resulting distance is recorded in the position-time recording section 16. The distance, recorded in the position-time recording section 16, is further read by the data reading section 21, and stored in the image database section 25*b*.

Moreover, the image retrieving device 20*q* carries out the operation as described in the thirteenth embodiment so as to process the image data corresponding to the subject placed in the image display processing section 33, and outputs the resulting image data to an image size correction section 144. Based upon the distance stored in the image database section 25*b*, the image size correction section 144 corrects the apparent size of the subject images to the size obtained in the case of a fixed distance from the subject. The other constructions are the same as those of the thirteenth embodiment, and the same elements are indicated by the same reference numbers.

The subject distance acquiring section 17, which is, for example, a range finding device using laser, is installed in the image collecting device 10*q* so as to be aligned with the lens face, and measures the distance from the wall face corresponding to the subject by releasing a laser light beam in the same direction as the lens direction and detecting the laser reflection from the wall face.

Figure 43:
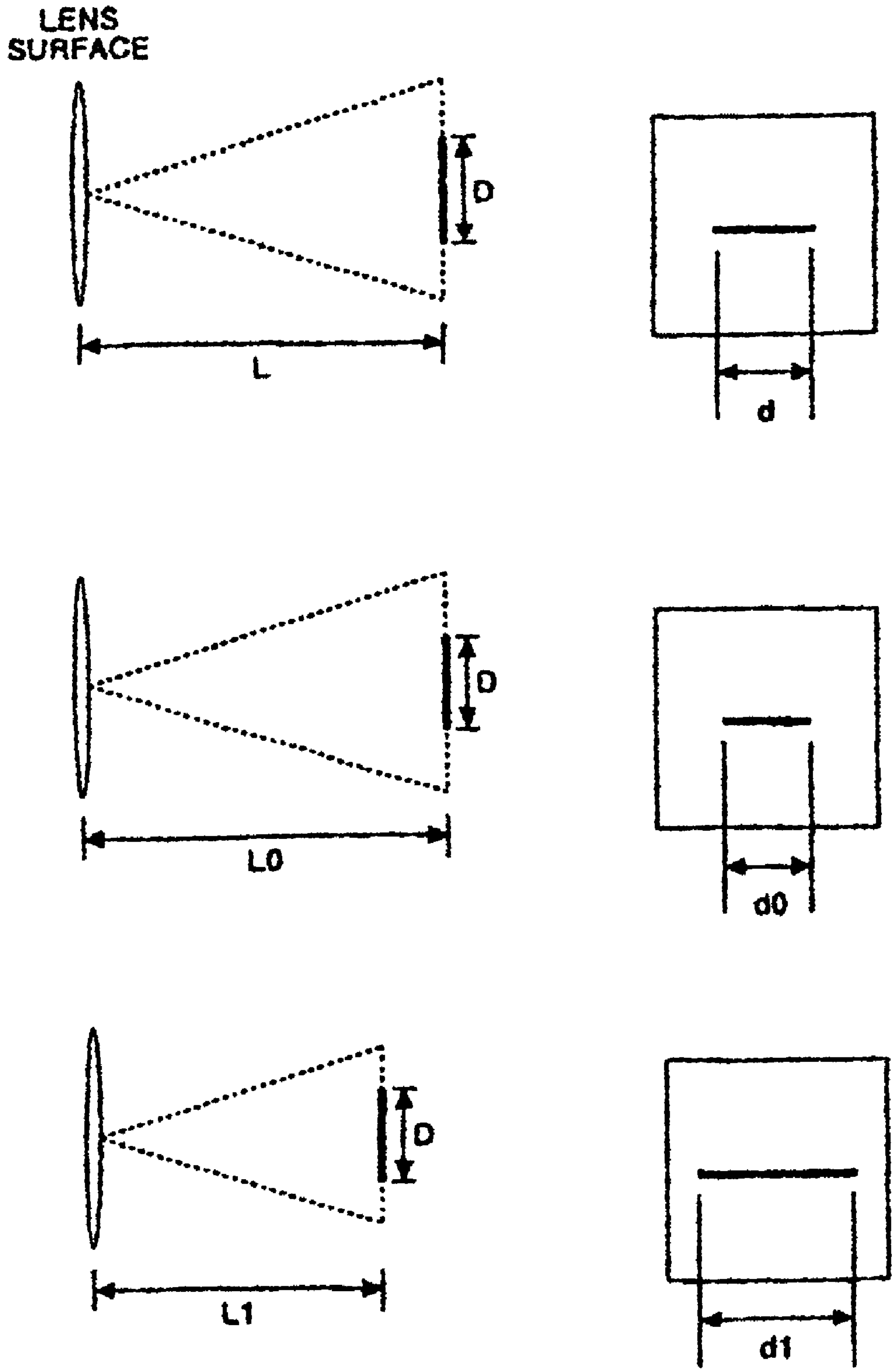
FIG. 43 is a drawing that shows the principle of a perspective method, and explains the size correction of a subject image.

Referring to FIG. 43, an explanation will be given of a method by which the image size correcting section 144 corrects the difference in image sizes due to the distance. FIG. 43 shows a principle of a perspective method. Referring to FIG. 43, the width d on the image of a subject having a width D is inversely proportional to the distance L. Therefore, if the distance is L1, in order to correct the width on the subject image to a width d0 at the distance L0, the image is enlarged or reduced so as to allow the width d1 on the image to satisfy $d \times L1/L0$. In this manner, the difference in image sizes can be corrected. In this case, although portions other than the corresponding wall face are subject to new image size differences due to the correction, the differences in the other portions are ignored since only the corresponding wall face is taken into consideration.

Twentieth Embodiment

A twentieth embodiment of the present invention will now be explained. In the fifth embodiment, an editing process such as a cutting process for image data files is carried out. However, a problem arises in which, with respect to a junction of roads in which a cutting process, etc., is carried out, the user needs to specify it through the map input section 29 each time such a process is required. In the twentieth embodiment, junction data from the two-dimensional map information is preliminarily detected and held so that the editing process such as a cutting process for image data files is automatically carried out with respect to junctions.

Figure 44:
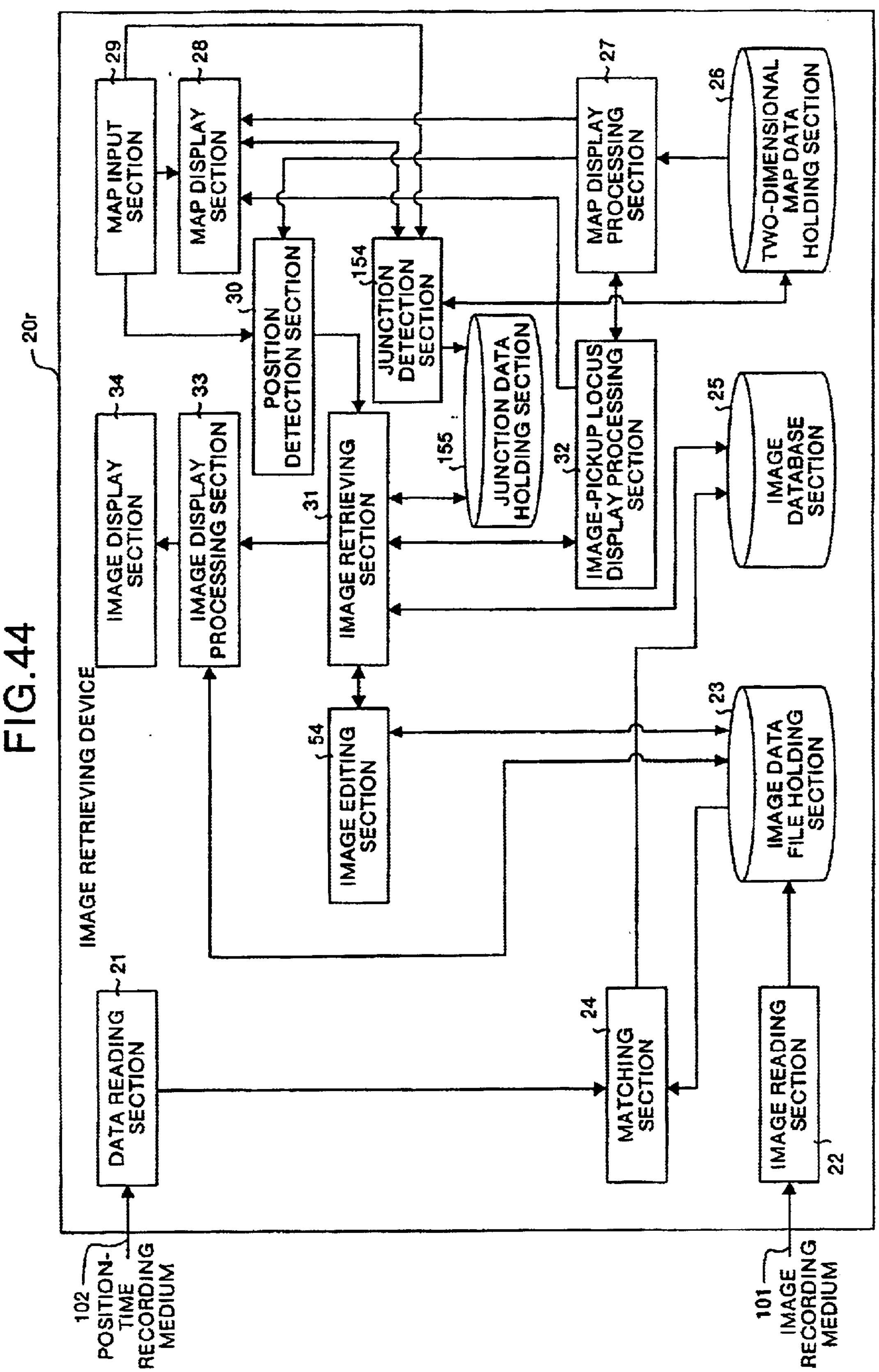
FIG. 44 is a block diagram that shows a construction of an image retrieving device in accordance with a twentieth embodiment of the present invention.

FIG. 44 is a block diagram that shows a construction of an image retrieving device in accordance with the twentieth embodiment of the present invention. As shown in FIG. 44, in this image retrieving device 20*r*, a junction detection section 154 detects a junction by using two-dimensional map information held in the two-dimensional map data holding section 26, and a junction data holding section 155 holds the junction data including positions of junctions, etc. The image editing section 54 retrieves the junction data holding section 155 for an image-pickup position through the image retrieving section 31, and if the image-pickup position is in the proximity of the junction, it automatically carries out an editing process such as a cutting process for images. The other constructions are the same as those of the fifth embodiment, and the same elements are indicated by the same reference numbers.

Figure 45:
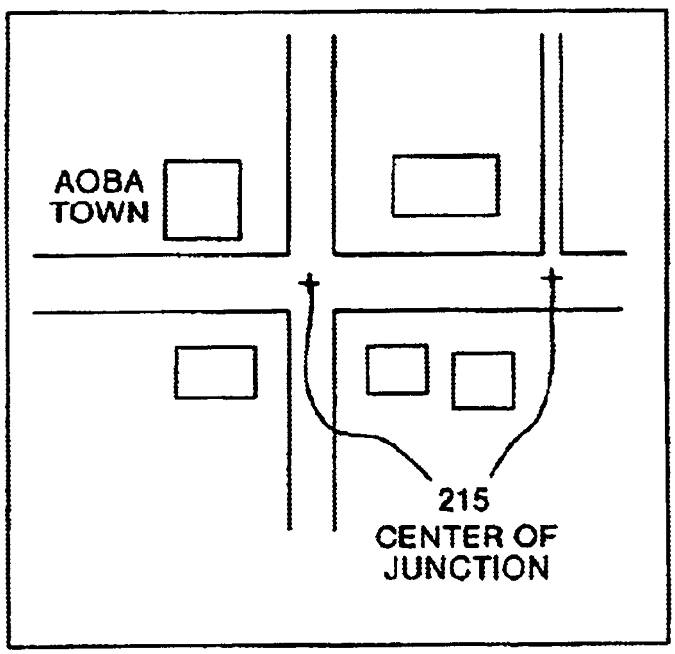
FIG. 45 is a drawing that shows one portion of two-dimensional map data that has preliminarily held crossing-point position data with respect to a crossing point.

Referring to FIG. 45, an explanation will be given of one example in which the junction detection section 154 detects a junction. FIG. 45 shows one portion of two-dimensional map data that preliminarily holds junction position data with respect to all the junction centers 215. The junction detection section 154 displays all the junctions on the map display section 28 from the two-dimensional map data, and the user specifies only the junctions related to images through the map input section 29 so that the junctions related to image-editing processes are detected.

Figure 46:
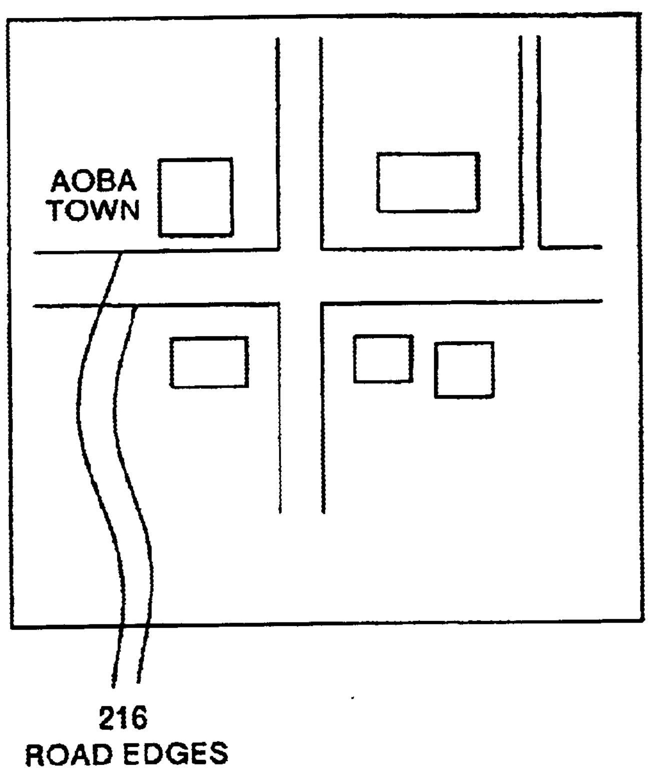
FIG. 46 is a drawing that shows one portion of two-dimensional map data that has not held crossing-point position data with respect to the crossing point.

Referring to FIG. 46, an explanation will be given of another example in which the junction detection section 154 detects a junction. FIG. 46 shows a portion of two-dimensional map data that holds data of road edges 216, but does not hold junction position data related to junctions. The junction detection section 154 displays road edges on the map display section 28 from the two-dimensional map data, and the user specifies only the junctions related to images through the map input section 29 so that the junctions related to image-editing processes are detected.

Twenty-first Embodiment

A twenty-first embodiment of the present invention will now be explained. In the tenth embodiment, the image collecting device 91 is placed, for example, on a car, while the image retrieving device 110 is placed, for example, in an office, with the two devices being placed apart from each other, so that images collected by the image collecting device 91 can be confirmed at the installation place of the image retrieving device in real time. However, with respect to controlling operations, such as the start and finish of the image collecting process, it is necessary to give instructions from the installation place of the image retrieving device 110 to an operator on the image collecting device 91 side so as to manually carry out such operations. In the twenty-first embodiment, provision is made so that the controlling operations, such as the start and finish of the image collecting process, are carried out on the image retrieving device 110 side.

Figure 47:
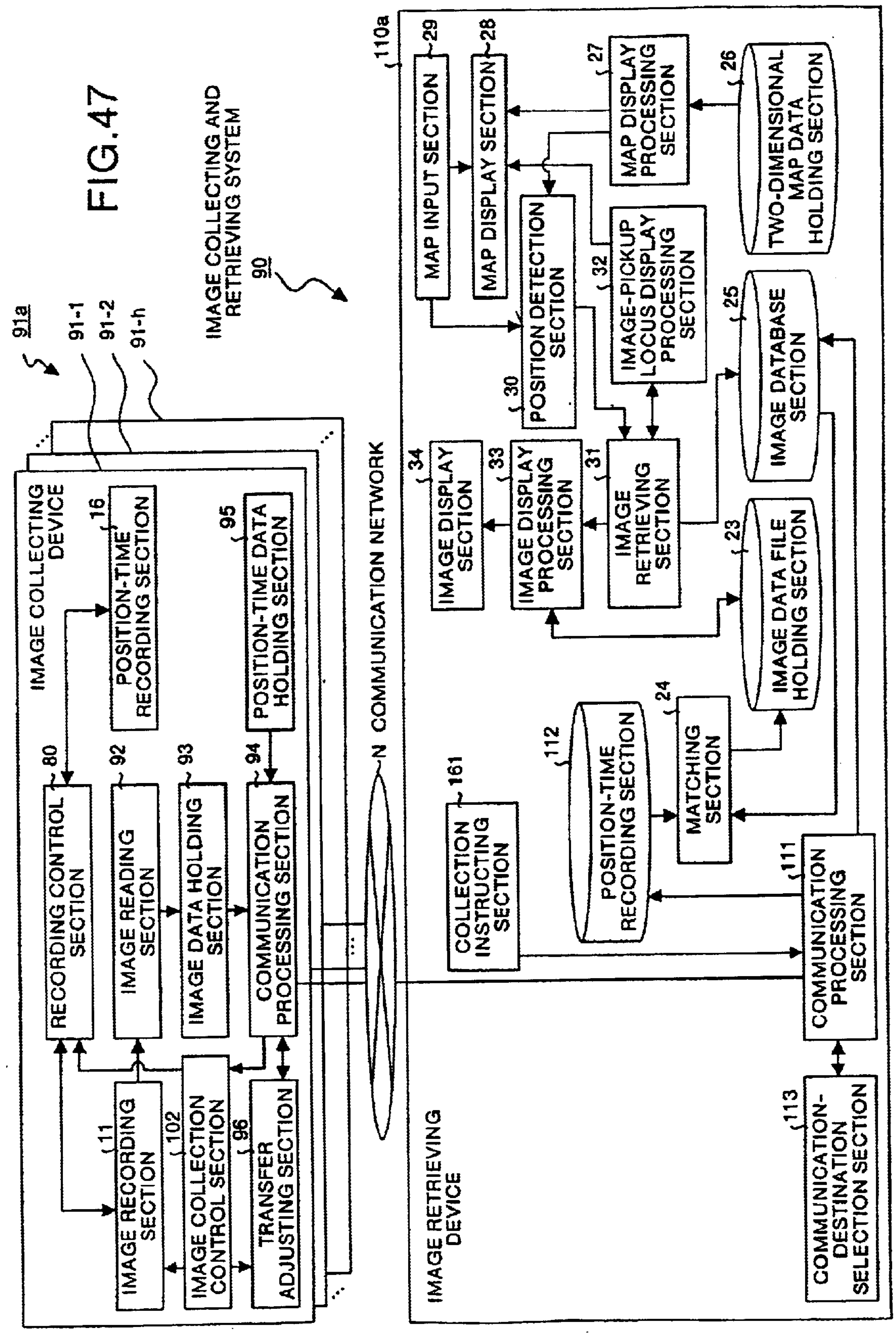
FIG. 47 is a block diagram that shows a construction of an image retrieving device in accordance with a twenty-first embodiment of the present invention.
Figure 48:
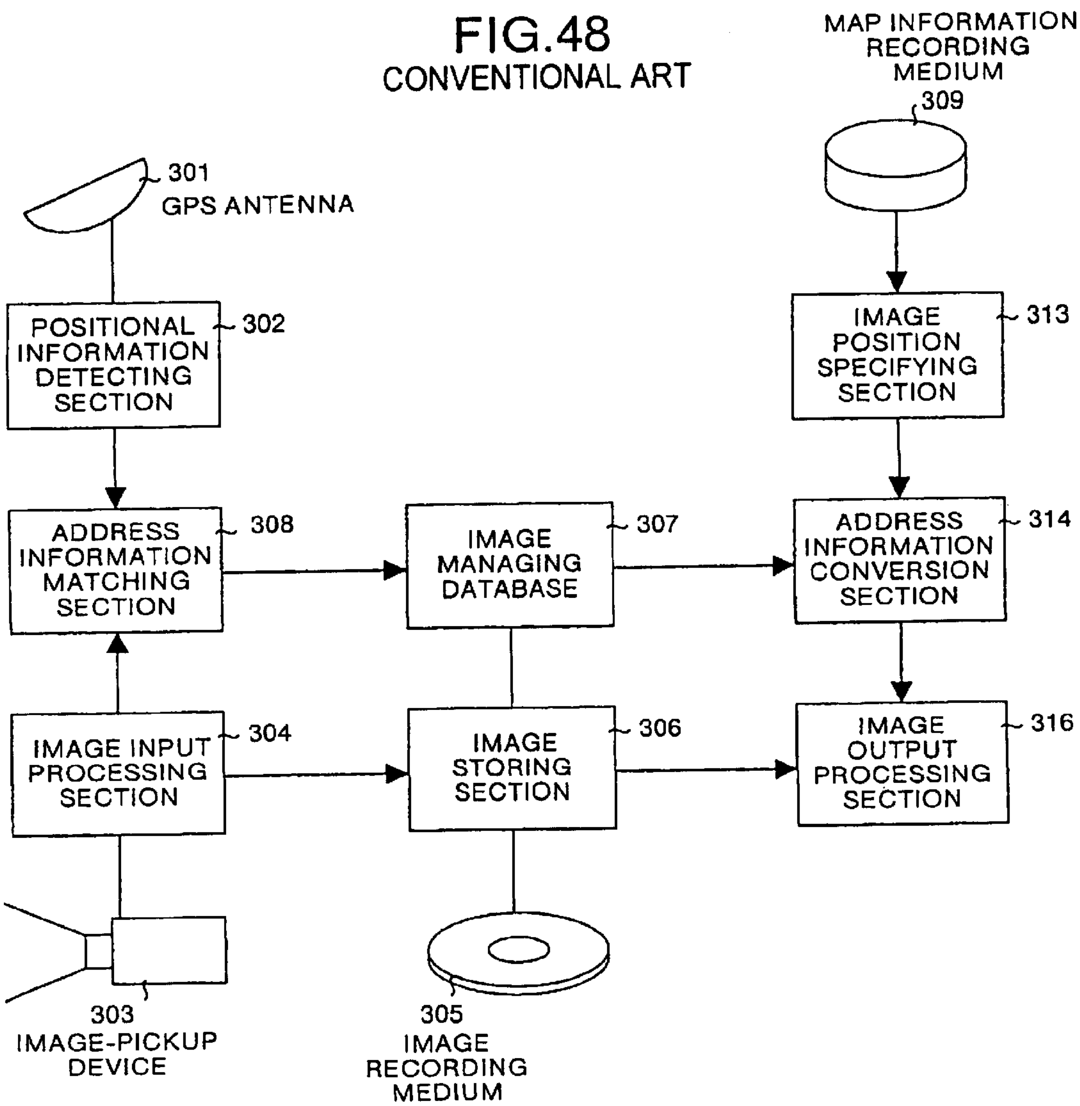
FIG. 48 is a block diagram that shows a construction of an image retrieving device in accordance with a conventional device.

FIG. 47 is a block diagram that shows a construction of an image retrieving device in accordance with the twenty-first embodiment of the present invention. As shown in FIG. 48, in this image retrieving device 110*a*, a collection instructing section 161 outputs to a communication network the user's instructions such as the start and finish of the image collecting process to the image collecting device, through the communication processing section 111, and the communication network transfers the collection instruction from the image retrieving device 110*a* to the image collecting device 91*a*.

In the image collecting device 91*a*, an image collection control section 162 receives the instructions through the communication processing section 94, and based upon the instructions such as the start and finish of the image collecting process, controls the image-pickup recording section 11, the recording control section 80 and the transfer adjusting section 96 by sending these instructions thereto. The other constructions are the same as those of the tenth embodiment, and the same elements are indicated by the same reference numbers. Consequently, it is possible to control the image collecting device 91*a* from the image retrieving device 110*a* side.

As described above, in accordance with the present invention, first the image reading unit reads a sequence of image data recorded with image pickup times, and stores the sequence of image data in the image data holding unit. Then, the matching unit allows the attribute information reading unit to read attribute information containing at least image pickup positions where the sequence of image pickup data has been obtained and the image pickup times thereof, matches the attribute information with the sequence of image data held in the image data holding unit based upon the image pickup times, and allows the image database section to hold the matching relationship as image database. The map display processing unit displays the map data on the map display unit based upon the map data held in the map data holding unit. Thereafter, the locus display processing unit allows the image retrieving unit to retrieve the image database for image data having pickup positions within the map displayed by the map display unit, and displays the retrieved image pickup positions on the map as a locus. Thereafter, when the position specifying unit specifies a position on the map, the image processing unit acquires image data corresponding to the image pickup position in the vicinity of the position specified by the position specifying unit from the image data holding unit, and reproduces and displays the resulting image data on the image display unit. With the above-mentioned arrangement, it becomes possible to reduce time and workloads that are taken in reproducing and displaying desired image data.

In accordance with the next invention, the attribute information is allowed to include information related to the image pickup orientation, image pickup direction, image pickup angle or combinations of these, and the resulting attribute information is held as the image database. Therefore, it becomes possible to accurately manage a retrieving process for desired image data precisely, and consequently to effectively use the image database.

In accordance with the next invention, the locus-type button display processing unit allows the image retrieving unit to retrieve for the sequence of image data having image pickup positions within the map displayed by the map display unit, displays a route formed by connecting the image pickup positions of the sequence of image data thus retrieved and a slide bar that slides on the route, and is constituted by inputting button indicating a reproduction start point of the image data on the map, and allows an input unit to slide the inputting button on the map so that the image start point of the image data is specified. Therefore, it becomes possible to accurately carry out retrieving and reproducing operations for desired image data in a flexible manner, and also to improve the operability of the retrieving and reproducing operations for desired image data.

In accordance with the next invention, the route searching unit allows the image retrieving unit to retrieve for a sequence of image data located between two positions indicating the image pickup start and the image pickup end specified by the position specifying unit, generates a route between the two positions that passes through the image pickup positions indicated by the sequence of image data, displays the locus of the image pickup positions along the route on the map display unit, and, when an image pickup position is specified by the position specifying unit, displays image data on the route succeeding to the image pickup position. Therefore, a locus between the two specified positions is displayed more efficiently, and it becomes possible to reduce time and workloads that are taken in retrieving and reproducing desired image data.

In accordance with the next invention, when a plurality of sequences of image data are located on the route between the two positions, the pieces of image data on the route are automatically connected by the image processing unit, and reproduced and displayed. Therefore, it becomes possible to reduce time and workloads that are taken in retrieving and reproducing desired image data more effectively.

In accordance with this invention, when image data passing through the crossing point exists, the connection interpolating unit retrieves the crossing-point database, and based upon the results of the retrieval, interpolates images on the periphery of the crossing point by using the crossing-point image held in the junction image holding unit. Therefore, if a connecting process is carried out on pieces of image data passing through a crossing point, it is possible to reproduce and display the resulting data as a sequence of image data without any discontinuation.

In accordance with the next invention, the image editing unit carries out an editing process including cutting and composing processes of the sequence of image databased upon the locus displayed on the map display unit. Therefore, it is possible to accurately carry out an image editing process rapidly.

In accordance with the next invention, the image adjusting unit carries out a thinning process or an interpolating process on the image data so that the image pickup position gaps between the respective pieces of image data constituting the sequence of image data are made virtually the same. Therefore, the resulting data is reproduced and displayed as uniform images shifting at a constant velocity, and since it is not necessary to view unnecessary images, it becomes possible to reproduce image efficiently and also to improve the memory efficiency.

In accordance with the next invention, the map display processing unit is designed to display a three-dimensional map on the map display unit three-dimensionally based upon the three-dimensional map data. Therefore, it is possible to viscerally confirm the confirmation of the image-pickup position.

In accordance with the next invention, the locus display processing unit is designed to display the locus at three dimensional positions on the three dimensional map with the locus corresponding to image pickup positions within the display range in the three-dimensional map displayed on the map display unit. Therefore, it is possible to easily confirm the positional relationship on the periphery of the image-pickup position.

In accordance with the next invention, based upon the attribute information within the image database, the image pickup position display processing unit displays the image pickup range derived from the image pickup position displayed on the image display unit, on the map display unit. Therefore, since the image-pickup range of the image data is displayed, it is possible to more easily carry out retrieving and reproducing processes for desired image data.

In accordance with the next invention, the synchronization processing unit is designed to provide a three-dimensional display having the same three-dimensional display position, direction and angle as the image pickup position, image pickup direction and image pickup angle of the image displayed on the image display unit, on the map display unit in synchronism with the image. Therefore, it is possible to easily confirm the image-pickup positional relationship of images being reproduced.

In accordance with the next invention, when the image position specifying unit specifies a position on the display screen of the image display unit, the three-dimensional position display processing unit calculates the three-dimensional position corresponding to the position specified by the image position specifying unit based upon the image-pickup position, the image-pickup direction and the image-pickup angle of the image data displayed on the image display unit, and displays the resulting three-dimensional position on the map display unit. Therefore, it is possible to easily confirm the positional relationship of image elements such as buildings within images being reproduced.

In accordance with the next invention, when the image position specifying unit specifies a position on the display screen of the image display unit, the three-dimensional model image composing unit composes the three-dimensional model into the image and displays the resulting image at the position specified by the image position specifying unit in a manner so as to match the image displayed on the image display unit. Therefore, it is possible to more realistically confirm a change in images if the three-dimensional model is added thereto.

In accordance with the next invention, the three-dimensional model and map composing unit calculates a three-dimensional position corresponding to the position specified by the image position specifying unit based upon the image-pickup position, image-pickup direction and image-pickup angle of the image data displayed on the image display unit, and composes the three-dimensional model into the map and displays the resulting map at the three-dimensional position on the map displayed by the map display unit. Therefore, the image into which the three-dimensional model is composed by the three-dimensional model image composing unit can be confirmed by the three-dimensional map into which the three-dimensional model is composed by the three-dimensional model and map composing unit.

In accordance with the next invention, the recording control unit allows the image recording unit and the position-time recording unit to carry out the recording operations with the respective recording times being synchronous to each other. Therefore, the synchronization between the image recording process and the position-time recording process is automatically maintained, thereby making it possible to generate an image database with high precision.

In accordance with the next invention, on the at least one image collecting device side, first, the recording control unit controls the image recording unit and the position-time recording unit to carry out the respective recording operations with their recording times being synchronous to each other. Thereafter, the transmission processing unit successively transmits the sequence of image data read from the image recording unit by the image reading unit and the attribute information recorded by the position-time recording unit to the image retrieving device side. On the image retrieving device side, the receiving processing unit receives the sequence of image data and the attribute information, transmitted from the at least one image collecting device, and controls the image data holding unit so as to hold the sequence of image data and the attribute information holding unit to hold the attribute information. Thereafter, the matching unit matches the sequence of image data held in the image data holding unit with the attribute information held in the attribute information holding unit based upon the image pickup times, and holds the matching relationship as an image database. The map display processing unit displays the map data on the map display unit based upon the map data held in the map data holding unit. Thereafter, the locus display processing unit allows the image retrieving unit to retrieve the image database for image data having pickup positions within the map displayed by the map display unit, and displays the retrieved image pickup positions on the map as a locus. Thus, when the position specifying unit specifies a position on the map, the image processing unit acquires image data corresponding to the image pickup position in the vicinity of the position specified by the position specifying unit from the image data holding unit, and reproduces and displays the resulting image data on the image display unit. With this arrangement, images that are being picked up by at least one image collecting devices can be confirmed by an image retrieving device virtually in real time.

In accordance with the next invention, the image adjusting unit thins the image data to be transmitted so that the amount of data to be transmitted is adjusted. Therefore, the amount of image data to be transmitted is uniformed so that it is possible to always reproduce the newest image in real time.

In accordance with the next invention, the communication destination selection unit switches the receipt of the sequence of image data and attribute information transmitted from the at least one image collecting device in a time divided manner. Therefore, it is possible to reproduce images picked up by at least one image collecting devices in real time.

In accordance with the next invention, the map attribute retrieving unit retrieves the map data holding unit for map attribute information corresponding to the image pickup position at which the image data is obtained, and the map attribute information display unit displays the map attribute information. Therefore, it is possible to display the map attribute such as the name of a place in addition to the images.

In accordance with the next invention, the image database has preliminarily recorded map attribute information such as the name of a place, retrieved by the map attribute retrieving unit, the map retrieving unit retrieves for a position on the two-dimensional map based upon the map attribute information, outputs the resulting information to the position specifying unit, and the image processing unit reproduces and displays the image data picked up from the position specified by the position specifying unit. Therefore, it becomes possible to retrieve and display image data that has been picked up at a position having map attribute such as the name of a place.

In accordance with the next invention, the subject-position matching unit matches the subject position of an image and the pickup position thereof with each other, the image database holds the results of the matching process, the position specifying unit inputs a position on the map, the image processing unit reproduces and displays an image corresponding to the subject at the position on the map based upon the results of the matching process. Therefore, the resulting effect is that, by specifying the position of a subject, the image data including picked-up images of the subject can be retrieved and displayed.

In accordance with the next invention, the subject angle detection unit detects an angle between the subject face of an image and the lens face of the image collecting device for collecting the sequence of image data; and the image angle correction unit corrects the distortion of the image resulting from the case in which this angle is not a right angle, based upon the above-mentioned angle, and the image display unit is allowed to display an image in which the distortion has been corrected. Therefore, the position of a subject is specified, and with respect to the image data including picked-up images of the subject, the data is retrieved and displayed after the distortion thereof due to the angle of the subject with respect to the lens face has been corrected.

In accordance with the next invention, if, for example, the image collecting device is set to have the horizontal direction as the reference direction, an image is collected in a state in which it has the known lens angle difference, for example, in a manner so as to have an upward direction with a predetermined angle, and the image angle correction unit corrects the distortion of the image caused by the lens angle, and the image display unit displays the image in which the distortion has been corrected. With this arrangement, images, obtained from an image collecting device that is set in an upward direction with a fixed angle so as to pick up images of multistoried buildings while traveling along a street, are corrected so as to be retrieved and displayed like images obtained in the horizontal direction.

In accordance with the next invention, the locus position correction unit corrects the image pickup position of the image pickup position information at a position on a road of the map, and the locus display processing unit displays the corrected image pickup position on the map as a locus. Therefore, even when the GPS receiver fails to receive an accurate image pickup position, and indicates a place other a road, it is possible to correct the image-pickup position onto the corresponding road when displayed.

In accordance with the next invention, the image collecting device collects all-around image data obtained from a video camera provided with a fish-eye lens, and the image upright correction unit extracts an image in a specified direction from the all-around image data and corrects it into an upright image so that the image display unit displays the upright image. Therefore, it is possible to obtain an image without any distortion in a desired direction from a single image collecting device, and to retrieve and display the resulting image.

In accordance with the next invention, the image collecting device collects stereoscopic image data obtained by using two stereoscopic lenses spaced with a predetermined gap, and the polarization processing unit carries out a polarizing process on the stereoscopic image data so that the image display unit displays the stereoscopic image. Therefore, the user wearing stereoscopic polarizing glasses is allowed to view images stereoscopically.

In accordance with the next invention, the subject-distance acquiring unit detects the distance flu between the subject face of an image and the lens face of the image collecting device, and the image size correction unit corrects the image size to a size obtained when picked up with a fixed distance from the subject based upon the above-mentioned distance so that the image display unit displays the image that has been corrected in its size. Therefore, if by specifying a position of a subject, image data having the picked-up images of the subject is obtained, the corresponding image can be retrieved and displayed after having been subjected to the correction in size difference due to the distance between the subject and the lens face.

In accordance with the next invention, the junction detection unit detects a crossing point from the map data, and the junction data holding unit holds the crossing-point data, and the image editing unit carries out a cutting process on the sequence of image data at the crossing point. Therefore, by preliminarily specifying a crossing point, it is possible to automatically carry out the cutting process of image data at the corresponding crossing point during the image editing process.

In accordance with the next invention, the collection instructing unit installed in the image retrieving device gives instructions such as the start and finish of the image collection, and a communication network transfers the instruction to the image collecting device, and the image collection control unit installed in the image collecting device controls the image collecting device based upon the instruction. Therefore, the user who stays on the image retrieving device side can directly give instructions such as the start and finish of the image collection.

Industrial Applicabality

As described above, the image collecting device, image retrieving device and image collecting and retrieving system of the present invention are best-suited for an image collecting device, image retrieving device and image collecting and retrieving system which collect picked-up images of various spaces, such as outdoor, indoor, sea bed, underground, sky and universe spaces, retrieve the collected images in association with the picked up positions, reproduce and edit them.

What is claimed is:

1. An image retrieving device comprising:

an image reading unit which reads a sequence of image data recorded with image pickup times;

an image data holding, unit which holds the sequence of image data that has been read by the image reading unit;

an attribute information reading unit which reads attribute information containing at least image pickup positions where the sequence of image pickup data has been obtained and the image pickup times thereof;

a matching unit which matches the sequence of image data held in the image data holding unit with the attribute information read by the attribute information reading unit based upon the image pickup times;

an image database which holds the matching relationship that has been determined by the matching unit;

a map data holding unit which holds map data;

a map display processing unit which displays the map data on a map display unit based upon the map data;

an image retrieving unit which retrieves the image database;

a locus display processing unit which allows the image retrieving unit to retrieve for image data having image pickup positions within a map displayed by the map display unit, and displays the retrieved pickup positions on the map as a locus;

an image display unit which displays the sequence of image data;

a position specifying unit which specifies a position of the map displayed on the map display unit; and an image processing unit which acquires image data corresponding to the image pickup position in the vicinity of the position specified by the position specifying unit from the image data holding unit, and reproduces and displays the resulting image data on the image display unit.

2. The image retrieving device according to claim 1, wherein the attribute information further includes information related to the image pickup orientation, image pickup direction, image pickup angle or combinations of these.

3. The image retrieving device according to claim 1, wherein the locus display processing unit further comprises a locus-type button display processing unit which allows the image retrieving unit to retrieve for a sequence of image data having image pickup positions within the map displayed by the map display unit, and displays a route formed by connecting the image pickup positions of the sequence of image data thus retrieved and a slide bar that slides on the route, and is constituted by an inputting button for indicating a reproduction start point of the image data on the map.

4. The image retrieving device according to claim 1, further comprising a route searching unit which allows the image retrieving unit to retrieve for a sequence of image data located between two positions indicating the image pickup start and the image pickup end specified by the position specifying unit, generates a route between the two positions that passes through the image pickup positions indicated by the sequence of image data, displays the locus of the image pickup positions along the route on the map display unit, and, when an image pickup position is specified by the position specifying unit, displays image data on the route succeeding to the image pickup position.

5. The image retrieving device according to claim 1, further comprising:

a junction image holding unit which holds a crossing point image picked up on the periphery of a crossing point at which sequences of image data intersect each other;

a crossing-point database which holds the matching relationship in which the crossing-point image and the attribute information of the crossing-point image are matched with each other; and a connection interpolating unit which, when image data passing through the crossing point exists, retrieves the crossing-point database, and interpolates images on the periphery of the crossing point by using the crossing-point image held in the junction image holding unit.

6. The image retrieving device according to claim 1, further comprising an image editing unit which carries out an editing process including cutting and composing processes of the sequence of image data.

7. The image retrieving device according to claim 1, further comprising an image adjusting unit which carries out a thinning process or an interpolating process on the image data so that the image pickup position gaps between the respective pieces of image data constituting the sequence of image data are made virtually the same.

8. The image retrieving device according to claim 1, wherein the map data holding unit holds three-dimensional map data, and the map display processing unit displays the three-dimensional map on the map display unit stereoscopically based upon the three-dimensional map data.

9. The image retrieving device according to claim 1, further comprising an image pickup position display processing unit which, based upon the attribute information, displays the image pickup range displayed on the image display unit on the map display unit.

10. The image retrieving device according to claim 8, further comprising a synchronization processing unit which provides a three-dimensional display having the same three-dimensional display position, direction and angle as the image pickup position, image pickup direction and image pickup angle of the image displayed on the image display unit, on the map display unit in synchronism with the image.

11. The image retrieving device according to claim 8, further comprising:

an image position specifying unit which specifies a position on the display screen of the image display unit; and a three-dimensional position display processing unit which calculates the three-dimensional position corresponding to the position specified by the image position specifying unit based upon the image-pickup position, the image-pickup direction and the image-pickup angle of the image data displayed on the image display unit, and displays the resulting three-dimensional position on the map display unit.

12. The image retrieving device according to claim 8, further comprising:

an image position specifying unit which specifies a position on the display screen of the image display unit;

a three-dimensional model holding unit which holds a three-dimensional model; and a three-dimensional model image composing unit which composes the three-dimensional model into the image and for displaying the resulting image at the position specified by the image position specifying unit in a manner so as to match the image displayed on the image display unit.

13. The image retrieving device according to claim 12, further comprising a three-dimensional model and map composing unit which calculates a three-dimensional position corresponding to the position specified by the image position specifying unit based upon the image-pickup position, image-pickup direction and image-pickup angle of the image data displayed on the image display unit, and composes the three-dimensional model and the map and displays the resulting map at the three-dimensional position on the map displayed by the map display unit.

14. The image retrieving device according to claim 1, further comprising:

a map attribute retrieving unit which retrieves the map data holding unit for map attribute information corresponding to the image pickup position at which the image data is obtained; and a map attribute information display unit which displays the map attribute information.

15. The image retrieving device according to claim 14, further comprising a map retrieving unit which retrieves a position on the two-dimensional map based upon the specified map attribute.

16. The image retrieving device according to claim 1, further comprising a subject-position matching unit which matches the subject position of an image and the pickup position thereof with each other.

17. The image retrieving device according to claim 16, further comprising:

a subject angle detection unit which detects an angle between the subject face of an image and the lens face of the image collecting device for collecting the sequence of image data; and an image angle correction unit which corrects the distortion of the image due to the angle with respect to the image data.

18. The image retrieving device according to claim 1, which collects the sequence of image data with the lens angle having a known lens angle difference with respect to the reference direction, further comprising:

an image angle correction unit which corrects the distortion of an image resulting from the difference in the lens angle.

19. The image retrieving device according to claim 1, which has all-around image data obtained by a fish-eye lens as the sequence of image data, further comprising:

an image upright correction unit which extracts an image in a specified direction from the all-around image data and for correcting it into an upright image.

20. The image retrieving device according to claim 1, which has stereoscopic image data obtained by using two stereoscopic lenses spaced with a predetermined gap as the sequence of image data, further comprising:

a polarization processing unit which carries out a polarizing process on each piece of the stereoscopic image data.

21. The image retrieving device according to claim 16, further comprising:

a subject-distance acquiring unit which detects the distance between the subject face of an image and the lens face of the image collecting device for collecting the sequence of image data; and an image size correction unit which corrects a difference in the image size caused by the distance with respect to the image data.

22. The image retrieving device according to claim 6, further comprising:

a junction detection unit which detects a crossing point from the map data and;

a junction data holding unit which holds the data of the crossing point detected by the junction detection unit, wherein the image editing unit carries out a cutting process of the sequence of image databased upon the crossing-point data held by the junction data holding unit.

* * * * *